United States Patent
Aiura et al.

(10) Patent No.: US 7,349,154 B2
(45) Date of Patent: Mar. 25, 2008

(54) REFLECTION TYPE SCREEN

(75) Inventors: Tomoyuki Aiura, Shioya-gun (JP); Shuichi Yoshinaka, Yaita (JP); Takao Abumi, Yaita (JP); Haruhisa Takiguchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 10/833,764

(22) Filed: Apr. 27, 2004

(65) Prior Publication Data

US 2004/0240054 A1    Dec. 2, 2004

Related U.S. Application Data

(63) Continuation of application No. PCT/JP03/12785, filed on Oct. 6, 2003, which is a continuation-in-part of application No. PCT/JP03/11215, filed on Sep. 2, 2003.

(30) Foreign Application Priority Data

| May 26, 2003 | (JP) | ............................. 2003-147079 |
| May 26, 2003 | (JP) | ............................. 2003-147116 |
| May 26, 2003 | (JP) | ............................. 2003-147149 |

(51) Int. Cl.
*G03B 21/56* (2006.01)
*G03B 21/60* (2006.01)

(52) U.S. Cl. ...................... 359/449; 359/455

(58) Field of Classification Search ............... 359/452, 359/449, 459, 625, 627, 454–457
See application file for complete search history.

(56) References Cited

U.S. PATENT DOCUMENTS 3,063,339 A * 11/1962 Mihalakis et al. .......... 359/452

(Continued)

FOREIGN PATENT DOCUMENTS

EP          0 775 935 A1    5/1997

(Continued)

OTHER PUBLICATIONS

International Search Report for Application No. PCT/JP03/12785 (3pp), Feb. 17, 2004.

(Continued)

*Primary Examiner*—Christopher Mahoney
(74) *Attorney, Agent, or Firm*—David G. Conlin; David A. Tucker; Edwards Angell Palmer & Dodge LLP

(57) ABSTRACT

The reflection type screen comprises a reflection layer which is disposed on the opposite side to the projected light incident side of the screen, a horizontal view angle increasing layer which is disposed on the light incident side of the reflection layer, and a diffusion layer which is disposed on the light incident side of the horizontal view angle increasing layer. The horizontal view angle increasing layer has an array of convex ridges which are raised in a rear direction of the screen. Since the longitudinal direction of the ridges is aligned with the vertical direction of the screen, the view angle characteristics of the screen in a horizontal direction are improved and the diffusion characteristics of the screen in a vertical direction can be suppressed for preventing external disturbing light from an upper illumination light from being reflected toward the observers.

22 Claims, 38 Drawing Sheets

U.S. PATENT DOCUMENTS

| | | | |
|---|---|---|---|
| 4,006,965 A * | 2/1977 | Takada et al. | 359/443 |
| 4,911,529 A * | 3/1990 | Van De Ven | 359/454 |
| 5,473,469 A * | 12/1995 | Magocs et al. | 359/449 |
| 5,903,392 A | 5/1999 | Kojima et al. | 359/599 |
| 6,023,369 A * | 2/2000 | Goto | 359/443 |
| 6,144,491 A | 11/2000 | Orikasa et al. | |
| 6,288,842 B1 * | 9/2001 | Florczak et al. | 359/619 |
| 6,323,999 B1 | 11/2001 | Ueda et al. | 359/443 |
| 6,381,068 B1 | 4/2002 | Harada et al. | |
| 6,404,548 B1 | 6/2002 | Tatsuki et al. | |
| 6,538,814 B2 | 3/2003 | Hunter et al. | |
| 6,842,282 B2 * | 1/2005 | Kuroda et al. | 359/449 |

FOREIGN PATENT DOCUMENTS

| | | |
|---|---|---|
| JP | 57-043444 | 8/1980 |
| JP | 58-166335 | 10/1983 |
| JP | 63-030834 | 2/1988 |
| JP | 03-269525 | 12/1991 |
| JP | 04-204722 | 7/1992 |
| JP | 04-367838 | 12/1992 |
| JP | 06-075301 | 3/1994 |
| JP | 06-258717 | 9/1994 |
| JP | 06-076901 | 10/1994 |
| JP | 07-199356 | 8/1995 |
| JP | 09-211729 | 8/1997 |
| JP | 10-048751 | 2/1998 |
| JP | 11-038509 | 2/1999 |
| JP | 2000-221601 | 8/2000 |
| JP | 2000-275406 | 10/2000 |
| JP | WO-02/25369 A1 | 3/2002 |
| JP | 2002-311507 | 10/2002 |
| JP | 2002-540445 A1 | 11/2002 |
| TW | 388802 | 5/2000 |

OTHER PUBLICATIONS

International Search Rep ort for Application No. PCT/JP03/11215 (3pp), Jan. 13, 2004.

* cited by examiner

FIG.53

| | MEASURING POSITION 1 | MEASURING POSITION 2 | MEASURING POSITION 3 | MEASURING POSITION 4 | MEASURING POSITION 5 |
|---|---|---|---|---|---|
| PROJECTION SIZE ASPECT RATIO | 50inch wide | 50inch wide | 50inch wide | 50inch wide | 50inch wide |
| ALL LIGHT FLUX CONTRAST | 700lm 1200 : 1 | 700lm 1200 : 1 | 700lm 1200 : 1 | 700lm 1200 : 1 | 700lm 1200 : 1 |
| PROJECTED LIGHT Gain | 0.60 | 0.87 | 0.56 | 1.10 | 2.69 |
| EXTERNAL DISTURBING LIGHT Gain | 0.41 | 0.57 | 0.42 | 0.18 | 0.22 |
| EXTERNAL LIGHT ILLUMINANCE | 250.0lx | 250.0lx | 250.0lx | 250.0lx | 250.0lx |
| CONTRAST IN LIGHT ROOM | 6.9 : 1 | 7.2 : 1 | 6.4 : 1 | 25.3 : 1 | 48.7 : 1 |

| MEASURING POSITION 6 | MEASURING POSITION 7 | MEASURING POSITION 8 | MEASURING POSITION 9 | COMPLETE DIFFUSION |
|---|---|---|---|---|
| 50inch wide | 50inch wide | 50inch wide | 50inch wide | 50inch wide |
| 700lm 1200 : 1 | 700lm 1200 : 1 | 700lm 1200 : 1 | 700lm 1200 : 1 | 700lm 1200 : 1 |
| 1.08 | 1.03 | 2.46 | 0.99 | 1.00 |
| 0.18 | 0.08 | 0.09 | 0.08 | 1.00 |
| 250.0lx | 250.0lx | 250.0lx | 250.0lx | 250.0lx |
| 24.9 : 1 | 51.1 : 1 | 102.6 : 1 | 49.2 : 1 | 5.0 : 1 |

REFLECTION TYPE SCREEN

CROSS-NOTING PARAGRAPH

This application is a continuation of PCT Application No. PCT/JP03/12785, filed Oct. 6, 2003, which is a continuation-in-part of copending PCT Application No. PCT/JP03/11215 filed Sep. 2, 2003, the teachings of all being incorporated herein by reference.

FIELD OF THE INVENTION

The present invention relates to a reflection type screen, in particular to a reflection type screen on which video images which are projected by a projecting device (projector) and the like are displayed, said reflection type screen being capable of displaying projected images having a high contrast and are bright in a light room.

BACKGROUND OF THE INVENTION

Prior art reflection type screen comprising a screen substrate or matrix which is made of a sheet of woven glass fibers or synthetic fibers, such a woven sheet which is impregnated with a resin such as vinyl chloride, a synthetic resin sheet of vinyl chloride, or a metallic sheet of aluminum; and a reflection layer which is deposited on the surface of the screen substrate made of these materials has been known.

The above-mentioned reflection layer is formed by applying a pearl paint or pearl ink in which titanium dioxide coated powders or mica flake fragments are dispersed in a binder made of a light transmitting resin or silver paint or ink containing powders of a metal such as aluminum on the surface of the screen substrate. Further, reflection type screen on which a multiplicity of transparent micro beads are arrayed to provide regression has been known.

A screen comprising a diffusion layer in which finely divided particles of crystal of calcite which acts as a light diffusing substance having a low light absorption are dispersed in a binder, said layer being laminated on the above-mentioned reflection layer has also been known.

If the diffusion on the screen is excessively increased on the reflection type screen, external disturbing light can not be distinguished from the projected light in a light room, leading to lowering of the contrast. Accordingly, the degree of the diffusion on the imaging face should be suppressed to some extent.

Since a large difference in a horizontal direction between the incident angle of the light to the screen at the peripheral area and the central area on a large size screen to be viewed having an aspect ratio of 16:9 which is becoming predominant will occur, a horizontal diffusion is necessary so that a view angle which is enough to cover the difference in angle can be obtained. The gain in a direction toward the front face of the screen can be increased by decreasing the diffusion degree of the screen. At this time viewing characteristics such as view angle and screen CCR (central/peripheral brightness ratio) would be deteriorated.

In view of the foregoing, the diffusion degree should be suppressed to some degree to enhance the contrast in a light room in the refection type screen. Reflection characteristics which cause the light diffusion to increase the view angle in a horizontal direction are required.

Prior art reflection type screen having a structure that is shown in FIG. 60 is disclosed in patent specification (Japanese laid-open patent publication No. 11-38509). This reflection type screen 110 comprises a light diffusion layer 118 which is formed on the surface 116A of a substrate 116 of a prism sheet for diffusing projected images and a plurality of prisms 120 made of an optically transparent material which are in the form of stripe are extended and arrayed in a vertical direction of the screen on the reverse side 116B of the substrate 116. Each prism 120 has a section which is in the form of an equilateral triangle so that it has a given apex angle and a given side length. A light absorbing sheet 114 is disposed on and in parallel with the prism sheet 112 so that it faces a prism group on the rear side of the prism sheet 112. The light absorbing sheet 114 is black colored to substantially absorb the transmitted light on the side opposite to the rear side.

Eternal disturbing light R which is often incident on the screen surface at a high incident angle is absorbed by the light absorbing sheet 114 by being transmitted through the prisms in the reflection type screen of the patent specification 1.

FIGS. 61 through 63 are views explaining the function of the prism on the reflection type screen of the cited patent specification 1 and schematically show only the prisms 120 and the substrate 116 which constitute the reflection type screen. Reflection on the interface between portions of the prism 120 having different refractory indices will be considered in the reflection screen of the cited patent specification 1. Since the incident angle of the light projected on the reflection type screen 110 is in the range of 0° to 15° in a horizontal angle, the light which is incident to the reflection type screen 110 in a perpendicular direction is regressively reflected as shown in FIG. 61. In contrast to this, the light which is incident to the reflection type screen 110 at some incident angle will pass through a first prism interface shown in FIG. 62, or a second interface shown in FIG. 63 without being reflected thereon and will be absorbed by a light absorbing sheet 114. Due to such an action, a large different between the brightness of the light on the reflection type screen 110 at the central area and peripheral area thereof is caused, so that a problem that the view angle at the peripheral area and CCR (screen/peripheral area brightness ratio) deteriorates is invited. Such a deterioration of CCR becomes more remarkable if the screen is a wide screen.

As mentioned above, the reflection type screen 110 of the cited patent specification 1 aims at increasing the view angle by the operation of the prisms 120 which extend in a vertical direction and an improvement in the contrast of the projected light at a light place by absorbing the light having a high incident angle to the reflection type screen 110. However only light which is incident to the screen in a horizontal direction as is the case sun light is incident indoor at light place is considered. The contrast is improved by absorbing the external disturbing light which is incident in a horizontal direction with the light absorbing sheet 114 as mentioned above. However, no case in which external disturbing light is mainly incident to the reflection type screen 110 from an upper position as is an electric bulb is considered. In other words, when the prisms 120 extending in a vertical direction are used, an effect for absorbing the external disturbing light incident from an upper position can not be expected.

In other words, if the screen of the cited patent specification 1 is used indoors below an electric illumination bulb, a larger amount of the projected light which is incident on the peripheral area of the screen in a downward direction will pass through the prisms 120 as shown in FIGS. 62 and 63 and is ultimately absorbed. Accordingly, the projected light will not be returned to the viewers, so that the screen looks darker. The darkness becomes more remarkable in view of incident angle particularly on the wide screen.

Therefore, in view of the foregoing, characteristics such as excellent contrast in a light room, excellent view angle in a horizontal direction and excellent CCR of the screen are demanded for the reflection type screen.

The present invention was made in view of the above-mentioned circumstances. It is an object of the present invention to provide a reflection type screen having a high contrast even in a light room and a reflection type screen having an excellent horizontal view and an excellent screen CCR in addition to the high contrast.

Cited Patent Specification 1:
Japanese Laid-Open Patent Publication No. 11-38509

SUMMARY OF THE INVENTION

A first technical means of the reflection type screen of the present invention resides in a reflection type screen comprising a diffusion layer for restricting the diffusion of light; and a reflection layer for reflecting light which has transmitted through said diffusion layer.

A second technical means of the reflection type screen of the present invention resides in a reflection type screen, wherein light diffusion in a horizontal direction of the screen is relatively made larger than light diffusion in a vertical direction of the screen.

A third technical means of the reflection type screen of the present invention resides in a reflection type screen, comprising a diffusion layer for restricting the diffusion of light; a horizontal view angle increasing layer for increasing the horizontal view angle; and a reflection layer for reflecting light which has transmitted through said horizontal view angle increasing layer.

A fourth technical means of the reflection type screen of the present invention resides in a reflection type screen of the third technical means, wherein said horizontal view angle increasing layer is structured so that a multiplicity of convex ridges are successively arrayed, and the apex of each convex ridges is disposed on the side of said reflection layer.

A fifth technical means of the reflection type screen of the present invention resides in a reflection type screen of the fourth technical means, wherein said multiplicity of convex ridges being disposed so that the longitudinal direction of each said convex ridges is aligned with the vertical direction of said reflection type screen.

A sixth technical means of the reflection type screen of the present invention resides in a reflection type screen of the fourth technical means, wherein the pitch between said arrayed convex ridges is 200 μm or less, preferably 155 μm or less.

A seventh technical means of the reflection type screen of the present invention resides in a reflection type screen of the fifth technical means, wherein the pitch between said arrayed convex ridges is 200 μm or less, preferably 155 μm or less.

An eighth technical means of the reflection type screen of the present invention resides in a reflection type screen of any one of the fourth to seventh technical means, wherein said convex ridges of said horizontal view angle increasing layer are in the cylindrical shape in cross section.

A ninth technical means of the reflection type screen of the present invention resides in a reflection type screen of any one of the fourth to seventh technical means, wherein said convex ridges of said horizontal view angle increasing layer are in the prismatic shape in cross section.

A tenth technical means of the reflection type screen of the present invention resides in a reflection type screen of any one of the fourth to seventh technical means, wherein said convex ridges of said horizontal view angle increasing layer are in the wave shape in cross section.

An eleventh technical means of the reflection type screen of the present invention resides in a reflection type screen of any one of the third to seventh technical means, wherein said reflection layer is disposed on rear side of said horizontal view angle increasing layer in a non-bonding manner.

A twelfth technical means of the reflection type screen of the present invention resides in a reflection type screen of any one of the third to seventh technical means, wherein said reflection layer is bonded to the rear side of said horizontal view angle increasing layer via a bonding layer.

A thirteenth technical means of the reflection type screen of the present invention resides in a reflection type screen of the eleventh technical means, wherein said convex ridges of said horizontal view angle increasing layer are in the cylindrical shape in cross section, said reflection layer being disposed between the focal position of a cylindrical lens which is formed by said cylindrical shape and the apexes of said convex ridges.

A fourteenth technical means of the reflection type screen of the present invention resides in a reflection type screen of the twelfth technical means, wherein said convex ridges of said horizontal view angle increasing layer are in the cylindrical shape in cross section, said reflection layer being disposed between the focal position of a cylindrical lens which is formed by said cylindrical shape and the apexes of said convex ridges.

A fifteenth technical means of the reflection type screen of the present invention resides in a reflection type screen of the thirteenth technical means, wherein the distance between said reflection layer and the apexes of the convex ridges of said horizontal view angle increasing layer is in the order of $1/7$ or less of the distance between the focal position of said cylindrical lens and the apexes of the convex ridges of said horizontal view angle increasing layer.

A sixteenth technical means of the reflection type screen of the present invention resides in a reflection type screen of the fourteenth technical means, wherein the distance between said reflection layer and the apexes of the convex ridges of said horizontal view angle increasing layer is in the order of $1/7$ or less of the distance between the focal position of said cylindrical lens and the apexes of the convex ridges of said horizontal view angle increasing layer.

A seventeenth technical means of the reflection type screen of the present invention resides in a reflection type screen of the eleventh technical means, wherein the distance between said reflection layer and said horizontal view angle increasing layer is adjustable.

An eighteenth technical means of the reflection type screen of the present invention resides in a reflection type screen of the twelfth technical means, wherein said reflection layer is partially bonded to said horizontal view angle increasing layer and a medium having a refractive index different from index of said horizontal view angle increasing layer is disposed between said horizontal view angle increasing layer and said bonding layer at non-bonded portion therebetween.

A nineteenth technical means of the reflection type screen of the present invention resides in a reflection type screen of any one of the fourth to seventh technical means, wherein said reflection layer is formed on the surface of the arrayed convex ridges of said horizontal view angle increasing layer by a vacuum deposition or application technique.

A twentieth technical means of the reflection type screen of the present invention resides in a reflection type screen of any one of the fourth to seventh technical means, wherein said reflection layer is formed of a reflection sheet which is laminated on the surface of said convex ridges.

A twenty-first technical means of the reflection type screen of the present invention resides in a reflection type screen of any one of the third to seventh technical means, wherein said diffusion layer is formed of a transparent resin binder in which beads and/or pigments are dispersed as a diffusion material.

A twenty-second technical means of the reflection type screen of the present invention resides in a reflection type screen of the twenty-first technical means, wherein said diffusion layer comprises a plurality of layers which are different in at least one of particle size, kind, content and granularity of said diffusion material and wherein the surface roughness and the inner haze factor of said diffusion layer is independently controlled.

A twenty-third technical means of the reflection type screen of the present invention resides in a reflection type screen of any one of the third to seventh technical means, wherein said reflection type screen comprises a tint layer containing a tint, said tint layer being laminated on the side of the projected image light incident side with respect to said horizontal view angle increasing layer.

A twenty-fourth technical means of the reflection type screen of the present invention resides in a reflection type screen of any one of the third to seventh technical means, wherein said reflection type screen comprises a black matrix layer which is formed with a black matrix, said black matrix layer being laminated on the projected image light incident side with respect to said horizontal view angle increasing layer.

A twenty-fifth technical means of the reflection type screen of the present invention resides in a reflection type screen of any one of the third to seventh technical means, wherein said reflection type screen comprises a substrate made of a transparent resin sheet, said substrate being laminated on the projected image light incident side with respect to said horizontal view angle increasing layer.

A twenty-sixth technical means of the reflection type screen of the present invention resides in a reflection type screen of any one of the fourth to seventh technical means, wherein said horizontal view angle increasing layer consists of a sheet substrate on which an array of said convex ridges are formed.

A twenty-seventh technical means of the reflection type screen of the present invention resides in a reflection type screen for receiving light projected from a projecting device which is disposed in front of said screen to form projected images, said screen being used indoors in which external disturbing light is mainly incident from above, comprising a light diffusion portion; and a view angle increasing and reflection portion which reflects projected light having transmitted through said light diffusion portion, in such a direction that the view angle is increased in a horizontal direction and reflects in a downward direction external disturbing light having transmitted through said light diffusion portion.

A twenty-eighth technical means of the reflection type screen of the present invention resides in a reflection type screen of the twenty-seventh technical means, wherein the view angle of said screen is 15° or more.

A twenty-ninth technical means of the reflection type screen of the present invention resides in a reflection type screen of the twenty-seventh or twenty-eight technical means, wherein the distance between said screen and the observer is 1.5 m or more.

A thirty technical means of the reflection type screen of the present invention resides in a reflection type screen of the twenty-seventh or twenty-eight technical means, wherein said view angle increasing and reflection portion is formed with concaves and convexes which are arrayed in a horizontal direction and said concaves and convexes being extended in a vertical direction of said reflection type screen.

A thirty-first technical means of the reflection type screen of the present invention resides in a reflection type screen of the twenty-seventh or twenty-eight technical means, wherein said view angle increasing and reflection portion comprises a view angle increasing layer having concaves and convexes thereon; and a reflection layer which is disposed on the rear side of said view angle increasing layer.

BRIEF DESCRIPTION OF THE DRAWINGS

FIG. 53 is a table showing a result of brightness measurement in each brightness measuring position on the reflection type screen.

BEST MODE FOR EMBODYING THE INVENTION

Figure 1A:
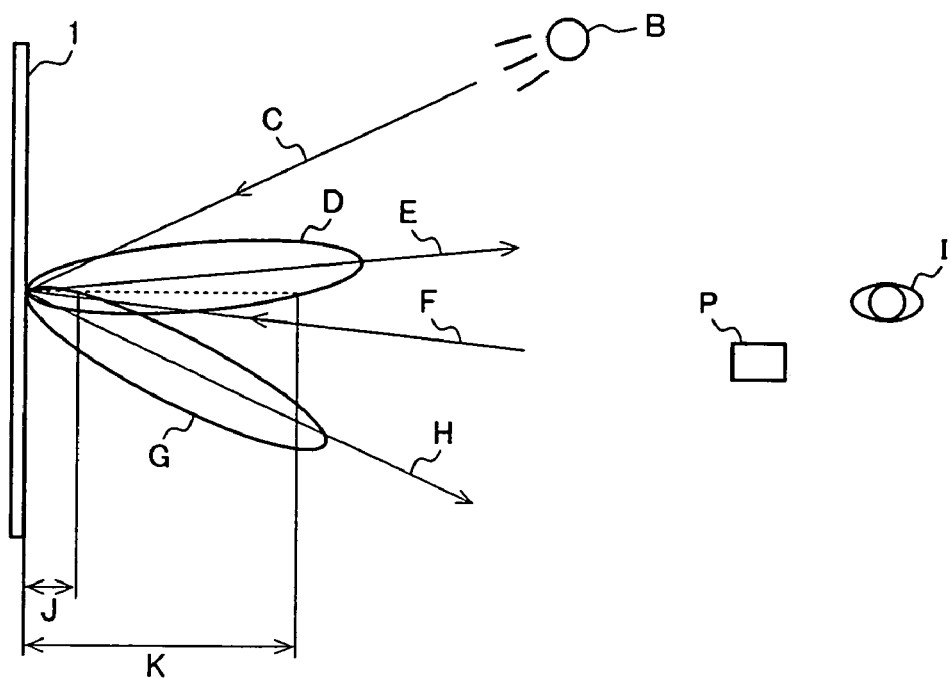
FIG. 1A is a view explaining the behavior of the illumination light and the light projected from the projecting device on the screen in one embodiment of the reflection type screen of the present invention.

Now, the present invention will be described by way of embodiments of the reflection type screen with reference to the annexed drawings. Throughout the drawings components having similar functions are designated with same reference numerals and repetition of the description thereof will be omitted. The reflection type screen of the present invention has a high contrast even in a light room and an excellent horizontal view angle and CCR. The contrast of the images displayed on the screen in a light room is lowered due to the fact that light projected from the projecting device as well as light of indoor illumination causing external disturbances is reflected toward the observer. Accordingly, the contrast in a light room can be improved by separating the reflection direction of the light from the projecting device from that of the external disturbing light for illumination by using the difference between their incident angles with respect to the screen, so that only the reflected light which is projected by the projecting device is impinged toward the observer as much as possible.

In order to achieve the above-mentioned functions the light projected from the projecting device which is disposed in front of the screen is reflected on the front face of the screen by the specular reflection and the external disturbing light from illumination light which is incident to the screen in an inclined direction from an upper position is reflected in an inclined and downward direction, so that the contrast in a light room can be improved.

Since no image can be viewed if the incident light is only specifically reflected and no diffusion occurs on the imaging face at this time, it is necessary to diffuse the projected light on the imaging face.

Figure 1B:
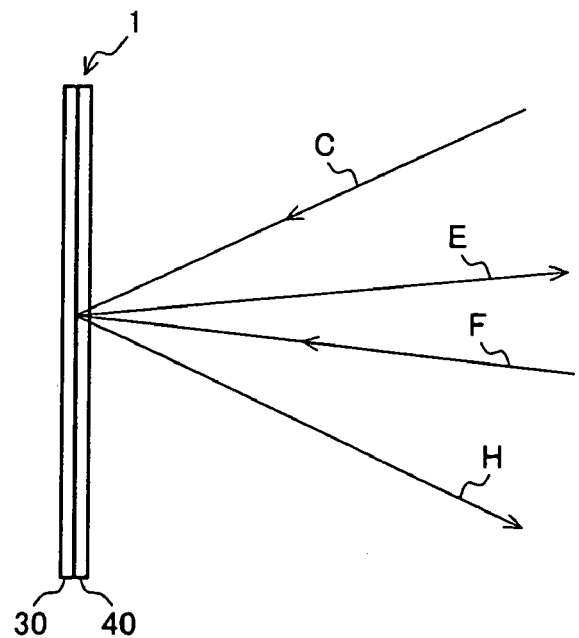
FIG. 1B is a view explaining one embodiment of the reflection type screen of the present invention and showing one example of the structure of the reflection type screen having a weakly diffusing layer and a reflection layer.

FIGS. 1A and 1B are views explaining one embodiment of the reflection type screen of the present invention. FIG. 1A shows behavior of the illumination light and projected light from the projecting device on the screen having weak diffusion characteristics on the reflection and imaging face. FIG. 1B shows an exemplary structure of the reflection type screen having a weak diffusion layer, the diffusion degree of light of which is suppressed and a reflection layer. A first embodiment of the reflection type screen of the present invention comprises a diffusion layer 40 in which its diffusion degree is suppressed and a reflection layer 30 for reflecting light which was incident on the reflection screen and has transmitted through the diffusion layer 40 as shown in FIG. 1B. The diffusion layer 40 restricts the diffusion of external disturbing light in vertical direction, which is incident from the upper position of the reflection type screen 1. This prevents the lowering of contrast due to the reflection of external disturbing light in a direction toward a viewer I.

When the illumination light C from a light source B is reflected on a reflection type screen 1 in a direction H, the diffusion of the reflected light is designated as "G" in FIG. 1A. The component of the diffused light in a direction toward an observer I is designated as "J". When light F projected from a projecting device P is reflected on the reflection type screen 1 in a direction E, the diffusion of the reflected light is designated as "D" and the component of the diffused light in a direction toward the observer I is designated as observer I is designated as "K". At this time the ratio of the lengths of J to K is representative of a measure of the influence of the external light.

Figure 2:
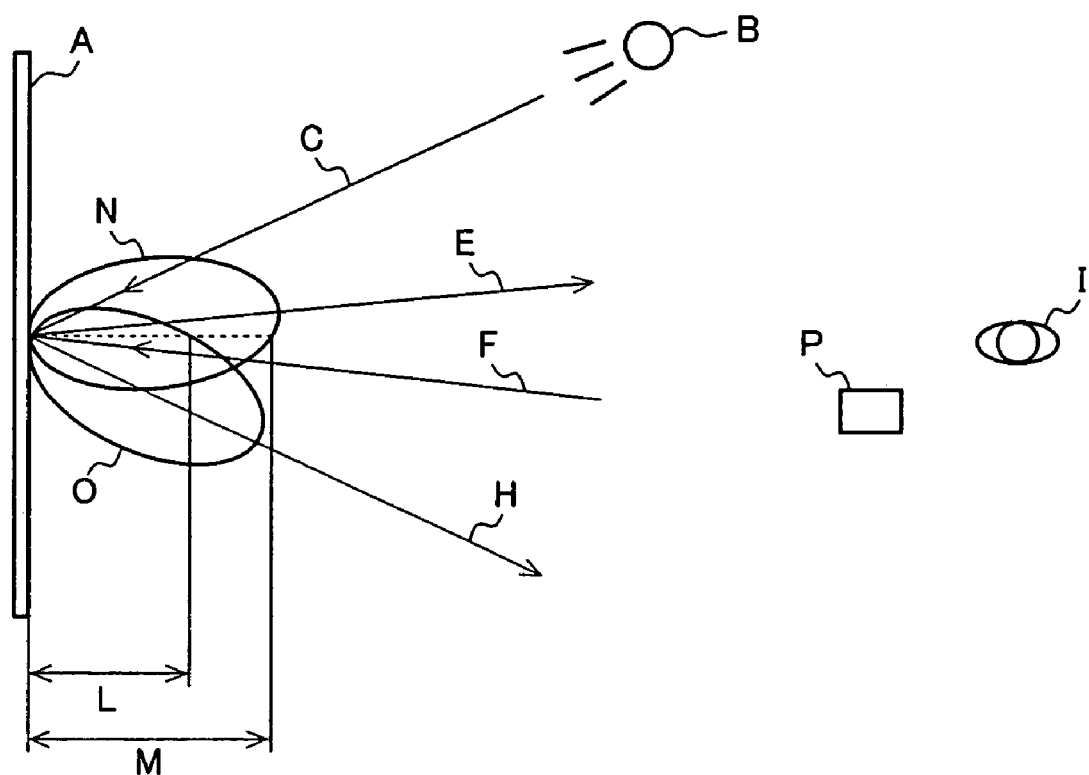
FIG. 2 is a view explaining the behavior of the illumination light and the light projected from the projecting device on the mat or textured screen.

An example in which a mat screen having a high diffusion degree is used as the diffusion layer in lieu of the screen having the above-mentioned weak diffusion layer will be described with reference to FIG. 2. When the illumination light C from a light source B is reflected on a screen A in a direction H, the diffusion of the reflected light is designated as "O". The component of the diffused light in a direction toward an observer I is designated as "L". When light F projected from a projecting device P is reflected on the screen A in a direction E, the diffusion of the reflected light is designated as "N" and the component of the diffused light in a direction toward the observer I is designated as "M". At this time, the ratio of the lengths of L to M is representative of a measure of the influence of the external light.

The reflection strength ratio when the projected light is completely diffused on the screen becomes circular independently of the incident angle. The radius of the circle which is representative of the reflection strength ratio differs depending upon the incident illuminance. The shape of the reflection strength ratio on the mat screen is slightly elongated in comparison with the circular shape of the above-mentioned complete diffusion as shown in FIG. 2. On the screen of weak diffusion, the shape of the strength ratio of the diffusion light is considerably elongated as shown in FIG. 1A. The diffusion in which the shape of the reflection strength ratio of the diffusion light becomes elongated in comparison with circular is referred to as "weak diffusion", and "to restrict diffusion".

Providing the screen with a light diffusion layer on the imaging surface thereof to enabling the observer to view the image has been commonly conducted. One of the features of the present invention resides in that an effect the shape of the reflection strength ratio changes from circle to elliptical (D, G in FIG. 1 and O, N in FIG. 2) depending upon the diffusion degree on the light diffusion layer is advantageously used for improving the contrast of projected light in a light room in which a light source such as illumination light is above the screen.

If the diffusion on the screen is excessively increased on the reflection type screen, external disturbing light can not be distinguished from the projected light, leading to lowering of the contrast. Accordingly, it is necessary to provide a weak diffusion layer in which the diffusion degree of the imaging face is suppressed to some extent.

The first embodiment of the reflection type screen of the present invention comprises the diffusion layer 40 having weak diffusion characteristics in which the light diffusion degree is suppressed and a reflection layer 30 for reflecting light having passed through the diffusion layer 40 as shown in FIG. 1B. The diffusion layer 40 focuses projected images and has view angle characteristics depending upon the diffusion degree. The reflection layer 30 has a capability to increase the reflection efficiency of light projected from the projecting device. The diffusion layer 40 also reduces the ghost image of a projecting lens due to the reflection on the screen surface and hot spots or hot bands due to insufficient diffusion.

As mentioned above, the contrast between the projected light and the external disturbing light from above the screen can be improved by utilizing the reflection strength ratio defined by difference in diffusion degree. A preferable contrast depending upon the strength of the external disturbing light can be obtained by providing a weak diffusion layer having an appropriate value.

The reflection layer 30 also contributes to an increase in the reflection factor as well as an improvement in contrast ratio due to the fact that the reflection layer 30 reflects in a downward direction external disturbing light having transmitted through the diffusion layer 40 from the bulb so that it will not be incident upon viewer's eyes.

In the reflection type screen of the present embodiment comprising the diffusion layer 40 and reflection layer 30, the diffusion layer 40 has weak diffusion characteristics. The most preferable weak diffusion characteristics are so that transmission factor for all light is not less than 80% and haze factor is 75±10%. The reflection layer 30 is formed of aluminum and has a mirror-finished surface. Lowering of contrast due to external disturbing light from above the screen and insufficient diffusion can be prevented by using the weak diffusion layer having such characteristics, so that projected images having an excellent contrast can be obtained. If the angle of the light incident upon the screen is not so different at the central and peripheral areas in view of the relationship between the projection distance and the screen size, projected images having an excellent contrast can be obtained when they are viewed in front of the screen. The diffusion layer 40 having weak diffusion characteristics and reflection layer 30 may comprise those in each of embodiments which will be described hereafter.

Now, other embodiments of the present invention, which are provided with a feature of increasing the view angle in a horizontal direction will be described. Since a large difference in a horizontal direction between the angles of the light incident upon the screen at the peripheral area and the central area on a large size screen having an aspect ratio of 16:9 which is becoming predominant will occur, a horizontal diffusion is necessary so that a view angle which is enough to cover the difference in angle can be obtained.

Next feature of the present invention resides in that a horizontal view angle increasing reflection portion, which reflects the light having transmitted through the diffusion layer 40 so that the light is positively diffused in a horizontal direction (the reflection portion corresponding to the horizontal view angle increasing layer and reflection layer in the embodiments which will be described hereafter) is provided. This can increase the horizontal view angle and prevent the deterioration of CCR.

If light projected from a projecting device which is incident upon a large size screen will transmit through prisms depending upon the incident angle as mentioned above in case which an absorbing layer is provided as shown in the cited specification 1, the transmitted light will be absorbed and will not be reflected. In contrast to this, the arrangement of the present invention can be prevent the deterioration of CCR since most of the light which is incident upon the screen will be reflected.

Further embodiments of the reflection type screen of the present invention which will be described hereafter essentially comprises the diffusion which forms the images of the projected light and the horizontal view angle increasing layer for increasing the horizontal view angle, which is added to the reflection layer for increasing the reflection efficiency of the light projected from the projecting device.

The diffusion layer forms the images of the projected light and improves the contrast ratio by providing the screen with optimal diffusion characteristics. The diffusion layer also reduces the formation of the ghost image of the projector lens due to reflection on the screen surface and the formation of hot spots or hot bands due to the insufficient diffusion. If the diffusion degree of the projected light on the imaging face is excessively increased, the projected light could not be distinguished from the external disturbing light in a light room, resulting in lowering of contrast. Accordingly, the diffusion layer should be weak diffusion layer in which the degree of the light diffusion is suppressed. In the embodiments of the present invention having a horizontal view angle increasing layer, which will be described, the diffusion layer having diffusion characteristics (transmission factor for all light is not less than 80% and haze factor is 75±10%) can be preferably applied. Without being limited to this, the diffusion characteristics may be appropriately selected, which provide an optimal contrast depending upon the specifications of the screen and the projecting device or the manner of using the screen.

Figure 3:
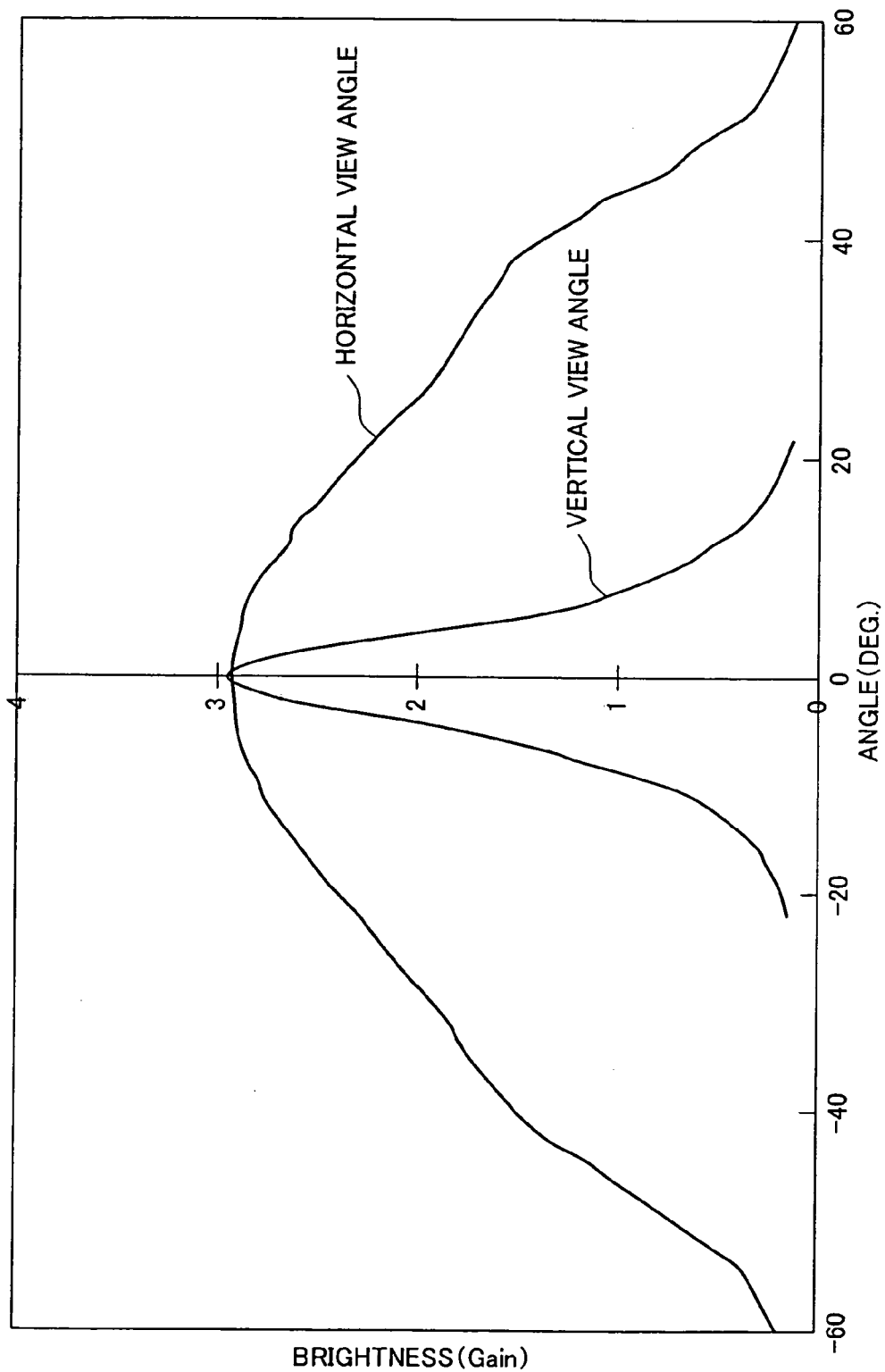
FIG. 3 is a view showing one example of the view angle characteristics in horizontal and vertical directions on the reflection type screen of the present invention.

Referring now to FIG. 3, there is shown an example of the horizontal and vertical view angle characteristics on the reflection type screen of the present invention comprising a horizontal view angle increasing layer. Abscissa axis denotes view angle (degree) and ordinate axis denotes brightness (Gain). The difference between horizontal and vertical characteristics is shown. The reflection type screen of the present invention is anisotropic in view angle as shown in the drawing and exhibits a large difference between horizontal and vertical characteristics. Due to such characteristics, a reflection type screen having a wide view angle in a horizontal direction in which a high contrast is achieved by suppressing the reflection of the external disturbing light from illumination lights disposed in elevated position toward the observer can be provided.

Figure 4:
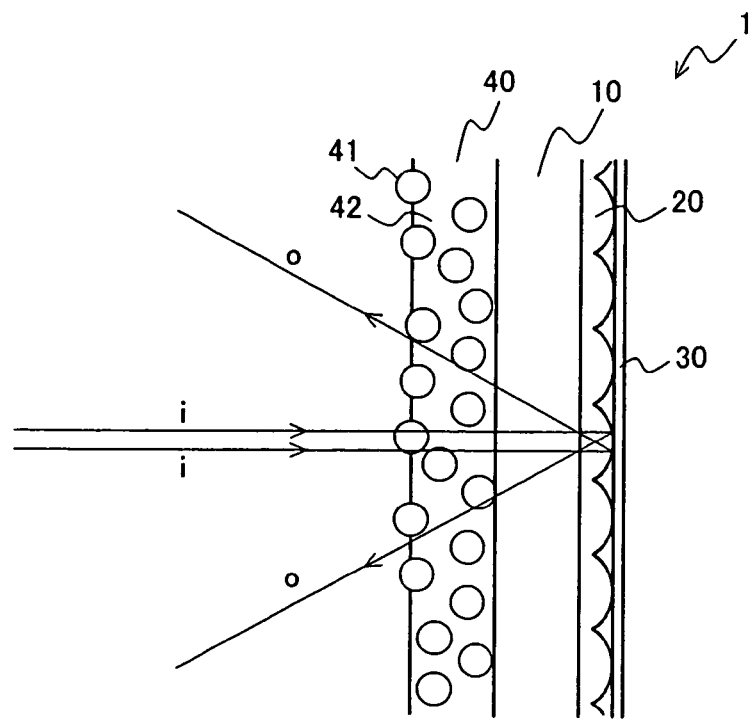
FIG. 4 is a view explaining a further embodiment of the reflection type screen of the present invention.
Figure 5:
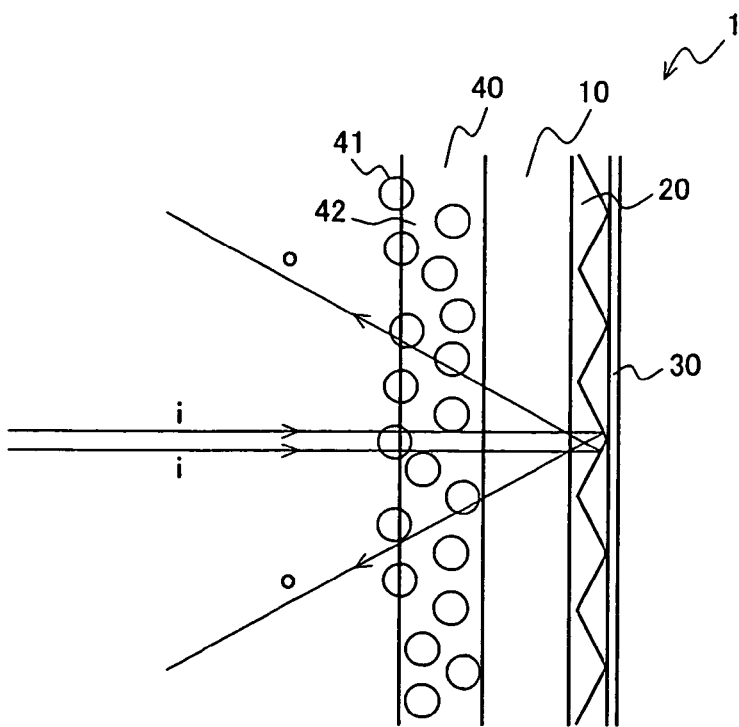
FIG. 5 is a view explaining a further embodiment of the reflection type screen of the present invention.
Figure 6:
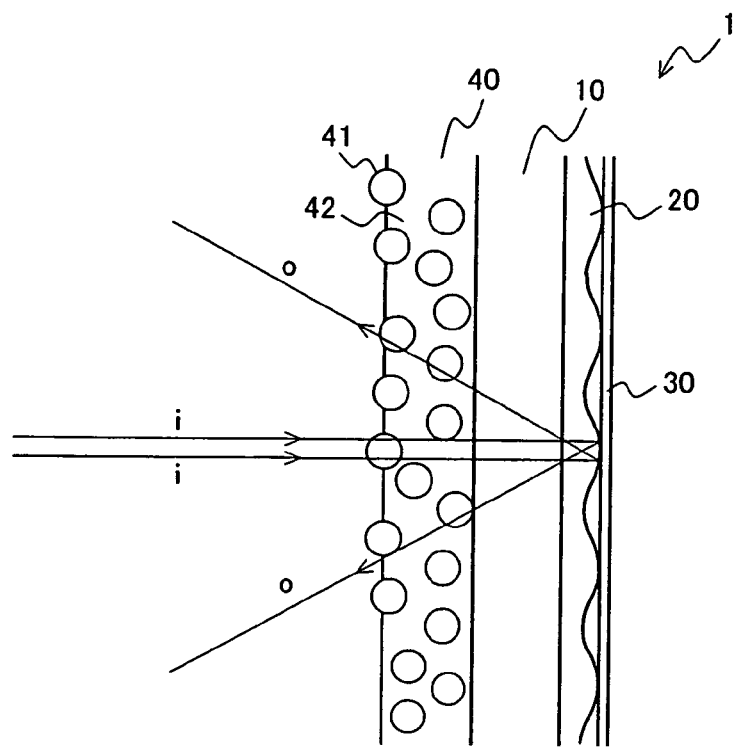
FIG. 6 is a view explaining a further embodiment of the reflection type screen of the present invention.

FIGS. 4 through 6 are views explaining other embodiments of the reflection type screen of the present invention. The structure of the horizontal section of the screen is schematically illustrated. References i and o schematically denote optical paths for explaining the function of the present invention. The same is applied to the embodiments which will be described. In FIGS. 4 through 6, a reference numeral 1 denotes a reflection type screen; 10 a transparent resin sheet; 20 a horizontal view angle increasing layer; 30 a reflection layer; 40 a diffusion layer; 41 acrylic resin beads and 42 a transparent resin binder.

The reflection type screen 1 comprises the diffusion layer which is formed on one of the sides of the transparent resin sheet 10 which is a substrate. The horizontal view angle increasing layer 20 is formed on the other side of the transparent resin sheet 10. The reflection layer 30 is disposed on the external surface of the horizontal view angle increasing layer. The light which is projected from a projecting device is incident on the diffusion layer 40. In other words, in the reflection type screen of the present embodiment, the diffusion layer 40, transparent resin sheet 10, horizontal view angle increasing layer 20 and the reflection layer are stacked in order from the side to which the projected image light is incident.

A diffusion sheet using a transparent resin binder 42 in which the acrylic resin beads 41 are dispersed as a diffusion material may be preferably used as the diffusion layer 40 in order to achieve a weak diffusion and high light transmission factor. The transparent resin binder 42 is a colorless material having excellent optical characteristics and high transmission factor. The surface of the diffusion layer 40 to which the projected light is incident is changed into mat-like surface by using an acrylic beads binder. The mat surface causes random reflection of the incident light, so that reflection on the surface at incident portion is reduced to provide excellent images.

The above-mentioned diffusion sheet having a thickness of, for example, about 100 µm, a transmission factor for all light of not less than 80% and a haze rate of about 75±10% may preferably be used.

As the diffusion material which is dispersed in the diffusion layer 40, urethane beads or styrene beads may be used as well as the above-mentioned acrylic resin beads. Further pigment type diffusion material may be used. Since the pigment type diffusion material absorbs light, which reduces the efficiency, in turn the transmission factor, use of the above-mentioned beads is more preferable. Although the pigment type diffusion material can provide an increased diffusion degree. Necessary diffusion degree may be provided by the beads diffusion material since the present invention requires no strong diffusion. The higher transmission factor of the diffusion layer 40 becomes, the more the incident light which has transmitted through the diffusion layer 40 reaches the horizontal view angle increasing layer 20 so that the light returning to the observer or viewer is more influenced by the horizontal view angle increasing layer 20.

The diffusion layer 40 is laminated on the side of the transparent resin sheet 10 acting as a substrate to which the projected light is incident. Any adhesives which will not lower the optical characteristics may be used for this lamination.

Alternatively, any binder material to which the diffusion agent is added may be applied on the surface of the transparent resin sheet 10 to form a layer after curing thereof. At this time, a photocurable or thermosetting binder material may be used, or a binder material which is swelled or solved into a solvent may be applied on the transparent resin sheet 10 and thereafter the solvent is evaporated to form a layer.

Alternatively, in order to form the diffusion layer 40, a technique to extruder powders or beads of the transparent resin binder 42 which is mixed with the light diffusion material through a T-die by means of an extruder for forming a layer in a molten or semi-molten state on the surface of the transparent resin sheet 10 and thereafter cooling it.

The horizontal view angle increasing layer 20 is capable of increasing the view angle in a horizontal direction and made of a sheet on one of the side of which convex ridges are successively arrayed. The horizontal view angle increasing layer 20 is formed so that the apex of each ridge is located on the side opposite to the side to which the projected light is incident.

The above-mentioned sheet on which continuous convex ridges are arrayed may include a lenticular lens sheet on which cylindrical shapes are successively arrayed, a prism sheet in which each convex ridge is prism shape in section, or a sheet in which each convex ridge is waved in section. An expression "continuous convex ridges are arrayed" means an arrangement in which convexes and concaves are arrayed in a horizontal direction and they are extended in a vertical direction on the reflection screen.

FIG. 4 shows an exemplary structure of the horizontal view angle increasing layer 20 made of the above-mentioned lenticular lens sheet. FIG. 5 shows an exemplary structure of the horizontal view angle increasing layer 20 made of the prism sheet. FIG. 6 shows an exemplary structure of the horizontal view angle increasing layer 20 made of the wave sheet. It is preferable that the sheet having lenticular, prism, wave section has a thickness of 200 μm or less. The pitch between the convex ridges is preferably 200 μm or less (1/10 of the pixel size or less, more preferably 155 μm or less). In case of prism shape, the apex angle is preferably 100°±10°. If the prism has an apex angle of 90°, the light which is incident to the prism will reflected back on the prism surface. The light can be collected to the viewer which is behind the projecting device by increasing the apex angle to 100°±10°. It may be understood that the wave form is obtained by curving the apexes and valleys of the prisms.

As shown by optical paths i and o in FIG. 4, the horizontal view angle increasing layer 20 contributes to only the diffusion characteristics in a horizontal direction. The screen is structured so that the extending direction (longitudinal direction of each convex ridge) which is perpendicular to the array direction of the convex ridge such as lenticular lenses is aligned with the vertical direction when the screen is installed. This structure increases the diffusion degree in a horizontal direction for increasing the view angle characteristics in a horizontal direction. This function of the horizontal view angle increasing layer 20 causes anisotropic performance in the reflection characteristics of the screen in a vertical direction and horizontal direction (that is diffusion characteristics) to prevent lowering of contrast due to external disturbing light in a vertical direction without preventing the diffusion characteristics which are restricted by the weak diffusion layer 40 in a vertical direction and enhances the view angle characteristics in a horizontal direction of the projected image light by diffusing the reflected light so that the view angle is increased in a horizontal direction. In other words, the distribution of the view angle of the screen in a horizontal direction changes by the presence of the horizontal view angle increasing layer 20 whereas the distribution of the view angle in a vertical direction does not change. Precisely, the magnitude of the peak value of the gain changes although the distribution of the view angle in a vertical direction does not change. Since the projecting device has a focal depth, it has an imaging range at its focal depth. Therefore, the projected light is imaged twice due to reflection on the reflection layer 30 of the present reflection type screen.

When optimization of the shape and curvature of the convex ridges of the horizontal view angle increasing layer 20 is to be achieved, it is also necessary to consider the distribution of the diffusion which also gives an influence the view angle and the light collection (stray light by total reflection) in the diffusion layer 40. It is also necessary to shorten the optical path length between the first and second images and to pay attention to the distribution of reflected light in the diffusion layer 40.

Light which is incident on the horizontal view angle increasing layer 20 transmits therethrough while being refracted on the convex ridge face and is reflected on the reflection layer 30 and is incident upon the convex ridge face again and exits therefrom after being subjected to the action of the convex ridge face. At some incident angle, the incident light is reflected and the reflected light is then incident upon the other portion of the convex ridge face and is subjected to actions such as refraction and reflection. Depending upon the shape of the convex ridge, some light is reflected on the convex ridge face and is projected on the front face of the screen without being passed to the reflection layer 30.

If the convex ridges have cylindrical sections, refraction occurs along the cylindrical face thereof. Accordingly, the light which is reflected by the convex ridges and reflection layer 30 continuously spreads. Therefore, variations in CCR are less. With cylindrical shape, the horizontal view angle can be made wider than that with prism shaped sections. The convex ridges having prism shaped sections provide higher regression, but increase the view angle by the optimization of the apex angle and Fresnel reflection by the reflection layer 30. The convex ridges having waved sections provide such an effect similar to those having cylindrical sections since the apexes can be considered rounded apexes, that reflection characteristics in which light continuously spreads in comparison with normal reflection.

The reflection layer 30 is provided to increase the utilization efficiency for the image light projected from the projecting device. The reflection layer 30 comprises a planar reflection plate having a high reflection factor on the surface thereof, which is disposed on the side of the horizontal view angle increasing layer 20, on which the convex ridges are formed. In the present embodiment, the reflection layer 30 is only required to be in the vicinity of the horizontal view angle increasing layer 20. It is not necessary to laminate them with an adhesive layer. For example, a reflection plate having a given degree of rigidity is used as the reflection layer 30. The reflection plate which is formed on the transparent resin sheet may be secured to the frame of the reflection type screen 1. The reflective surface of the reflection layer 30 can be formed by coating the substrate with, for example, silver or aluminum by a vacuum deposition or application technique.

When the reflection type screen is manufactured by using a reflection plate as mentioned above, the central portion of the reflection plate is preliminarily biased toward the horizontal view angle increasing layer 20 to curve the reflection plate, so that deterioration of characteristics of the reflection plate due to aging can be mitigated. If the gap between the reflection layer 30 and the horizontal view angle increasing layer 20 increases with aging, random reflection in the reflection layer 30 and the horizontal view angle increasing layer 20 becomes stronger, so that diffusion characteristics may change. In order to prevent this, the reflection plate is curved in such a direction that the central portion of the reflection plate projects toward the horizontal view angle increasing layer 20. Under this condition, a peripheral frame of the reflection plate is secured so that the reflection plate is in close contact with the horizontal view angle increasing layer 20. Thus, widening of the gap between the reflection plate and horizontal view angle increasing layer 20 can be suppressed by securing the reflection plate while the reflection plate holds an inner strain which causes the reflection plate to be in close contact with the horizontal view angle increasing layer 20.

The foregoing technique may also be applied to members on the side of the horizontal view angle increasing layer 20. In this case, the horizontal view angle increasing layer 20 is curved so that the central portion thereof projects toward the reflection plate and then they are required to be laminated and secured to each other. Alternatively, both reflection plate and horizontal view angle increasing layer 20 may be curved by the above-mentioned technique and laminated and secured to each other.

Figure 7:
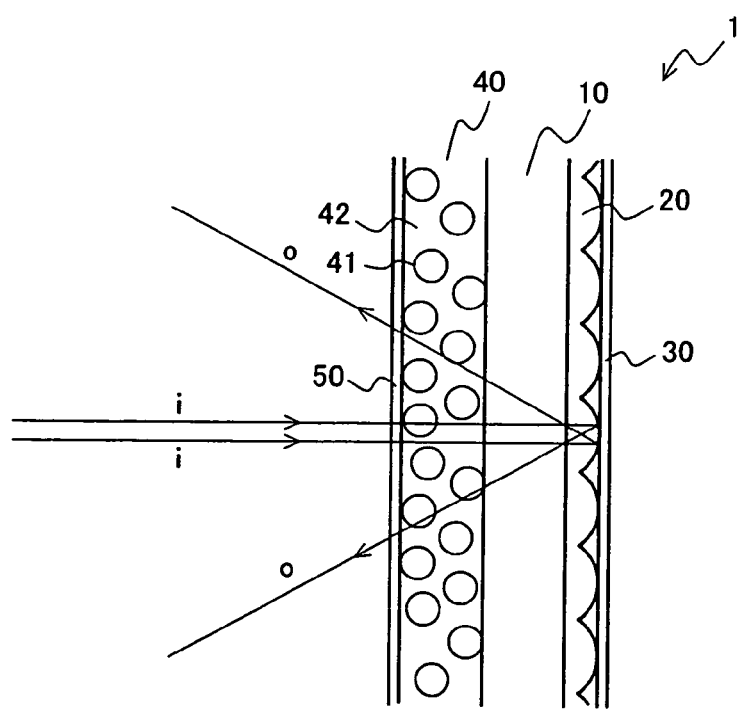
FIG. 7 is a view explaining a further embodiment of the reflection type screen of the present invention.

Referring now to FIG. 7, there is schematically shown the structure of a further embodiment of the reflection type screen of the present invention. The structure of the cross section of the screen is illustrated. The reflection type screen of the present embodiment further comprises a tinting (TINT) layer 50 which is formed on the light incident side of the diffusion layer 40 in addition to the structure of FIG. 4. The TINT layer 50 absorbs the external disturbing light component for enhancing the contrast.

If the transmission factor of the TINT layer 50 is made excessively low, then the brightness of the screen would be lowered. Accordingly, it is preferable that the transmission factor be about 70%. It is necessary to choose the TINT layer 50 having a flat transmitting spectrum distribution which is not characteristic in the visible range and to choose TINT layer 50 having a higher transmission factor only on the long wave length side or on both the long and short wave length side to compensate for the spectrum distribution of the light emitted from the projecting device and the spectrum reflection distributions of the other members of the screen.

As to the TINT layer 50, a method of directly dying the sheet or applying pigment on its surface may be envisaged. In the present embodiment, for ease of color conditioning and transmission control, dying with water soluble die will be applied. Briefly, in the present invention, the TINT layer 50 is formed by applying a water soluble dye on the surface of the diffusion layer 40 for dying. The TINT layer has a thickness of 25 µm. Alternatively, a resin sheet which is added with a tint or a resin sheet which is preliminarily formed with a TINT layer on the surface thereof may be used as the TINT layer 50 and be laminated on the diffusion layer 40.

Figure 8:
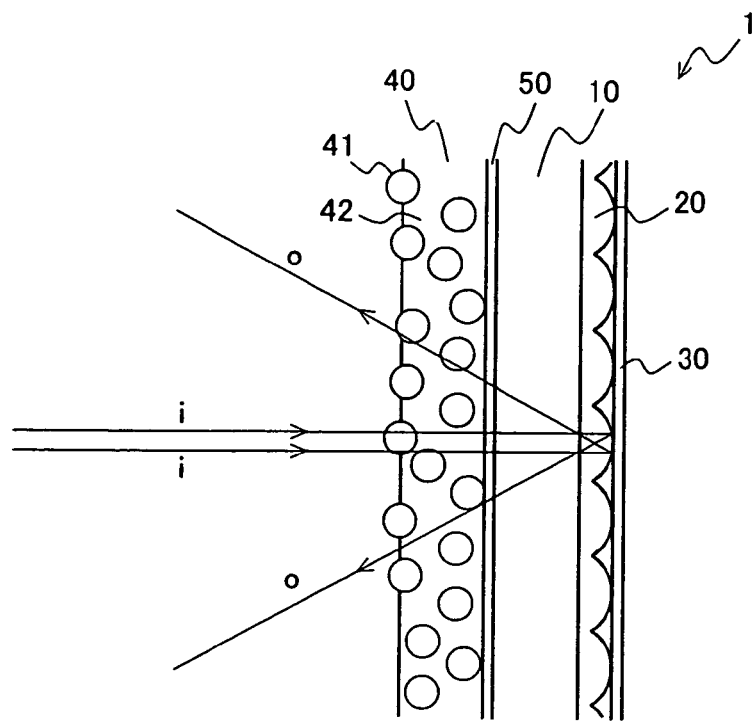
FIG. 8 is a view explaining a further embodiment of the reflection type screen of the present invention.
Figure 9:
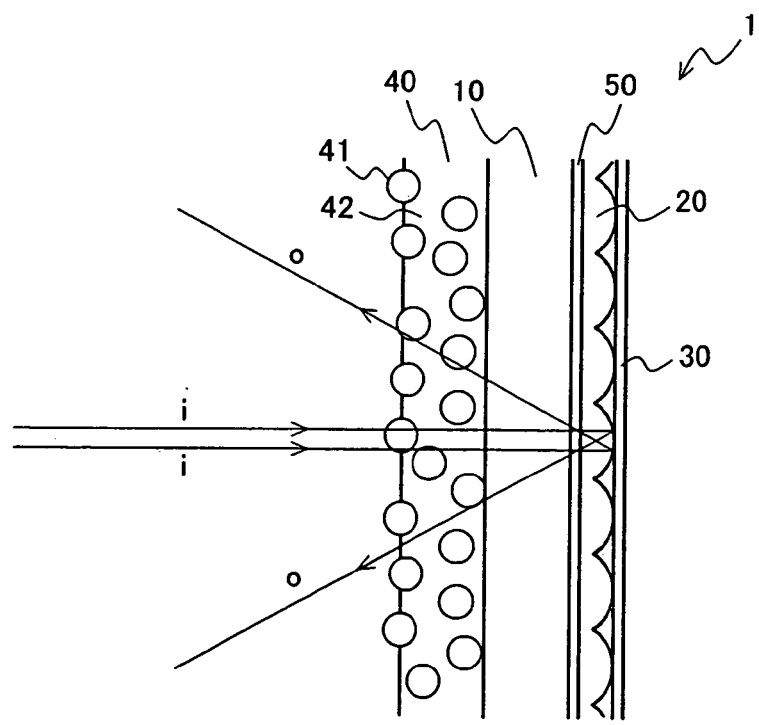
FIG. 9 is a view explaining a further embodiment of the reflection type screen of the present invention.

Alternatively, the TINT layer 50 may be sandwiched between the transparent resin sheet 10 and the diffusion layer 40 as shown in FIG. 8 or between the transparent resin sheet 10 and the horizontal view angle increasing layer 20 as shown in FIG. 9. If the TINT layer 50 is formed on the surface of the diffusion layer 40 by application in the arrangement of FIG. 7, textured surface of the diffusion layer is made flat by the material of the TINT layer, so that the haze factor which is caused by the textured surface of the diffusion layer is lowered. The haze factor of the whole of the diffusion layer, which is inherently exhibited by the textured surface of the diffusion layer and the diffusing agent within the diffusion layer will be lowered. Accordingly, it is necessary to design the diffusion characteristics of the diffusion layer 40 in consideration of changes in the characteristics. In the arrangement shown in FIG. 8, the disposing of the TINT layer 50 is most preferable. In this case, the black in the image is emphasized, so that the displayed image looks sharper.

Figure 10:
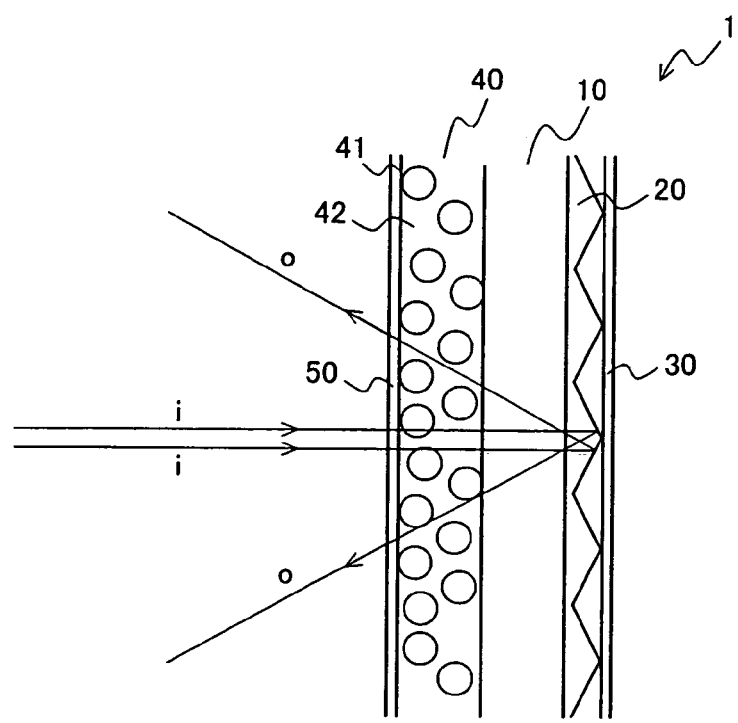
FIG. 10 is a view explaining a further embodiment of the reflection type screen of the present invention.
Figure 11:
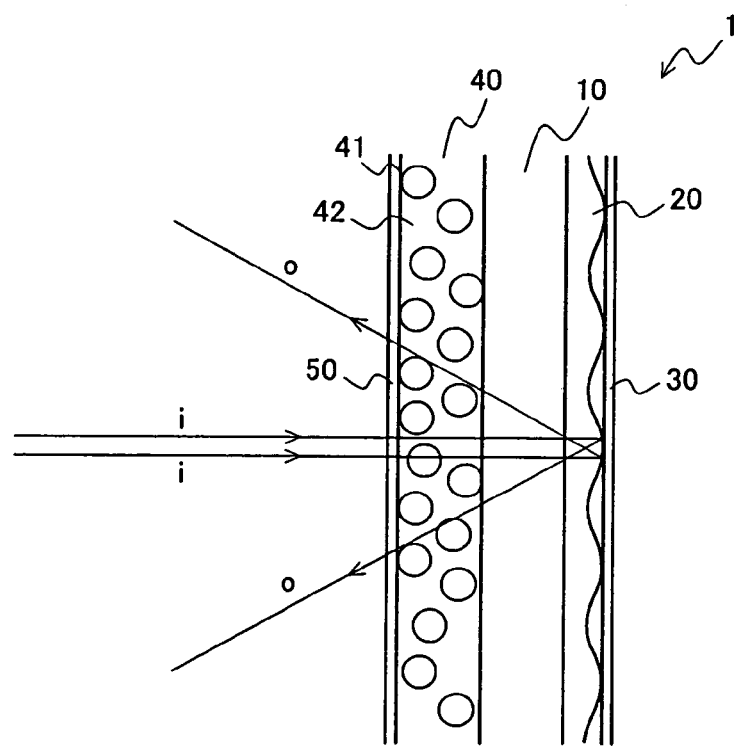
FIG. 11 is a view explaining a further embodiment of the reflection type screen of the present invention.

Exemplary structures including the TINT layer 50 may be applied to the structures using the horizontal view angle increasing layers 20 having a prismatic shape and a wave shape which are shown in FIGS. 5 and 6, respectively. Exemplary structures each having the TINT layer 50 on the light incident side of the diffusion layer 40 and the horizontal view angle increasing layer 20 made of the prismatic sheet and waved sheet are illustrated in FIGS. 10 and 11, respectively.

Figure 12:
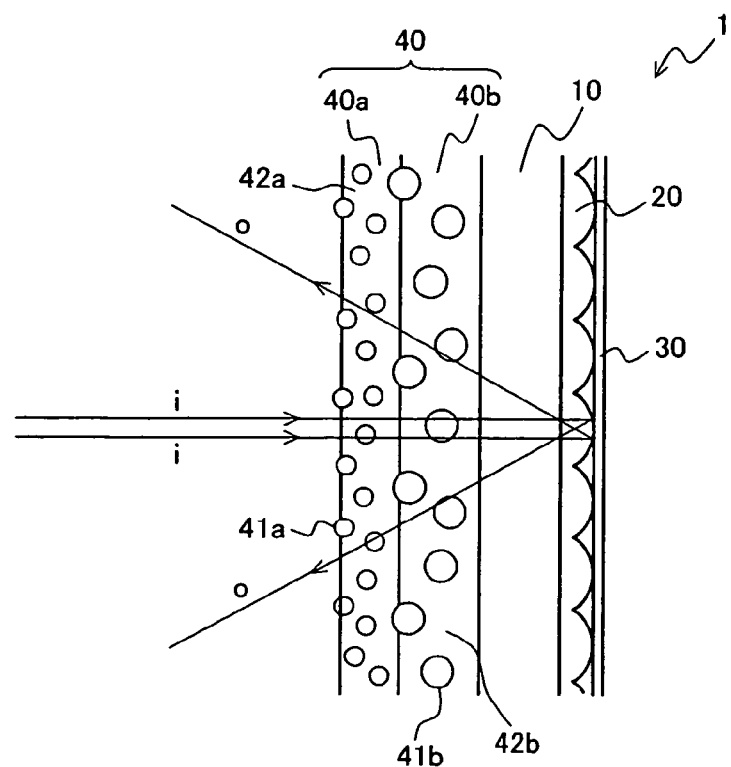
FIG. 12 is a view explaining a further embodiment of the reflection type screen of the present invention.

FIG. 12 is a view explaining a further embodiment of the reflection type screen of the present invention. The structure of the cross section of the screen is illustrated. In FIG. 12, reference numerals 40a, 40b denote the diffusion layer, 41a, 41b denote acrylic resin beads which are used as the diffusing means, 42a, 42b denote transparent resin binders.

In the structure of the foregoing embodiments, the diffusion layer 40 is a single-layered structure while it is multi-layered structure in the present embodiment. Two diffusion layers 40a, 40 are laminated. The roughness of the light incident surface of the diffusion layer 40 and the haze factor of the diffusion layer 40 (inner haze factor independently of the surface roughness) can be controlled by changing the particle sizes, materials, contents and the particle size distribution of the acrylic resin beads 41a, 41b which are dispersed in the diffusion layers 40a, 40b. The particles size distribution may be controlled by changing the mixing ratio of beads having a plurality of particle sizes.

The light which is reflected on the surface of the diffusion layer 40a is diffused by properly increasing the surface roughness of the diffusion layer 40a on its light incident side for optimization, so that the ghost image of the projecting device or the indoor fluorescent lamp can be made difficult to be viewed by the observer.

Occurrence of the hot spots or hot bands which are caused by the projector lens of the projecting device can be decreased by increasing the haze factor of the diffusion layer 40b on the reflection side thereof.

Double-layered diffusion layer 40 as shown in FIG. 12 is applicable to all diffusion layers 40 of the foregoing embodiment.

Figure 13:
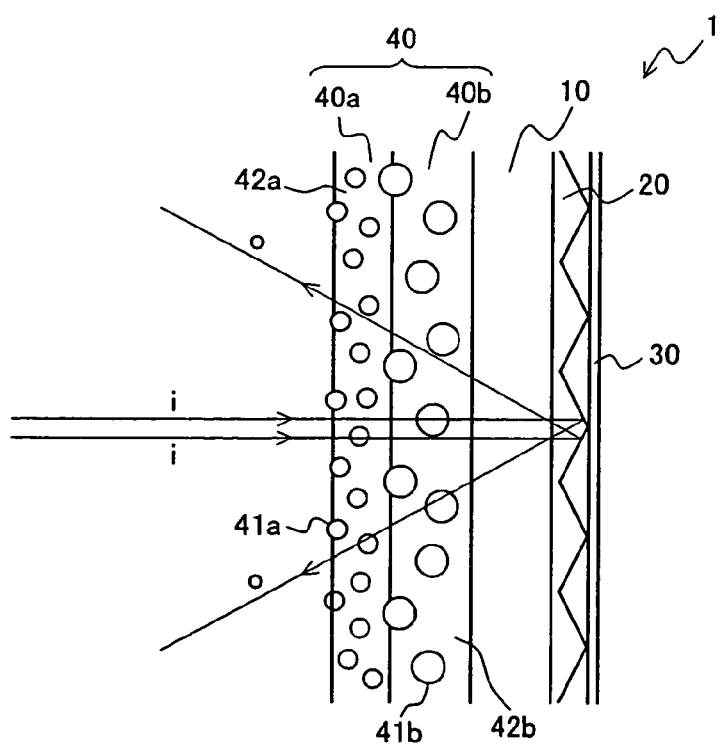
FIG. 13 is a view explaining a further embodiment of the reflection type screen of the present invention.
Figure 14:
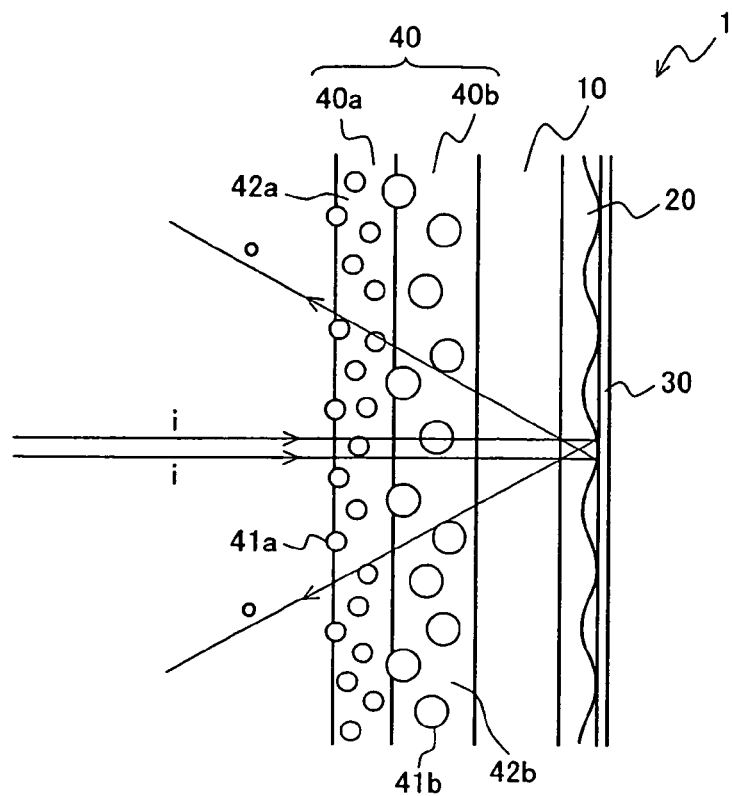
FIG. 14 is a view explaining a further embodiment of the reflection type screen of the present invention.

Exemplary structure of the screens comprising the diffusion layer 40 which is double-layered and the horizontal view angle increasing layer 20 made of a prism sheet and waved sheet are illustrated in FIGS. 13 and 14, respectively.

Figure 15:
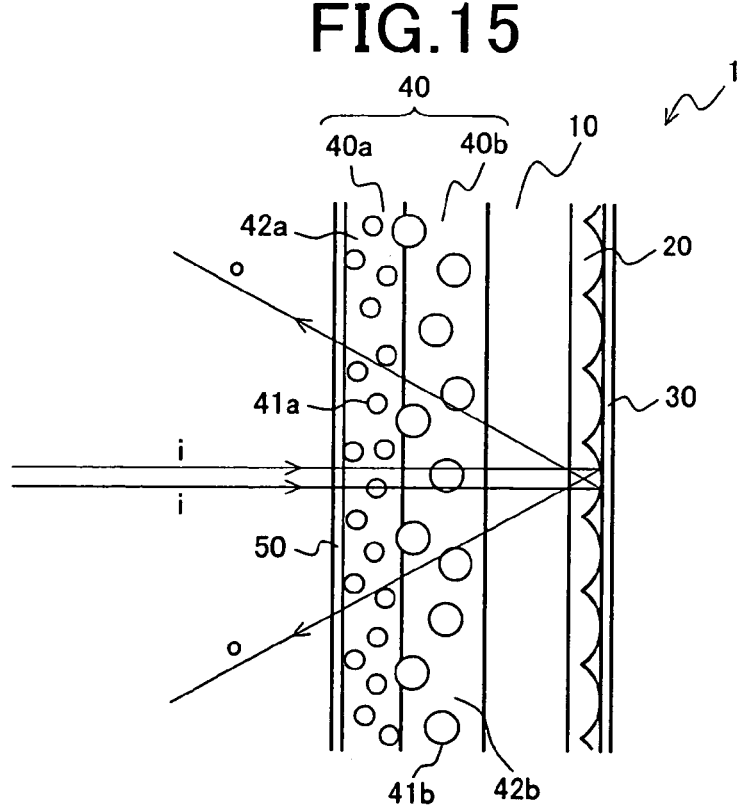
FIG. 15 is a view explaining a further embodiment of the reflection type screen of the present invention.
Figure 16:
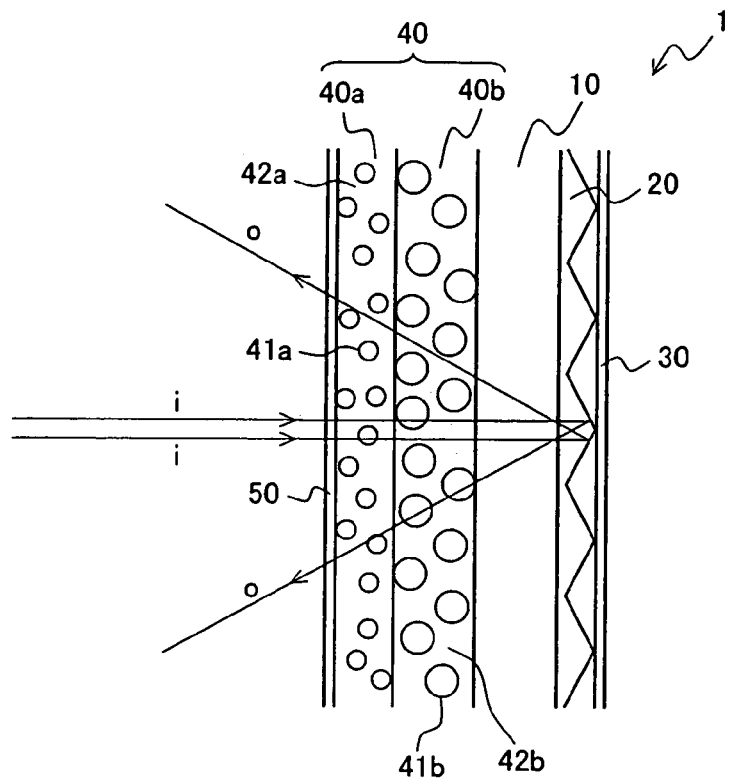
FIG. 16 is a view explaining a further embodiment of the reflection type screen of the present invention.
Figure 17:
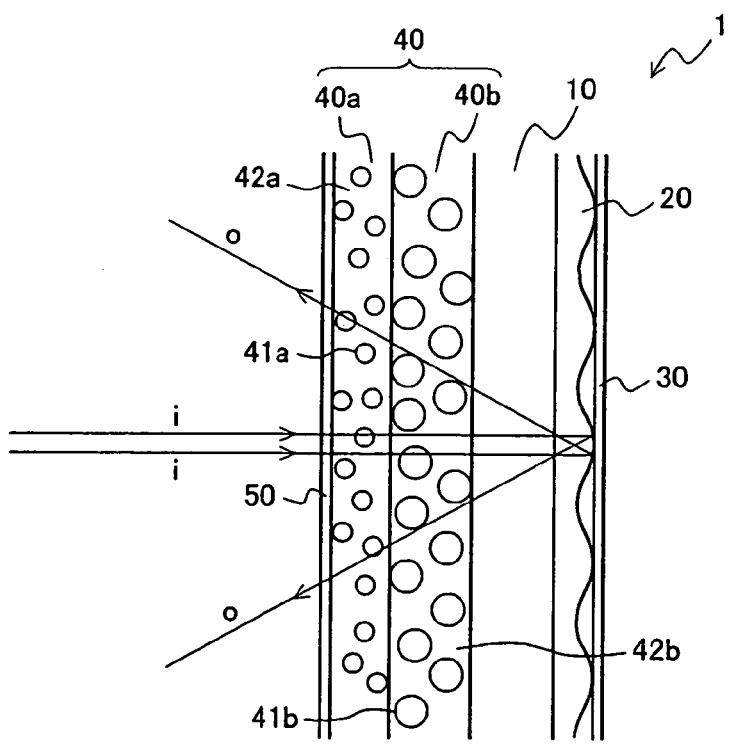
FIG. 17 is a view explaining a further embodiment of the reflection type screen of the present invention.
Figure 18:
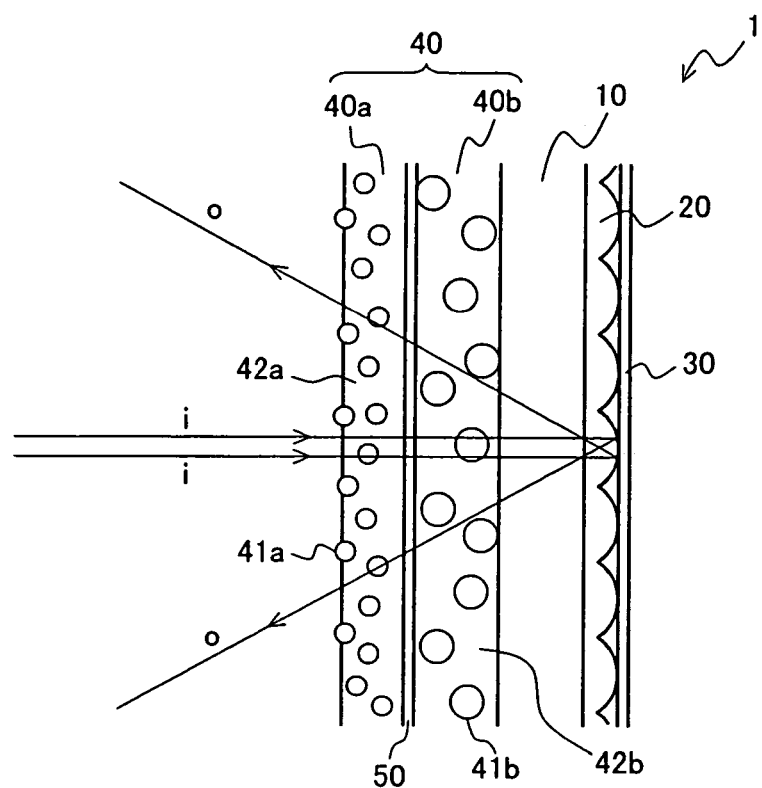
FIG. 18 is a view explaining a further embodiment of the reflection type screen of the present invention.

For comparison with the structures of FIGS. 12 through 14, exemplary structures in which the TINT layer 50 is disposed on the light incident side of the diffusion layer are illustrated in FIGS. 15 through 17. For comparison with the structure of FIG. 12 having a double-layered diffusion layer 40, a structure in which the TINT layer 50 is disposed between the diffusion layers 40a and 40b is shown in FIG. 18.

Figure 19:
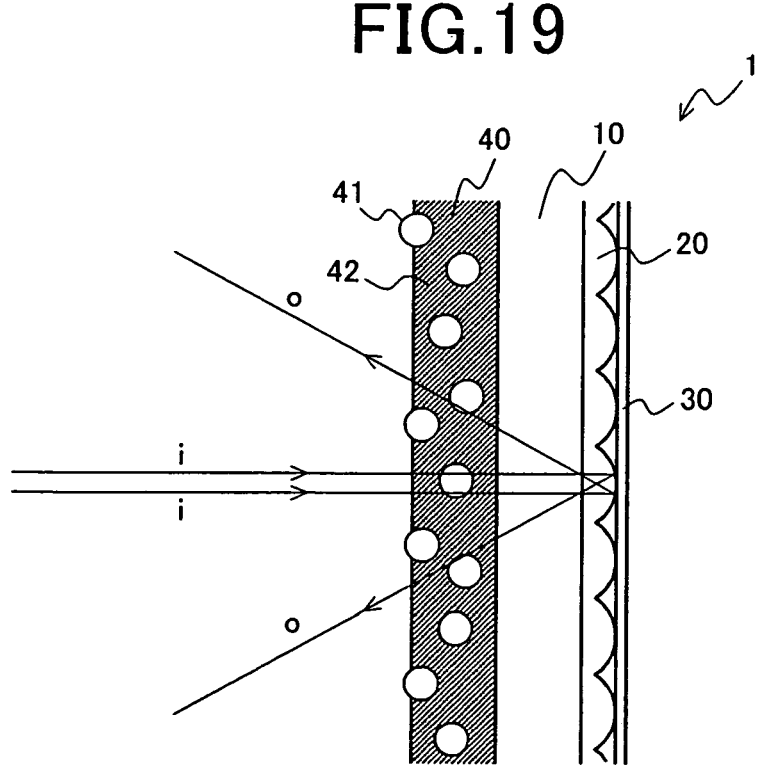
FIG. 19 is a view explaining a further embodiment of the reflection type screen of the present invention.
Figure 20:
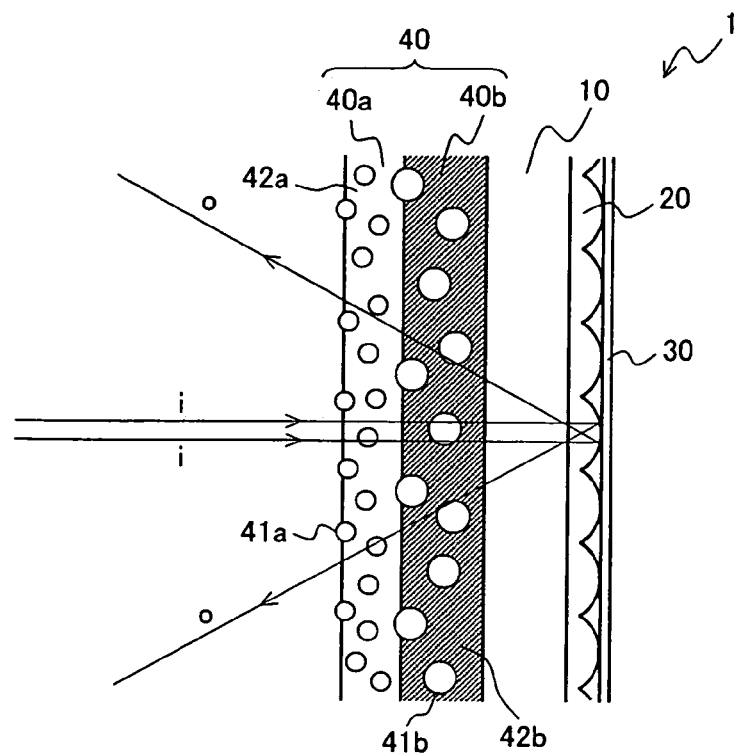
FIG. 20 is a view explaining a further embodiment of the reflection type screen of the present invention.

In the structure of each of the above-mentioned embodiments, the diffusion layer 40 may be formed by adding the transparent resin binder which forms the diffusion layer 40 with TINT so that it also serves as the TINT layer. An example in which the diffusion layer 40 of FIG. 4 is added with TINT is shown in FIG. 19. An example in which the diffusion layer 40b on the reflection side of the diffusion layer 40 of FIG. 12 is added with TINT is shown in FIG. 20.

FIGS. 21 through 25 are views explaining further embodiment of the reflection type screen of the present invention. The cross section of the screen is schematically shown. In the present embodiments, a portion of the screen which does not contribute to the light emission, that is, a portion which does not form an optical path is formed with a black matrix layer 60 containing black paint. External disturbing light from illumination lamp can be absorbed by forming the black matrix layer 60, which improves the visual effect in which black areas of the projected image are emphasized. The black matrix is designed to most efficiently enhance the visual effect without lowering the brightness to match the design of the horizontal view angle increasing layer 20. The black matrix layer 60 may include for example, black stripes. The stripes are disposed in a vertical direction of the screen to match the pitch between ridges such as lenticular lenses, prisms and waves.

Figure 21:
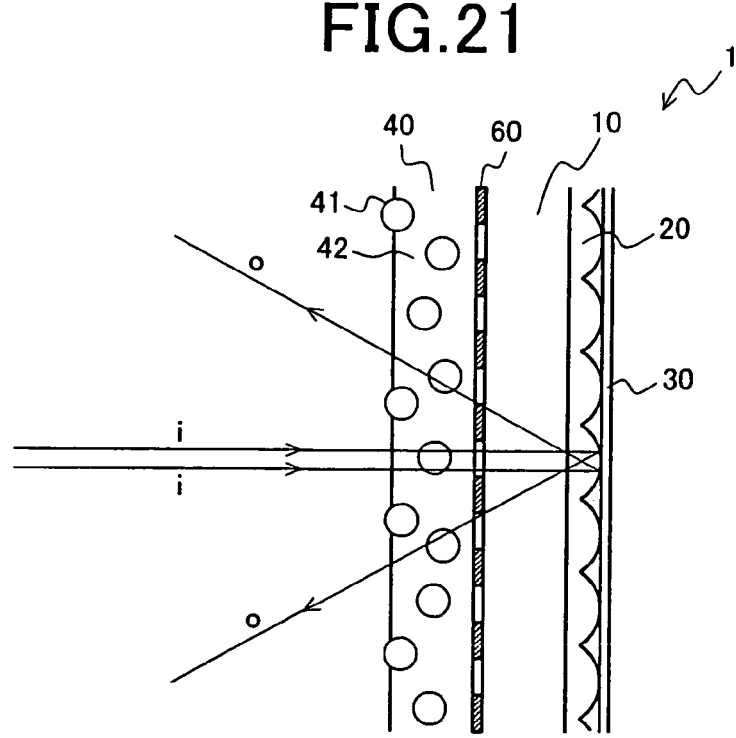
FIG. 21 is a view explaining a further embodiment of the reflection type screen of the present invention.
Figure 22:
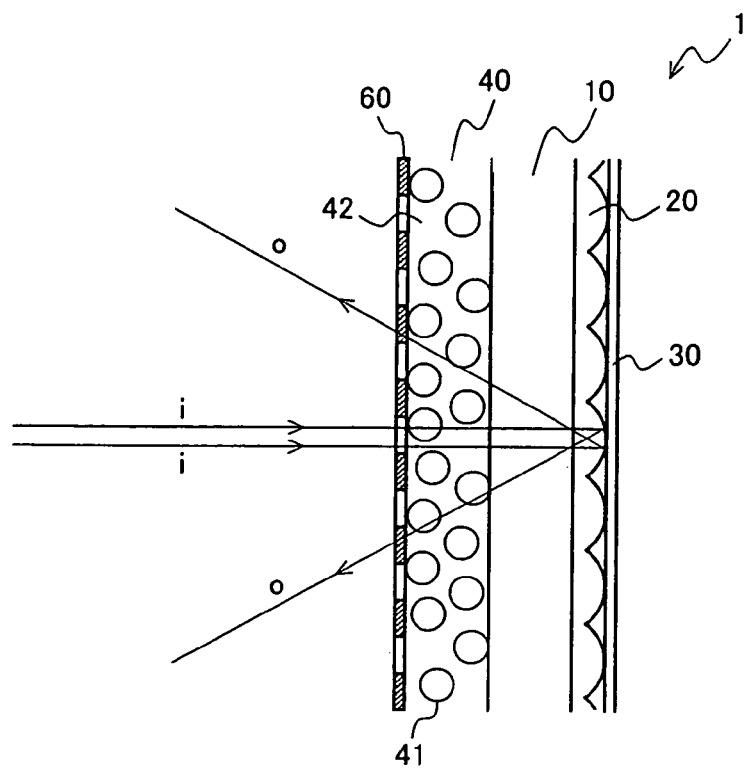
FIG. 22 is a view explaining a further embodiment of the reflection type screen of the present invention.
Figure 23:
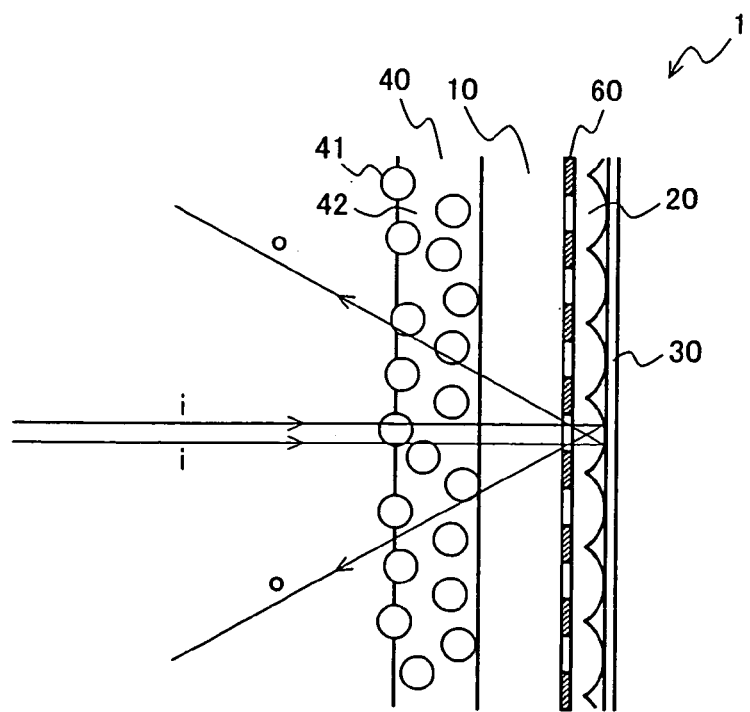
FIG. 23 is a view explaining a further embodiment of the reflection type screen of the present invention.
Figure 24:
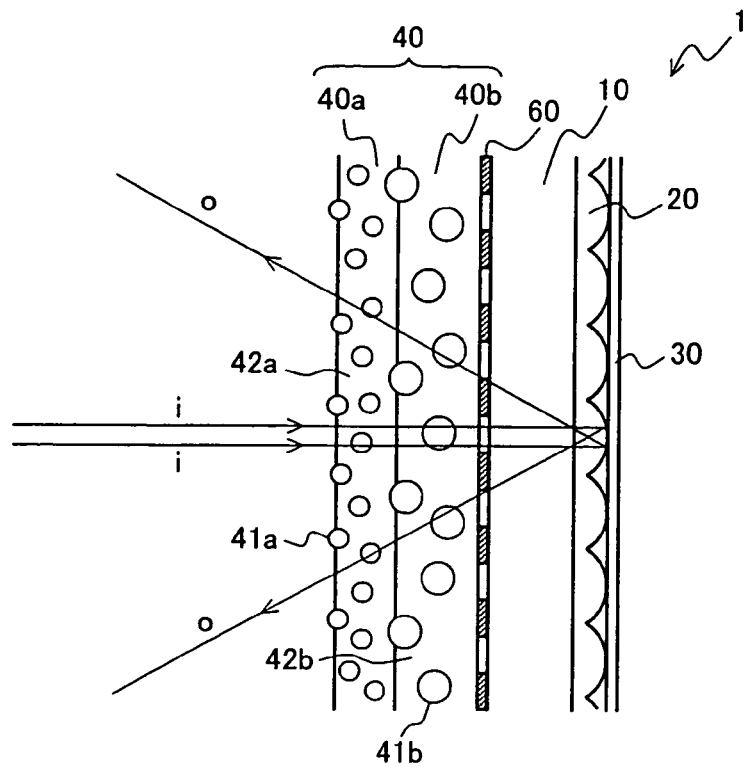
FIG. 24 is a view explaining a further embodiment of the reflection type screen of the present invention.
Figure 25:
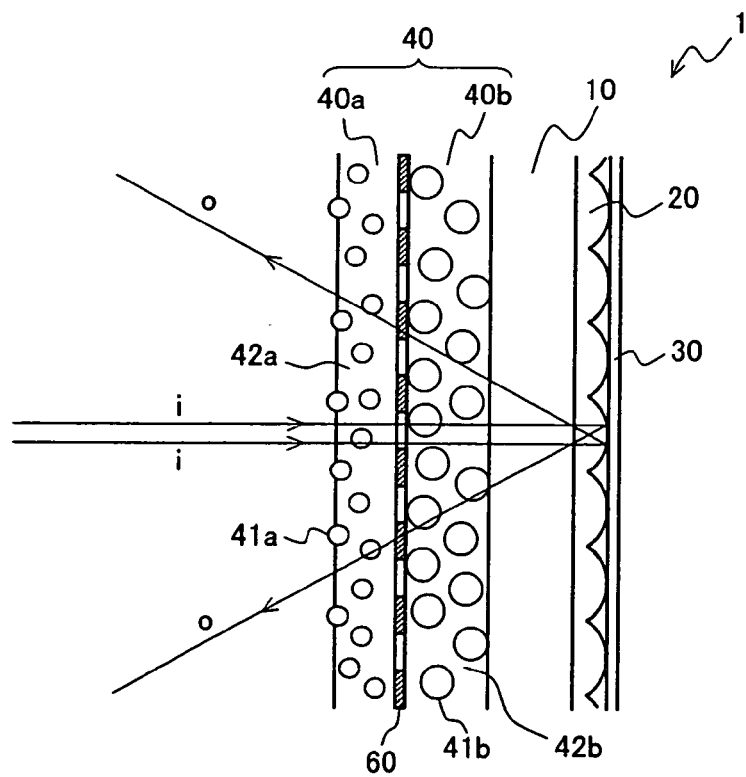
FIG. 25 is a view explaining a further embodiment of the reflection type screen of the present invention.

The above-mentioned black matrix layer 60 may be laminated on the light incident side of the horizontal view angle increasing layer 20 in proper position. FIG. 21 shows the structure in which the black matrix layer 60 is sandwiched between the diffusion layer 40 and the transparent resin sheet 10. FIG. 22 shows the structure in which the black matrix layer 60 is laminated on the light incident side of the diffusion layer 40. FIG. 23 shows the structure in which the black matrix layer 60 is sandwiched between the transparent resin sheet 10 and the horizontal view angle increasing layer 20. FIG. 24 shows the structure in which the black matrix layer 60 is sandwiched between the diffusion layer 40 including double-layered diffusion layers 40a, 40b and the transparent resin sheet 10. FIG. 25 shows the structure in which the black matrix layer 60 is sandwiched between two diffusion layers 40a and 40b. These structures are applicable to the above-mentioned horizontal view angle increasing layers having prismatic shape and waved shape.

As mentioned above, the TINT layer 50 and black matrix layer 60 can enhance the visual effect by emphasizing the black area in the projected image. At this time, the TINT layer 50 and black matrix layer 60 absorb some of the projected light. The absorption has a purpose of achieving the emphasis of the black area in the projected image. The amount of the light which is absorbed in very small. This absorption is totally different from the light absorption which is conducted by the light absorption sheet of the above-mentioned patent specification 1 in the absorption amount.

Figure 26:
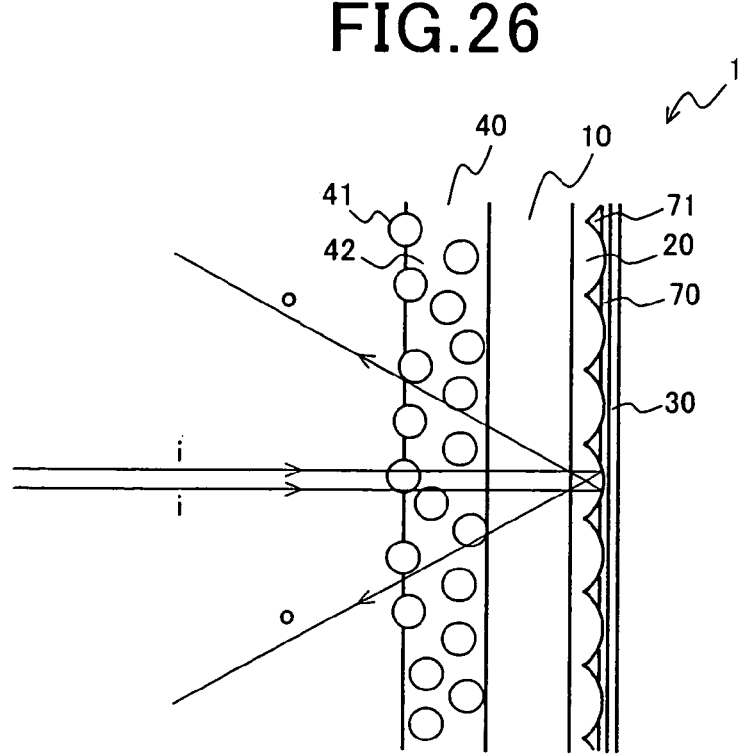
FIG. 26 is a view explaining a further embodiment of the reflection type screen of the present invention.

FIG. 26 is a view explaining further embodiment of the reflection type screen of the present invention. The structure of the horizontal cross-section of the screen is schematically illustrated. In the above-mentioned embodiment, the reflection layer 30 is disposed on the horizontal view angle increasing layer 20 in a non-bonding manner. In the present embodiment, the reflection layer 30 is bonded to the horizontal view angle increasing layer 20 by providing a bonding layer 70. In order not to cancel the effect of the convex ridge shape of the horizontal view angle increasing layer 20, the adhesive or glue used for the bonding layer 70 preferably has a refractive index which is different from that of the material of the horizontal view angle increasing layer 20.

In the present embodiment, the bonding layer 70 is formed on the surface of the reflection layer 30 and then the bonding layer 70 is depressed upon the surface of the convex ridges of the horizontal view angle increasing layer 20. Thus, the reflection layer 30 can be bonded on the horizontal view angle increasing layer 20 with the bonding layer 70 being sandwiched therebetween. At this time, the reflection layer 30 is partially bonded to the horizontal view angle increasing layer 20 in the vicinity of the apexes of the convex ridges via the bonding layer 70. Gaps 71 are formed between the horizontal view angle increasing layer 20 and the bonding layer 70 at the non-bonded areas between the convex ridges. The gaps 71 may be filled with a medium having a refractive index different from that of the horizontal view angle increasing layer 20, such as grease.

When the reflection layer 30 is bonded to the horizontal view angle increasing layer 20 with convex ridges having a height (thickness in a lamination direction) of 50 μm via the bonding layer 70 having a thickness of 20 μm, the gaps 71 are formed between the convex ridges so that all the space between the horizontal view angle increasing layer 20 and the reflection layer 30 is not filled with the bonding layer 70.

In the structure comprising the bonding layer 70, the gaps 71 may be formed as mentioned above or the space between the horizontal view angle increasing layer 20 and the reflection layer 30 may be completely filled with the bonding layer made of a highly fluidic adhesive or glue having a refractive index which is different from that of the horizontal view angle increasing layer 20.

Figure 27:
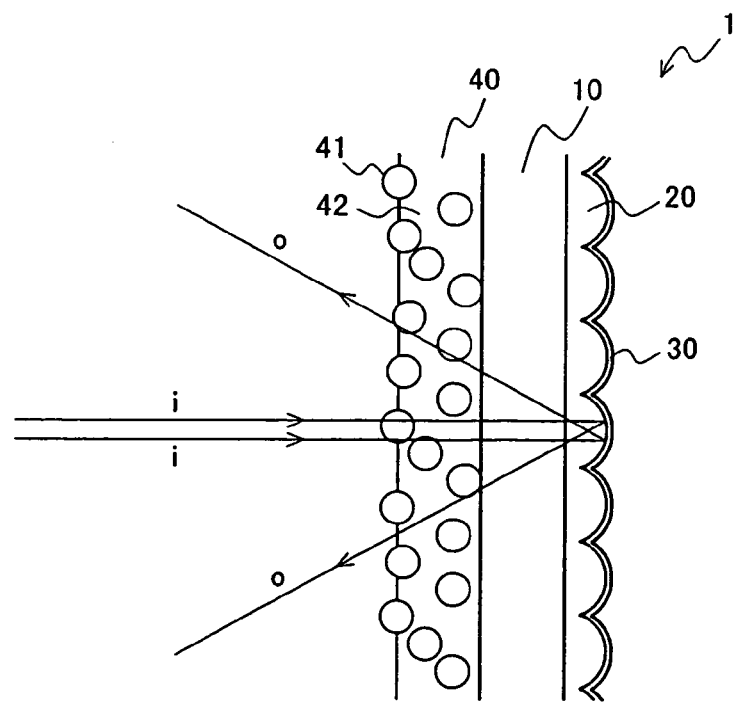
FIG. 27 is a view explaining a further embodiment of the reflection type screen of the present invention.

The structure in which the reflection layer 30 is bonded to the horizontal view angle increasing layer 20 as mentioned above may be applied to the reflection layer 30 of the foregoing embodiments. FIG. 27 is a view explaining a further embodiment of the reflection type screen of the present invention. In the drawing, the cross section of the screen is schematically illustrated.

The reflection layer 30 is formed by vacuum depositing or applying the material which will constitute the reflection layer 30 on the surface of the horizontal view angle increasing layer 20. The reflection layer 30 may be formed by a vacuum depositing, for example, silver or aluminum or applying a material containing these metals on the ridge arrayed surface of the horizontal view angle increasing layer 20. Alternatively, the reflection layer 30 may be formed by a sputtering technique.

Since the reflection layer 30 is a mirror layer which is formed by vacuum depositing, sputtering or applying silver or aluminum thereon, its reflection efficiency can be made higher and the gain in a direction toward the front face of the screen can be enhanced. The external disturbing light which is incident to the screen 1 at a large incidence angle can be prevented from being reflected toward the observer. The reflection type screen of the present invention is capable of providing a high contrast projected image by means of these functions.

Figure 28:
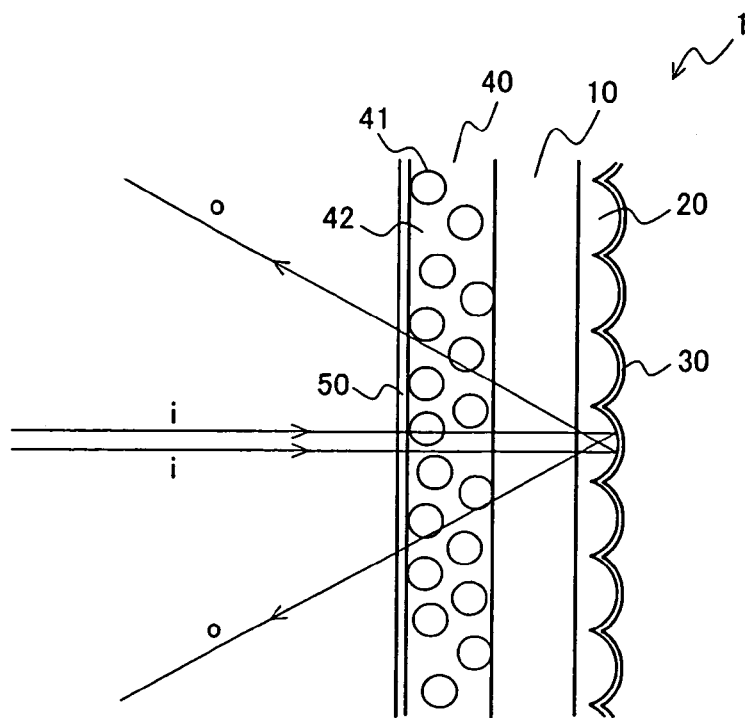
FIG. 28 is a view explaining a further embodiment of the reflection type screen of the present invention.
Figure 29:
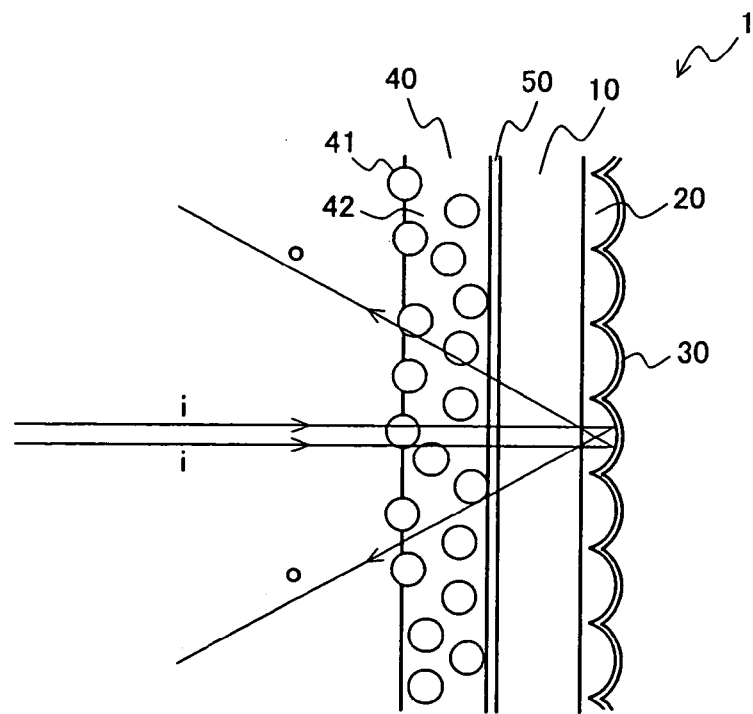
FIG. 29 is a view explaining a further embodiment of the reflection type screen of the present invention.
Figure 30:
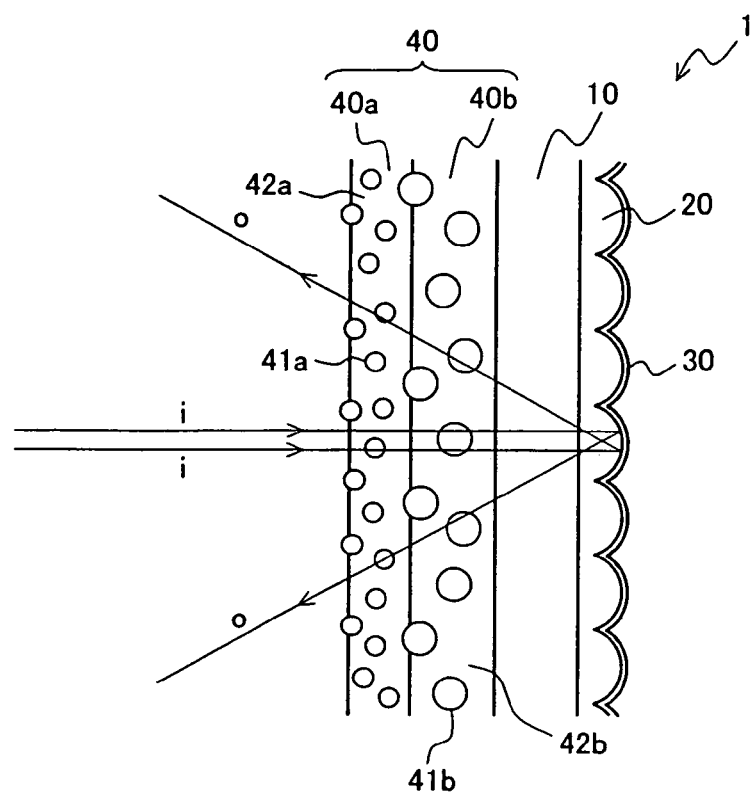
FIG. 30 is a view explaining a further embodiment of the reflection type screen of the present invention.
Figure 31:
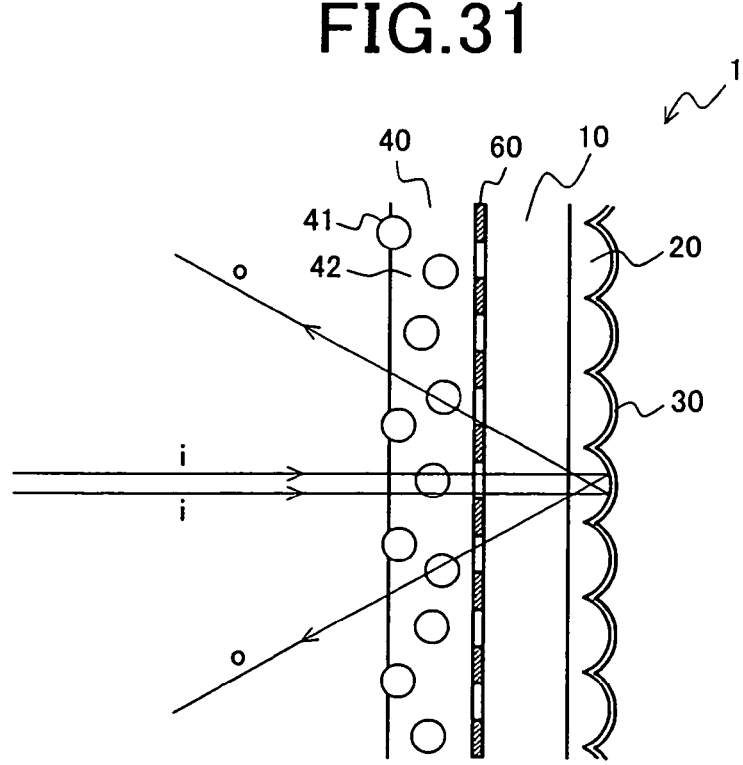
FIG. 31 is a view explaining a further embodiment of the reflection type screen of the present invention.

The structure of the reflection layer which is directly formed on the horizontal view angle increasing layer 20 as mentioned above is applicable to the reflection layer 30 of each of the above-mentioned embodiment. FIG. 27 shows as exemplary structure in which the reflection layer 30 of the embodiment which is formed by vacuum deposition or application is applied to the structure of FIG. 4. Another exemplary structure in which the above-mentioned reflection layer 30 is applied to the structure of FIG. 7 is shown in FIG. 28. The structure in which the reflection layer 30 is applied to the structure of FIG. 8 is shown in FIG. 29. The structure in which the reflection layer 30 is applied to the structure of FIG. 12 is shown in FIG. 30. The structure in which the reflection layer 30 is applied to the reflection layer 30 in FIG. 21 is shown in FIG. 31.

Figure 32:
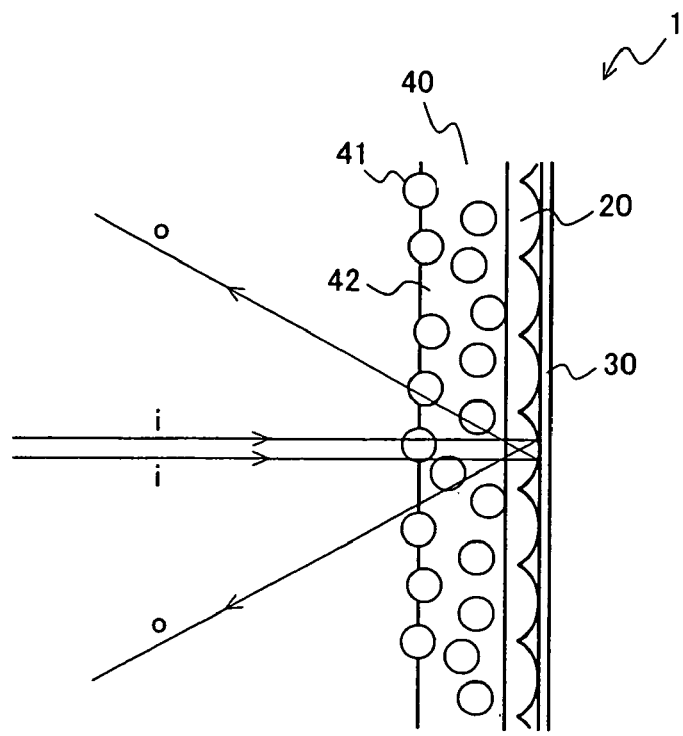
FIG. 32 is a view explaining a further embodiment of the reflection type screen of the present invention.

FIG. 32 is a view explaining a further embodiment of the reflection type screen of the present invention. In the drawing, the cross section of the screen is schematically illustrated. In each of the above-mentioned embodiment, lamination can be achieved without using any transparent resin sheet 10. In the structure which is shown in FIG. 32, the diffusion layer 40 is formed by forming an acrylic beads binder layer directly on the lenticular lens sheet which constitutes the horizontal view angle increasing layer 20 without using any transparent resin sheet 10 in the screen 1 shown in FIG. 4. Similarly, lamination can be achieved by using the horizontal view angle increasing layer 20 as a substrate sheet without using any transparent resin sheet 10 in the above-mentioned all embodiments.

Figure 33:
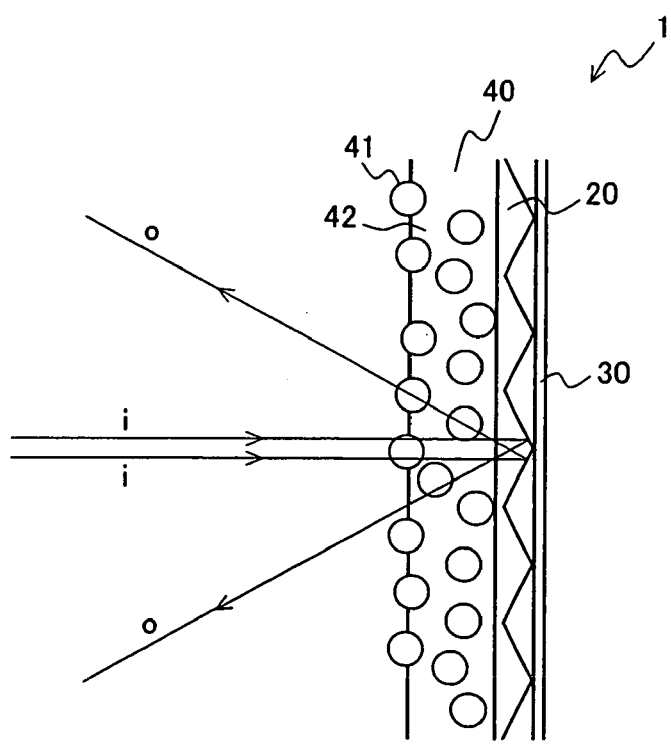
FIG. 33 is a view explaining a further embodiment of the reflection type screen of the present invention.
Figure 34:
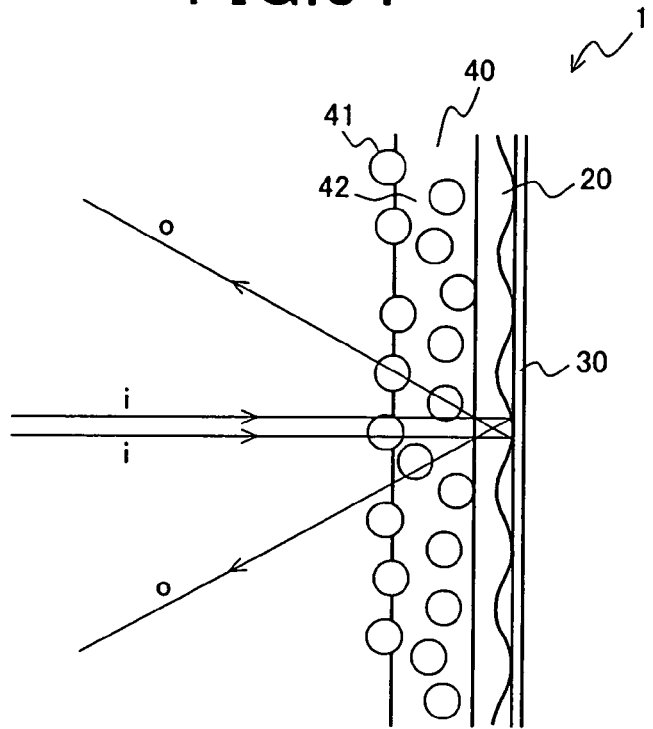
FIG. 34 is a view explaining a further embodiment of the reflection type screen of the present invention.
Figure 35:
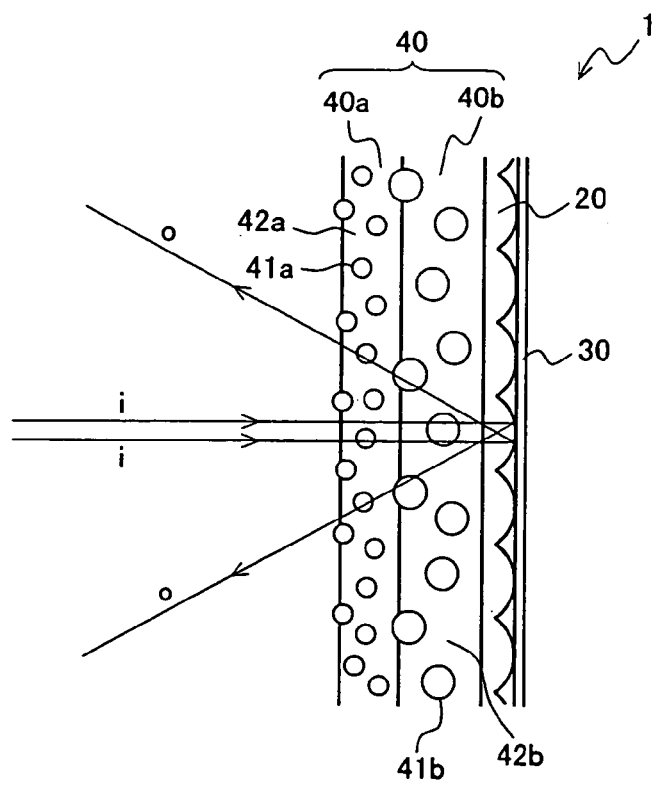
FIG. 35 is a view explaining a further embodiment of the reflection type screen of the present invention.
Figure 36:
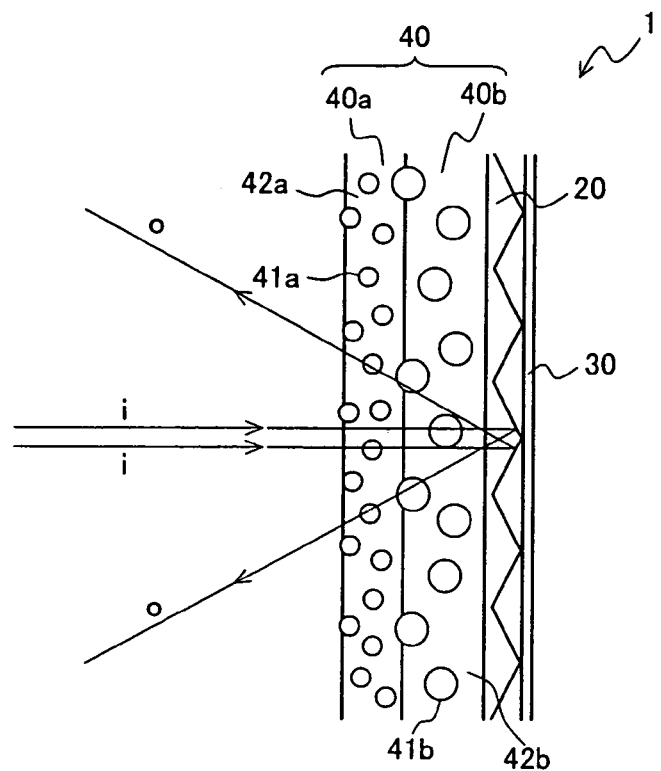
FIG. 36 is a view explaining a further embodiment of the reflection type screen of the present invention.
Figure 37:
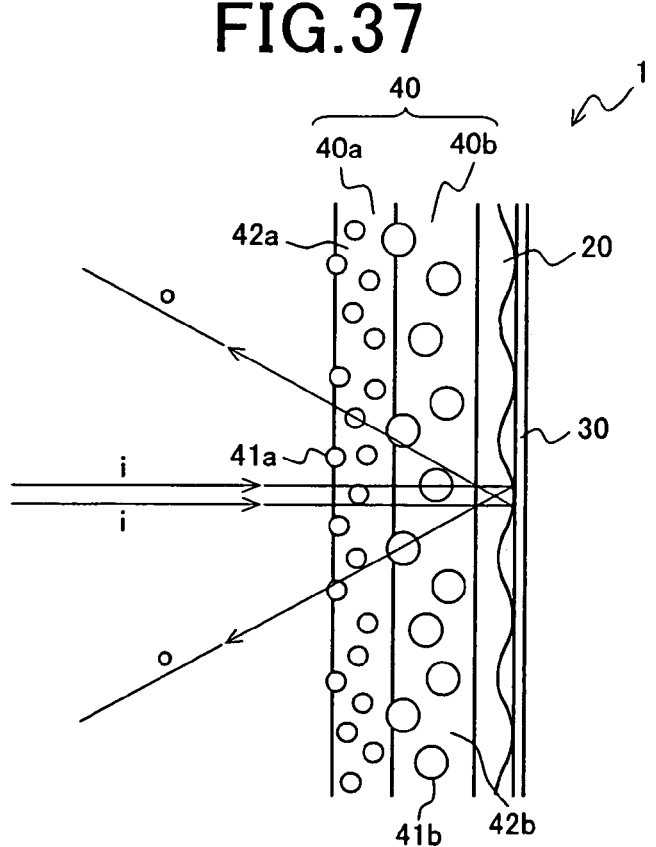
FIG. 37 is a view explaining a further embodiment of the reflection type screen of the present invention.
Figure 38:
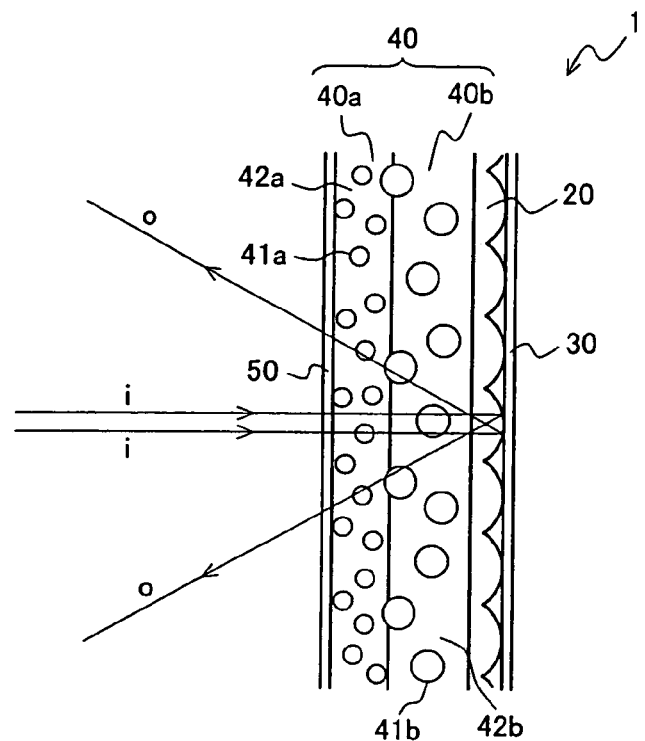
FIG. 38 is a view explaining a further embodiment of the reflection type screen of the present invention.
Figure 39:
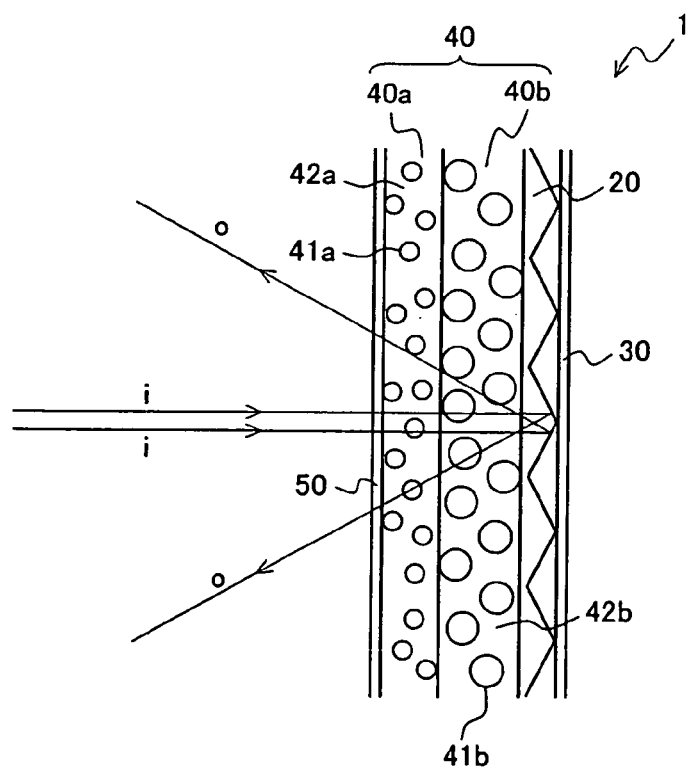
FIG. 39 is a view explaining a further embodiment of the reflection type screen of the present invention.
Figure 40:
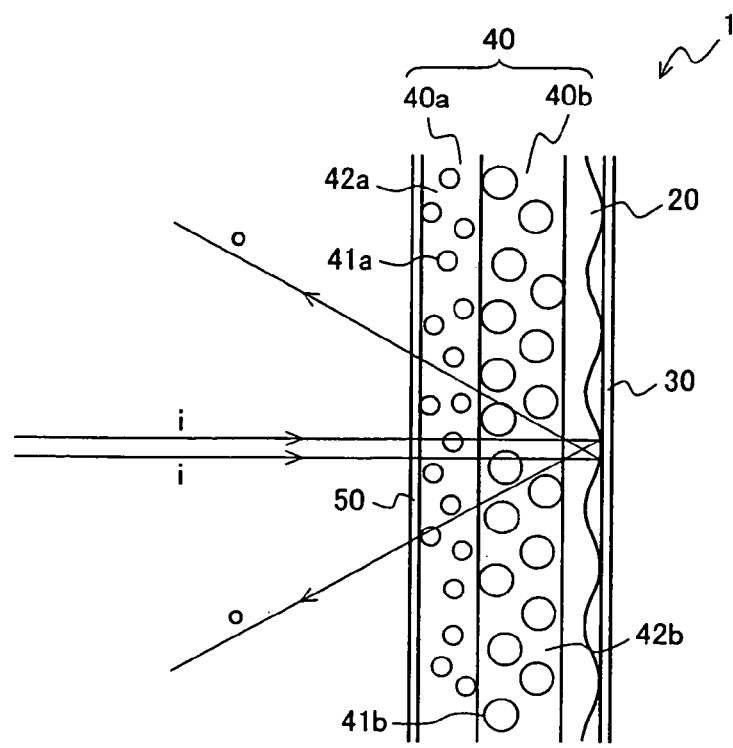
FIG. 40 is a view explaining a further embodiment of the reflection type screen of the present invention.
Figure 41:
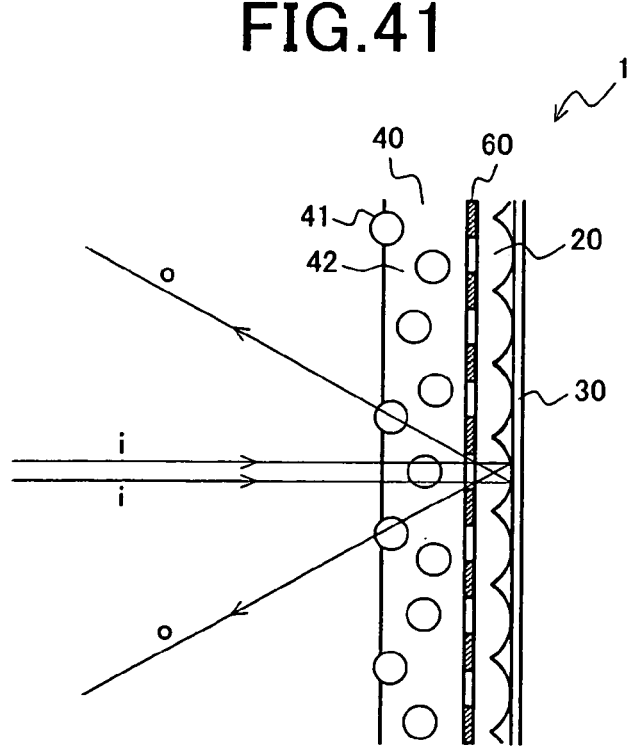
FIG. 41 is a view explaining a further embodiment of the reflection type screen of the present invention.

FIGS. 33 and 34 show the structure in which a prism sheet and wave sheet are used as the horizontal view angle increasing layer 20 in the structure of FIG. 32, respectively. FIGS. 35 through 37 show the structures of FIGS. 12 through 14 which are formed without using any transparent resin sheet 10, respectively. FIGS. 38 through 40 show the structure in which the TINT layer 50 is laminated on the light incident side of the diffusion layer 40 in the structures of FIGS. 35 through 37, respectively. FIG. 40 shows an example in which the screen is formed without using any transparent resin sheet 10 in the structure of FIG. 21 including the black matrix layer 60.

Figure 42:
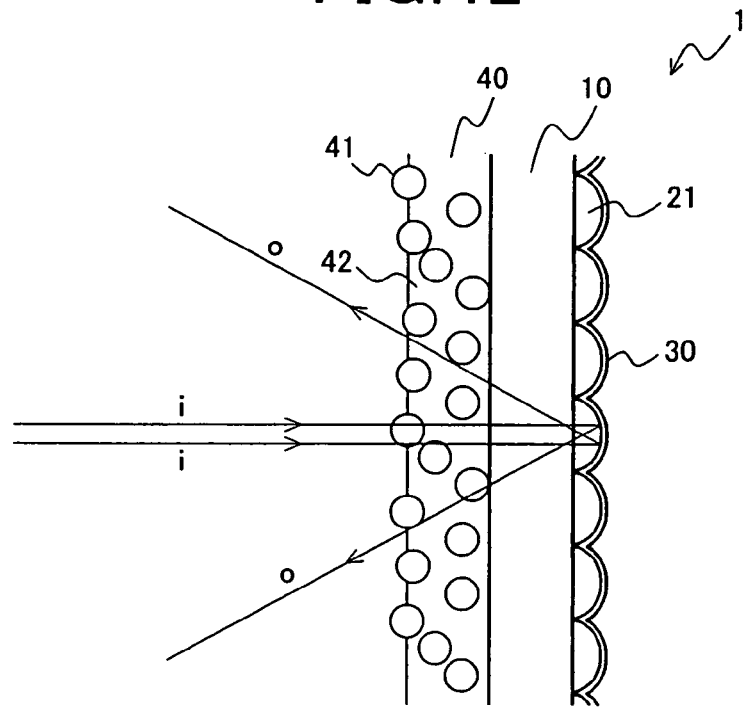
FIG. 42 is a view explaining a further embodiment of the reflection type screen of the present invention.
Figure 43:
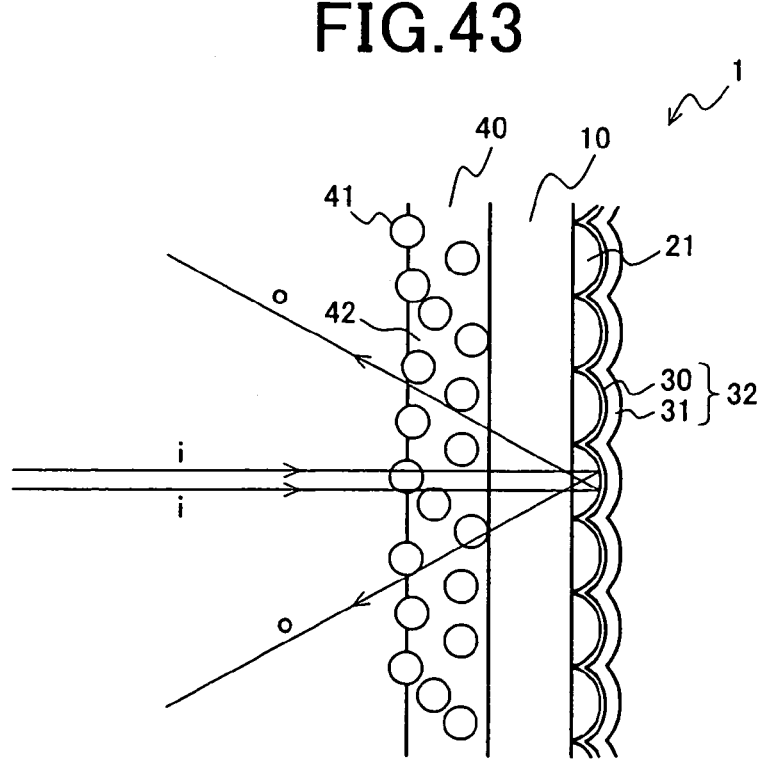
FIG. 43 is a view explaining a further embodiment of the reflection type screen of the present invention.
Figure 44:
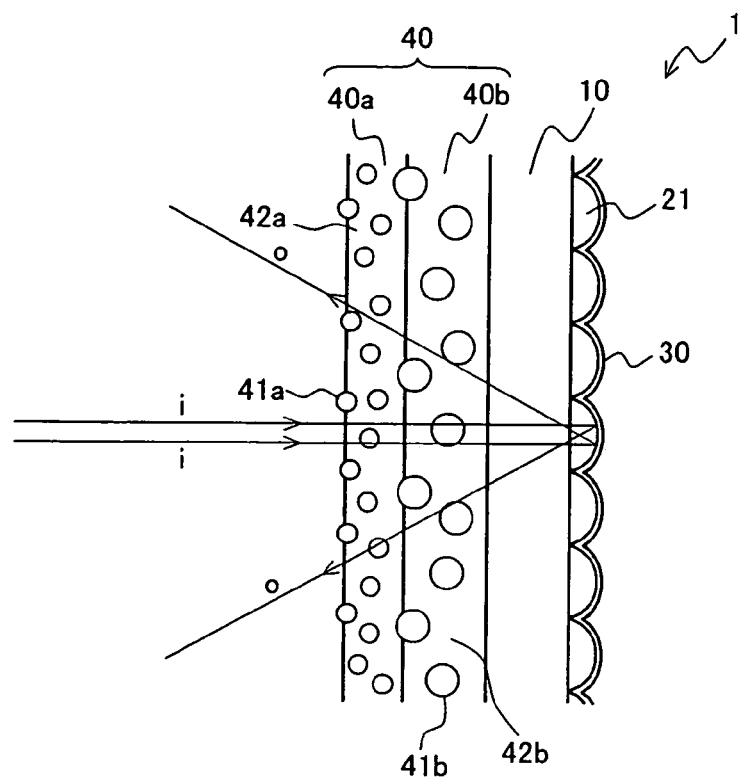
FIG. 44 is a view explaining a further embodiment of the reflection type screen of the present invention.

FIGS. 42 through 44 show exemplary structures in which the horizontal view angle increasing layer having a ridge array which is in the cylindrical shape directly formed on the transparent resin sheet 10 and the reflection layer 30 with vacuum deposition or application in an array of striations.

In FIG. 42, the horizontal view angle increasing layer includes cylindrical shape portions 21 comprising cylindrical members having partial cylindrical shape which are integrally formed and successively arrayed on one side of the transparent resin sheet 10 which acts as a substrate. The cylindrical shape portion 21 is formed so that the longitudinal direction of each cylindrical shape (axial direction of the cylinder) corresponds to the vertical direction when the screen 1 is installed. Further, the cylindrical members are formed so that the apexes of the cylindrical shape portions 21 are located on the side facing the reflection layer 30. The cylindrical members define the shape of the reflection layer 30. By forming the horizontal view angle improving layer in such a manner, the diffusion range of the reflected light components in a horizontal direction of the screen 1 can be enlarged for enhancing the view angle characteristics of the screen 1. It is preferable that the pitch between the cylindrical members is 200 µm or less (1/10 of the pixel pitch or less), more preferably 155 µm or less to the above-mentioned embodiments.

The reflection layer 30 is formed on the surface of the cylindrical shape portions 21. The diffusion layer 40 is laminated on the side of the transparent resin sheet 10 which is opposite to the side on which the cylindrical shape portion 21 is formed. The surface of the diffusion layer 40 is used as the projected light incident surface. The screen 1 of the present invention comprises the diffusion layer 40, the transparent resin sheet 10 which will act as a substrate, cylindrical shape portion 21 and the reflection layer 30 which are integrally formed in order from the projected light incident side.

The cylindrical shape portion 21 is formed by the following process: A photocurable resin is applied on one side of the transparent resin sheet 10. The transparent resin sheet 10 is embossed with a mold or roll having desired cylindrical shape thereon to form the cylindrical members. An then, the transparent resin sheet 10 is cured on exposure to light. Alternatively, the transparent resin sheet 10 may be directly formed with the cylindrical shape on one side thereof by embossing roll during the formation of the sheet of the transparent resin sheet 10 or during the subsequent step. Fine cylindrical shape may be formed by photo-fabrication such as laser or photolithography.

FIG. 43 is a view explaining a further embodiment of the reflection type screen of the present invention. The cross section of the screen is schematically illustrated. In FIG. 43, a reference numeral 30 denotes a reflection layer, 31 a substrate, 32 a reflection sheet comprising the reflection layer and the substrate.

In the structure of FIG. 43, the reflection layer 30 is formed by applying the reflection sheet 32 having a reflecting capability on the cylindrical shape portion 21. In other words, the reflection sheet 32 having the substrate 31 which is formed with the reflection layer 30 is provided. A function which is identical with that of the embodiment of FIG. 42 can be obtained by applying the reflection sheet 32 on the cylindrical shape portion 21. The substrate 31 may be formed of a resin sheet. The reflection sheet 32 may be used in which silver or aluminum layer is formed on the resin substrate 31 as the reflection layer 30 by vacuum deposition, sputtering or application. A foil of a metal such as aluminum or silver may be used as the reflection layer 30 which is to be applied on the substrate 31. Alternatively, the above-mentioned single metallic foil may be used as the reflection sheet without using any resin substrate 31. In case where the metallic foil is used, the structure is similar to that shown in FIG. 42.

FIG. 44 is a view explaining a further embodiment of the reflection type screen of the present invention. The structure of horizontal section of the screen is schematically illustrated. In FIG. 44, reference numerals 40a, 40b denote diffusion layers; 41a, 41b denote beads which are used as diffusion material; and 42a, 42b denote transparent resin binders.

In the structure of FIG. 44, the diffusion layer 40 comprises two diffusion layers 40a, 40b. The roughness of the light incident surface of the diffusion layer 40 and the haze factor of the diffusion layer 40 (inner haze factor independently of the surface roughness) can be controlled by changing the particle sizes, materials, contents and the particle size distribution of the acrylic resin beads 41a, 41b which are dispersed in the diffusion layers 40a, 40b. The particle size distribution may be controlled by changing the mixing ratio of beads having a plurality of particle sizes.

The light which is reflected on the surface of the diffusion layer 40a is diffused by properly increasing the surface roughness of the diffusion layer 40a on its light incident side for optimization, so that the image of the projecting device or the indoor illumination light can be made difficult to be viewed by the observer. The hot spots or hot bands which are caused by the projector lens of the projecting device can be decreased by increasing the haze factor of the diffusion layer 40b on the reflection layer thereof.

Although the reflection type screen of the present invention has an array of convex ridges such as cylindrical shape portion 21, a sheet of multi-layered screen can be formed by the above-mentioned structure of FIGS. 42 through 44. This enhances the productivity of the screen and makes the handling of the screen by the user easier.

Figure 45:
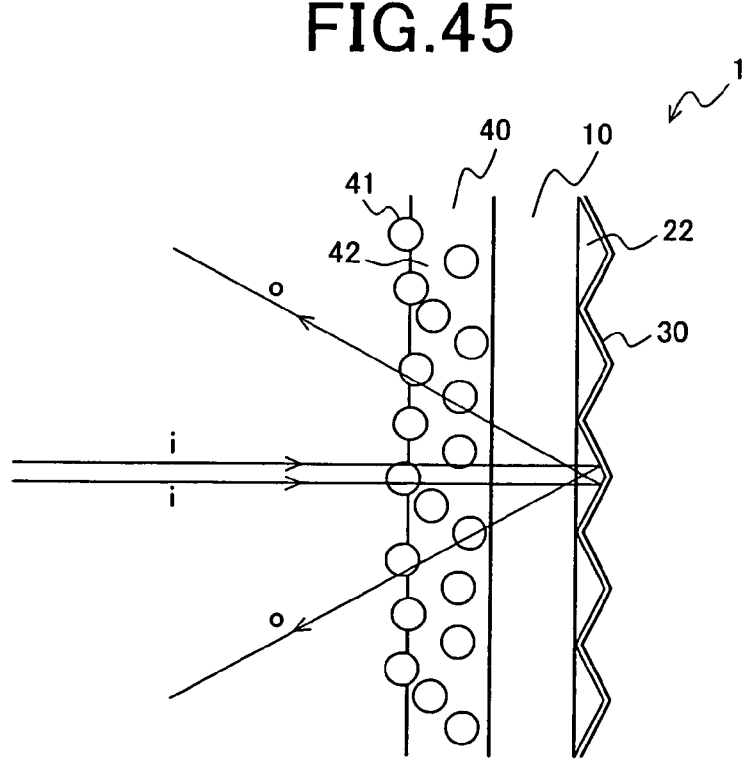
FIG. 45 is a view explaining a further embodiment of the reflection type screen of the present invention.
Figure 46:
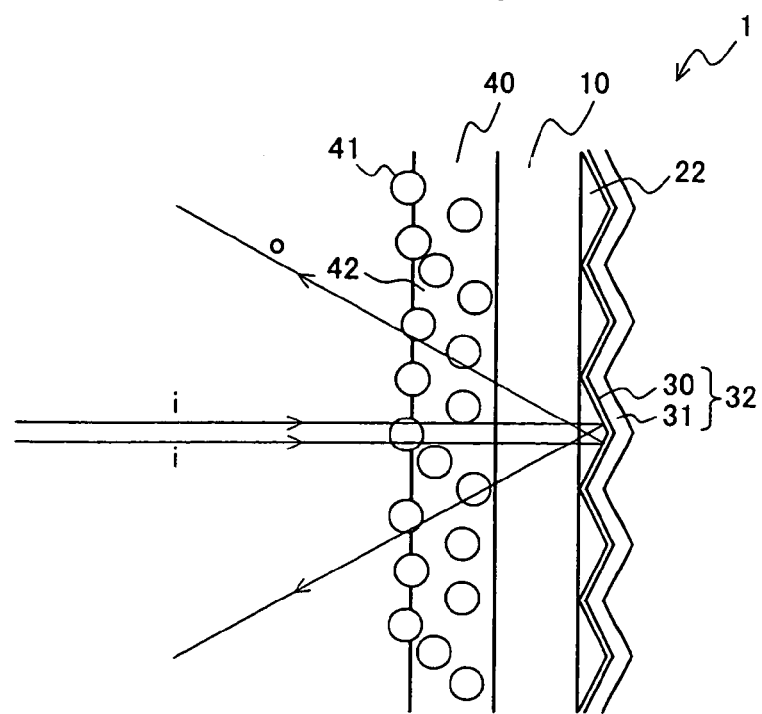
FIG. 46 is a view explaining a further embodiment of the reflection type screen of the present invention.
Figure 47:
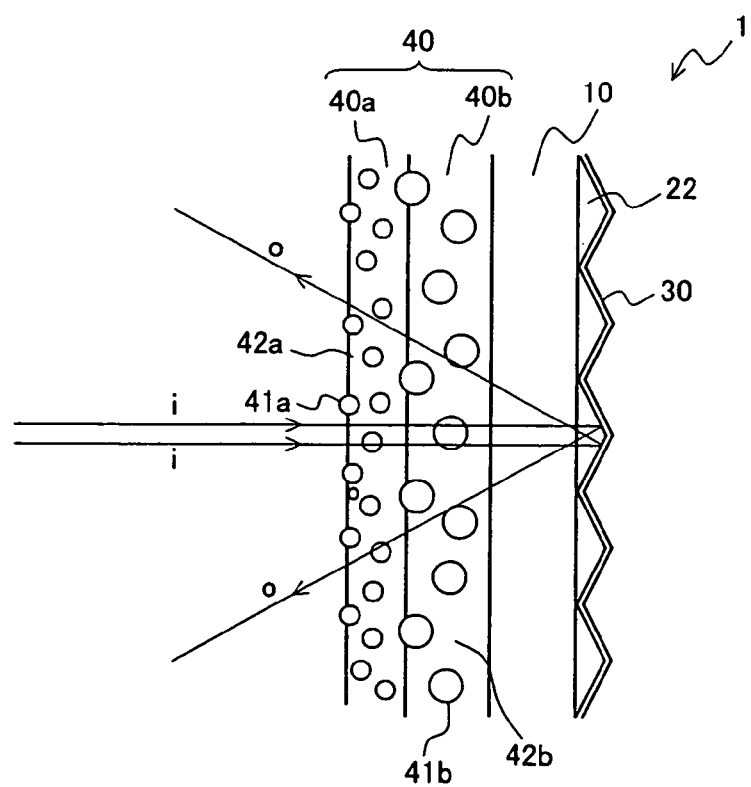
FIG. 47 is a view explaining a further embodiment of the reflection type screen of the present invention.

FIGS. 45 through 47 show exemplary structures in which the horizontal view angle increasing layer is formed of an array of convex ridges having a prism sectional shape which are directly formed on the transparent resin sheet 10 and the reflection layer is vacuum deposited or applied on the convex ridge array. In the drawings, a reference numeral 22 denotes the prism shape portions.

Figure 48:
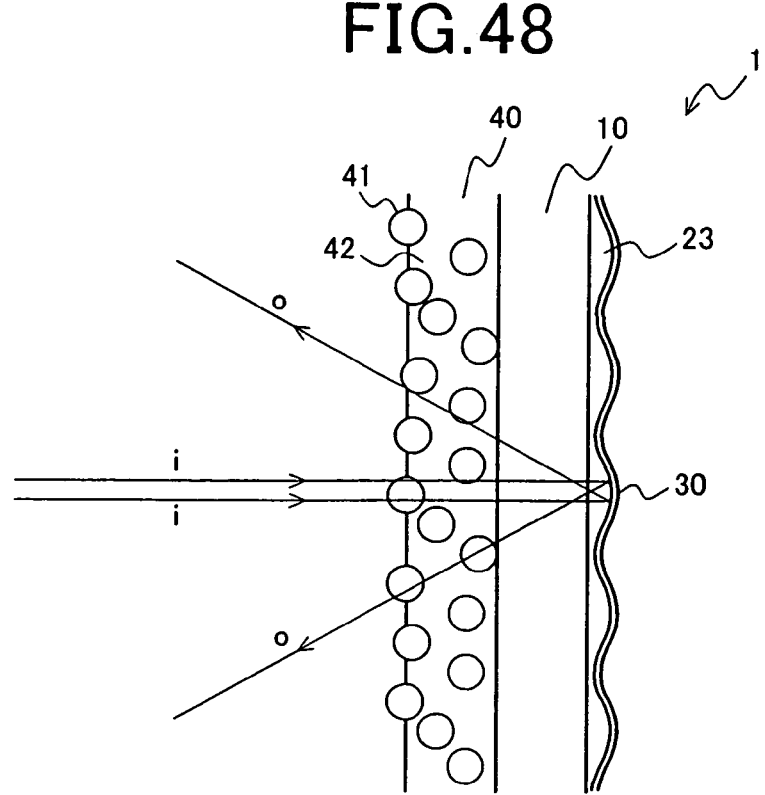
FIG. 48 is a view explaining a further embodiment of the reflection type screen of the present invention.
Figure 49:
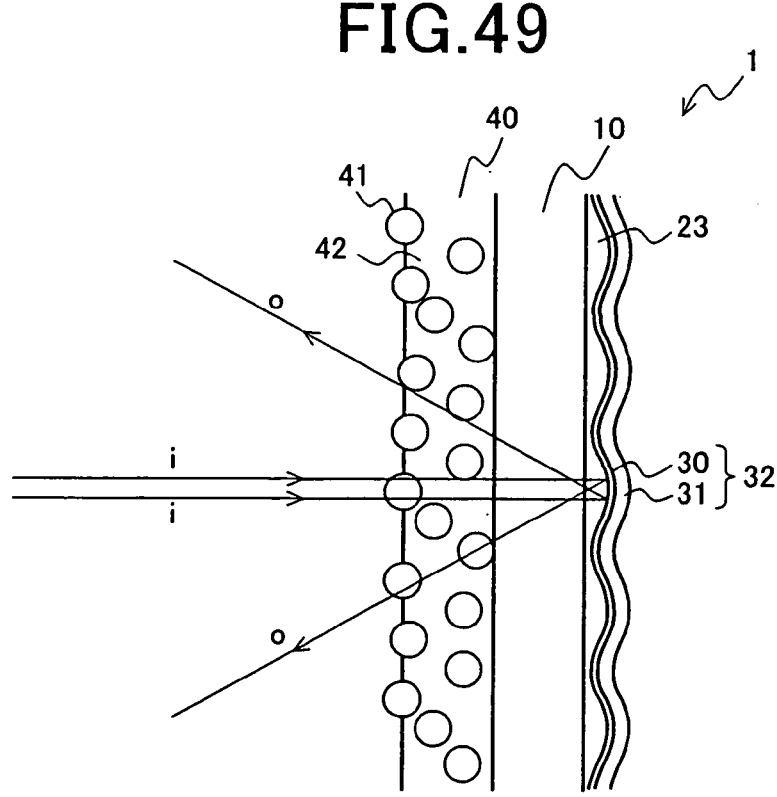
FIG. 49 is a view explaining a further embodiment of the reflection type screen of the present invention.
Figure 50:
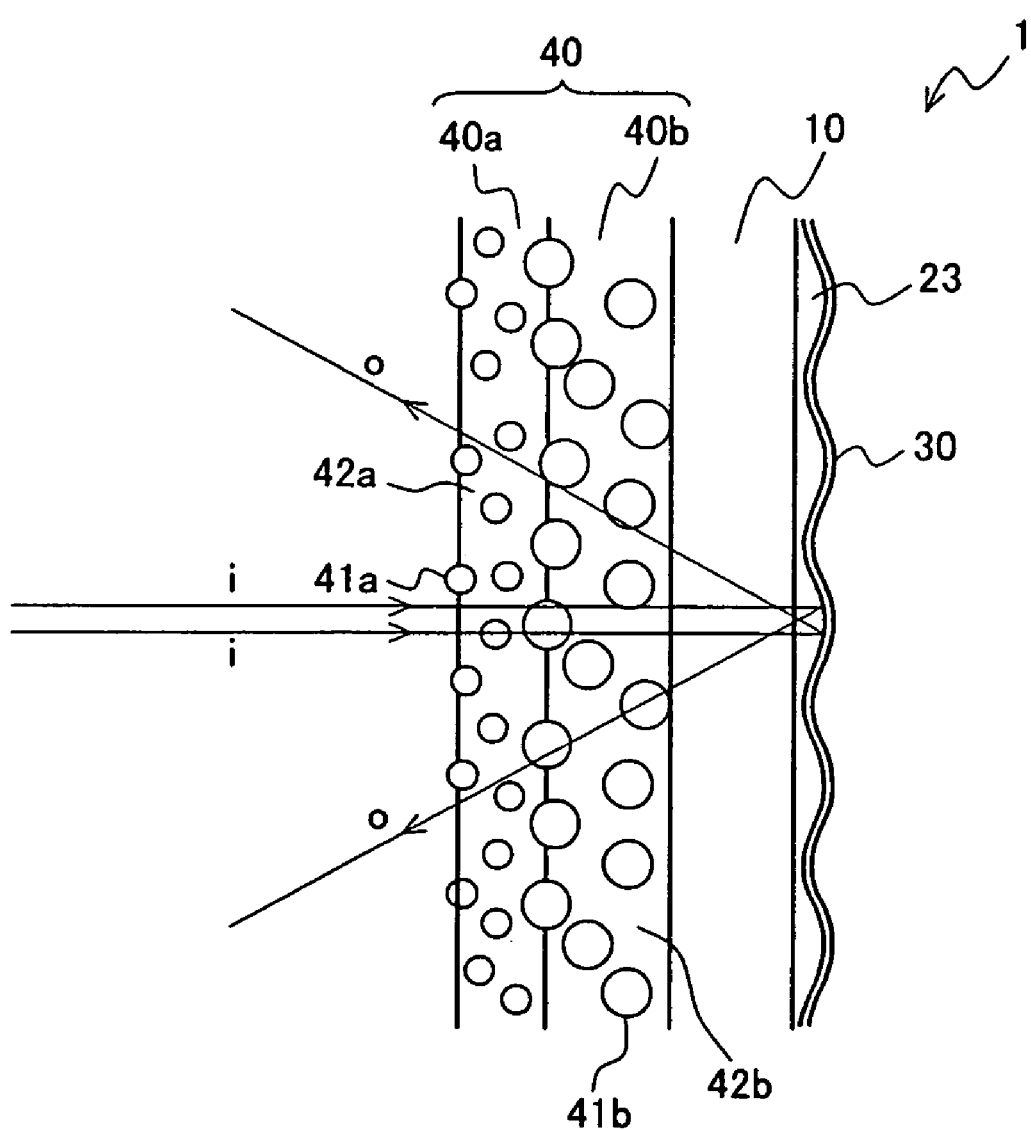
FIG. 50 is a view explaining a further embodiment of the reflection type screen of the present invention.

FIGS. 48 through 50 show exemplary structures in which the horizontal view angle layer is formed of an array of convex ridges having a wave shape which are directly formed on the transparent resin sheet 10 and the reflection layer is vacuum deposited or applied on the convex ridge array. In the drawings, a reference numeral 23 denotes the wave shape portions.

In the exemplary structures using the prism shape portions 22 and wave shape portions 23, the cylindrical shape portion 21 in the structures shown in FIGS. 42 through 44 are replaced with the prism shape portions 22 and wave shape portions 23, respectively. Their operation is identical with that in the embodiments of FIGS. 42 through 44 excepting for the operation due to the shape of the above-mentioned convex ridges. Accordingly, repetition of the description of the operation will be omitted.

The structure in which the horizontal view angle improving layer is formed by directly forming the transparent resin sheet 10 with the cylindrical shape portion 21, prism shape portions 22 or wave shape portion 23 as shown in FIGS. 42 through 50 is applicable to the horizontal view angle increasing layer 20 of FIGS. 4 through 41.

If the reflection layer 30 is formed according to the shape of convex ridges of the horizontal view angle increasing layer 20 by conducting vacuum deposition, sputtering and application and adhesion of a reflection sheet on the horizontal view angle increasing layer 20 as mentioned above, the shape of the convex ridges will determine the reflection characteristics since no gap is formed between the convex ridges and the reflection layer 30, unlike the structure using a flat plate reflection layer shown in FIGS. 4 through 41.

If reflection is conducted on the cylindrical shape face, the reflected light will continuously spread in a horizontal direction with respect to the incident light. Larger spreading of the reflected light is obtained than that using a flat reflection plate having gaps between the convex ridges and the reflection layer 30. A screen having characteristics in which its view angle in a horizontal direction with respect to the screen face and changes in CCR are less can be provided.

If reflection is conducted on the prism shaped face, the incident light projected from the projecting device will be regressively reflected in a direction opposite to the incidence direction toward the projecting device and its vicinity when the apex angle is about 90°. This provides an excellent brightness when an observer view the images on the screen on a position close to the projecting device. Divergence of the reflected light can be provided by increasing the apex angle of the prism to 100°±10° in accordance with the present invention.

Since the waved face is similar to that of the prism having a rounded apex, the screen has reflection characteristics having both regression by the prism and continuous spreading by the cylindrical shape if reflection is conducted on the waved face. Thus, characteristics in which the view angle, brightness and CCR are well balanced are achieved.

If one or more of the transparent resin sheet 10, horizontal view angle increasing layer 20, reflection layer 30 and diffusion layer 40 are laminated on an opposite member in the above-mentioned embodiments, an adhesive or bonding agent may be used for the lamination. Alternatively, a molten resin may be used as an adhesive layer. In order to enhance the strength of the lamination, either one or both of two members to be laminated may be preliminarily subjected to surface activity treatment such as corona discharge or may be applied with an anchor agent. The above-mentioned adhesive resin or bonding agent should have properties which will not hinder the optical characteristics of the screen or will optimize the properties such as refractive index, etc. depending upon the application place.

The above-mentioned adhesive or bonding agent may be photo-curable or thermosetting adhesive or bonding agent. They may be photo-cured or thermoset after they are applied. Similarly, adhesive or bonding agents which can be cross-linked on exposure to electrons may be used. By means of photo-curing, thermosetting or electron cross-linking, the adhesives or bonding agents increase their modulus and change their adhesion or bonding properties. It is expected that addition of blends such as tackifier will stabilized the adhesion or bonding properties. If optimal lamination performance can be obtained by using adhesive or bonding agents which are photo-curable, thermosetting or electron cross-linkable, such adhesive or bonding agents may be appropriately adopted.

A protective film may be applied on the surface of the screen for preventing the screen surface from fouling or damaging. The protective film may be formed by laminating sheets of PET, PP and materials having transparency and high surface hardness. Fluoropolymer resin sheet or coating materials may be laminated on the screen surface. This provides features of protective coatings as well as decontamination characteristics. Preferable protective sheet is a sheet of optical use grade in which fish-eyes are less.

In order to prevent the deposition of dust or foreign material on the screen surface due to electrostatic forces, an antistatic agent may be applied or sprayed on the screen surface. The antistatic agent may be incorporated in the protective sheet made of PET or PP. The antistatic agent may be incorporated in the transparent binder 42 of the diffusion layer 40.

An ultraviolet-ray absorbing agent may be used for suppressing the deterioration of the TINT layer 50 due to exposure to ultraviolet-rays. It is preferable that the ultraviolet-ray absorbing agent be incorporated in the adhesive or bonding agent used for the lamination of the TINT layer 50 with an element (for example, diffusion layer 40) on the side of the TINT layer 50 to which light is incident. It may be incorporated in the diffusion layer 40 per se which is provided on the side of the TINT layer 50 to which light is incident, or a transparent sheet in which the ultraviolet-ray absorbing agent is laminated on the side of the TINT layer 50 to which light is incident. The ultraviolet-ray absorbing agent may be, for example, benzotriazole agents.

In the above-mentioned embodiment, the material of the transparent resin sheet 10 may include a resin sheet of, for example, polyester, polymethyl methacrylate, polycarbonate, polyvinyl chloride, polystyrene, polypropylene and nylon.

The material of the transparent resin binder 42 may include vinyl acetate resin, modified vinyl acetate/acryl copolymer resin, ethylene/acetate vinyl resin, polyester resin, acrylic copolymer resin, acrylic silicon resin, cellulose resin, vinyl chloride/vinyl acetate copolymer resin, styrene resin, urethane resin, epoxy resin, modified polyvinyl alcohol resin, acrylonitrile rubber. It is to be understood that the present invention is not limited to these materials. Any appropriate materials may be used in the present invention.

Now, a method of measuring the contrast on the reflection type screen of the present invention will be described. The screen having the structure shown in FIG. 23 was used. The screen face is divided into nine areas. The contrast in each position is measured by measuring the screen brightness (Gain) in the center point of each divided area.

Figure 51:
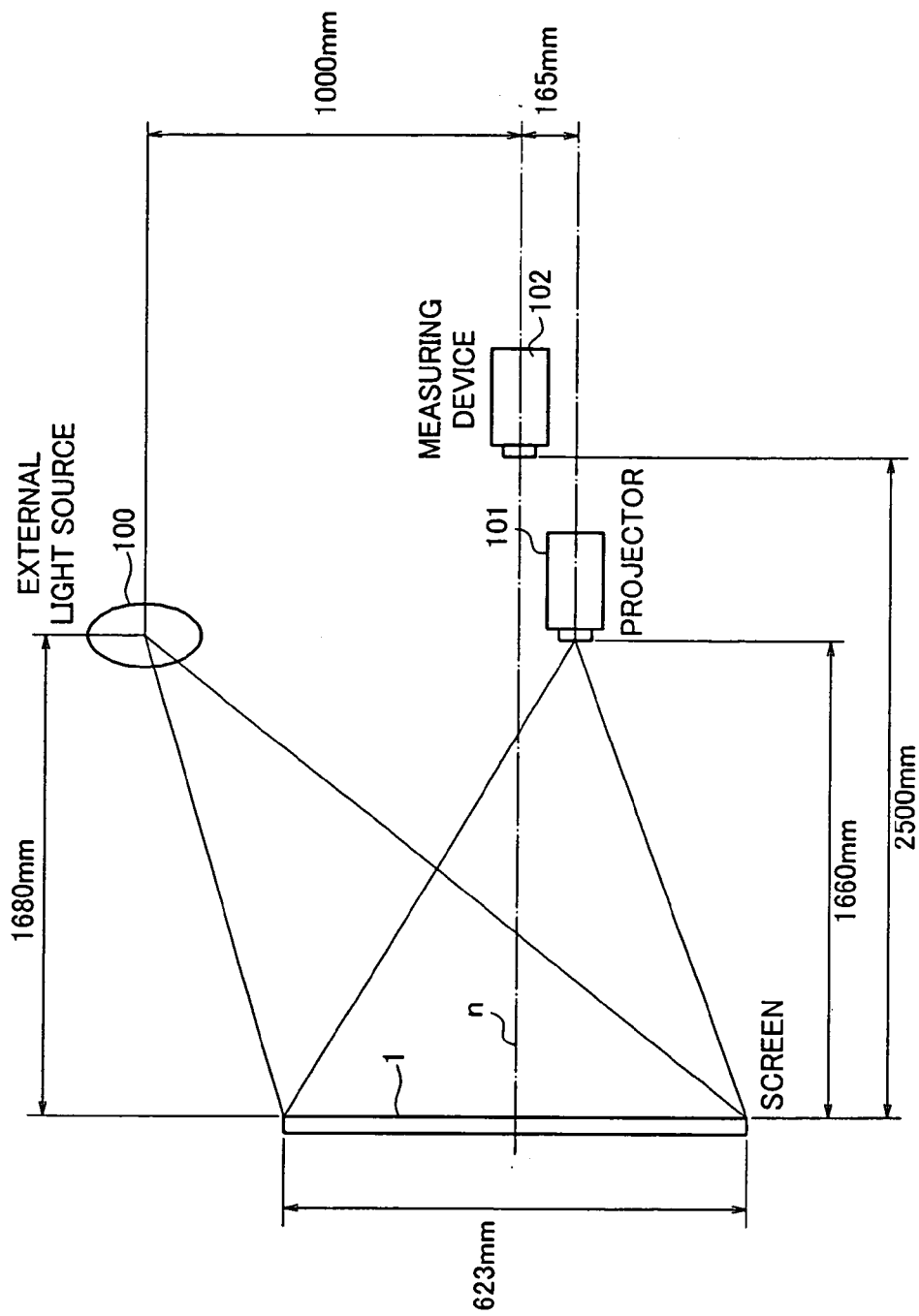
FIG. 51 is a view explaining the method of measuring the brightness of the reflection type screen of the present invention.

FIG. 51 is a view explaining a method of measuring the brightness. The screen 1 is formed as 50 inch wide screen having a size of 623×1107 mms. A brightness measuring device 102 is disposed in a position which is 2500 mms far from the surface of the screen on the normal line n in the center of the screen. An external right source 100 is disposed in a position which is remote from the surface of the screen 1 by 1680 mms and 1000 mm displaced from the normal line n in an upward direction.

A projector 101 is disposed in a position which is remote from the surface of the screen on by 1660 mm and is displaced by 165 mms from the normal line in a downward direction. It is assumed that the distance between the screen and the observer or viewer is not less than 1.5 m.

Figure 52:
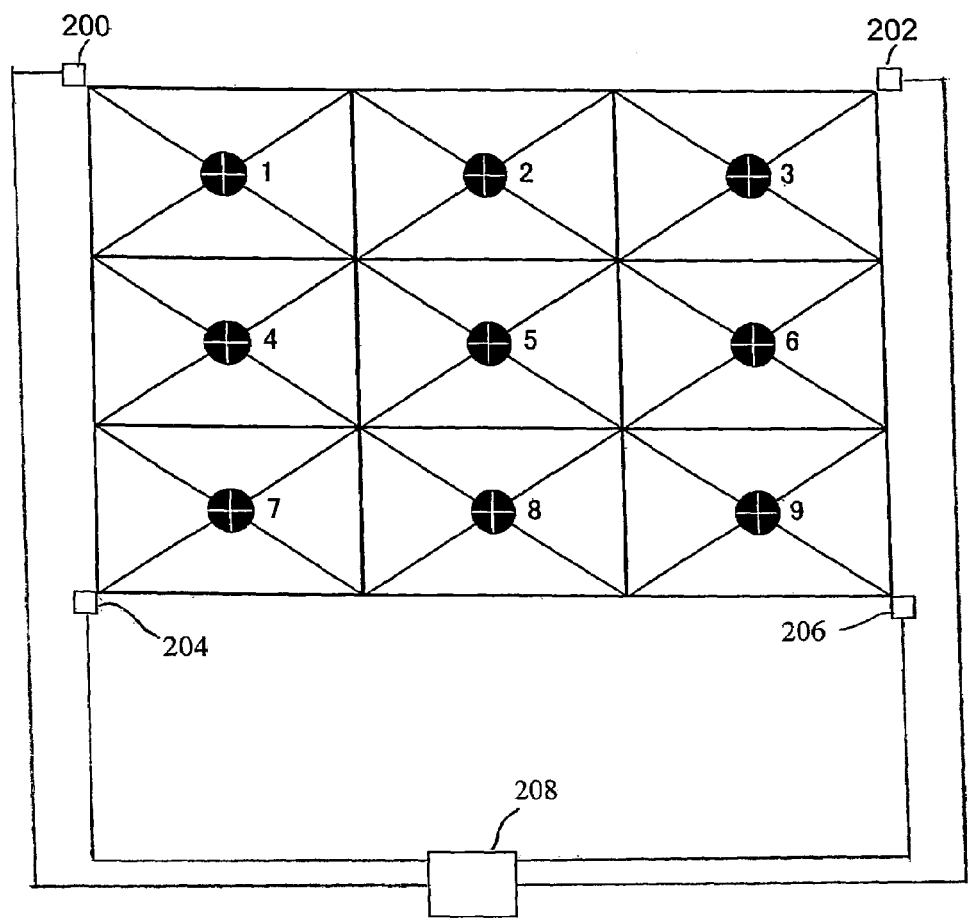
FIG. 52 is a view explaining the position for measuring the brightness of the reflection type screen.

FIG. 52 is a view explaining the brightness measuring position of the screen 1. The face of the screen 1 is equally divided into 9 areas as shown in FIG. 52. The screen brightness (Gain) in the center of each divided area was measured. The brightness measurement is conducted by rotating the brightness measuring device.

FIG. 53 is a table showing a result of brightness measurement in each of measuring positions and a calculation result of the contrast on the screen. The projected light Gain and external disturbing light Gain is measured in each of measuring positions 1 through 9 in FIG. 52. The image contrast in each position is calculated.

The contrast can be calculated as follows. (Projected light Gain×projected light illuminance/π)+(external disturbing light Gain×external disturbing light illuminance/π)/(projected light Gain×projected light illuminance/π/contrast)+ (external disturbing light Gain×external disturbing light illuminance/π).

The above-mentioned projected light illuminance was 1015.7 lx (luxes) which is obtained by dividing total light flux 700 lm (lumens) by the projected area 0.689 $m^2$. The external disturbing light illuminance was 2500 lx. The contrast of the projector per se is 1200:1.

The contrast is (6.9:1), (7.2:1), (6.4:1), (25.3:1), (48.7:1), (24.9:1), (51.1:1), (102.6:1), (49.2:1) in order in measuring positions 1 through 9. If it is assumed that complete diffusion occurs on the screen as a control example, the Gain of any projected light and external disturbing light would be 1 and the screen contrast would be 5.0:1. On the screen of the present invention, excellent contrast is achieved in any measurement at light place. The view angle (half value) is 17.5°, which is not less than 15°.

Now, the relationship between the characteristics of the images formed on the screen and the distance between the horizontal view angle increasing layer 20 and the reflection layer 30 will be described.

In the structure in which the reflection plate is used as the reflection layer 30 as shown in FIGS. 1 through 27, the distance between the reflection layer 30 and the horizontal view angle increasing layer 20 can be variably set. For example, the reflection layer 30 may be separated from the horizontal view angle increasing layer 20.

As mentioned above, imaging occurs twice in the diffusion layer 40 which becomes an imaging layer at the time when light projected from the projector device is incident upon the diffusion layer 40 and when the projected light which is reflected on the reflection layer 30 transmits through the diffusion layer 40 again. Accordingly, the more the distance between the reflection layer 30 and the diffusion layer 40 becomes, the more defocusing occurs, resulting in the deterioration of the image quality. Therefore, it is principally preferable that the distance between the diffusion layer 40 and the reflection layer 30 (optical length) be shorter. In other words, it is preferable from the view point of structure that the horizontal view angle increasing layer 20 be close to the reflection layer 30.

However, for optimization of the characteristics of projected images and rationalization of manufacturing process, the distance between the horizontal view angle increasing layer 20 and the reflection layer 30 may be larger depending upon needs. At this time, the optical length between the horizontal view angle increasing layer 20 and the reflection layer 30 has a tolerance in the practical level.

Now the characteristics of the screen if the optical length between the diffusion layer 40 and the reflection layer 30 is made longer when the distance between the reflection layer 30 and the horizontal view angle increasing layer 20 is made larger and the above-mentioned separation distance which is allowed for the screen will be considered.

FIGS. 54A through 58B are views showing simulation results of the optical length when a lenticular lens sheet is used as the horizontal view angle increasing layer 20 and the distance between the flat reflection layer 30 and the horizontal view angle increasing layer 20 is changed and the horizontal view angle characteristics of the screen. The distance X between the horizontal view angle increasing layer 20 and the reflection layer 30 (precisely, the distance between the apexes of the horizontal view angle increasing layer 20 and the reflecting face of the reflection layer 30) is 0 (contact), 20 μm, 30 μm, 140 μm and 200 μm. The optical lengths and the view angle characteristics at these distances are shown in FIGS. 54A through 58B.

Figure 54A:
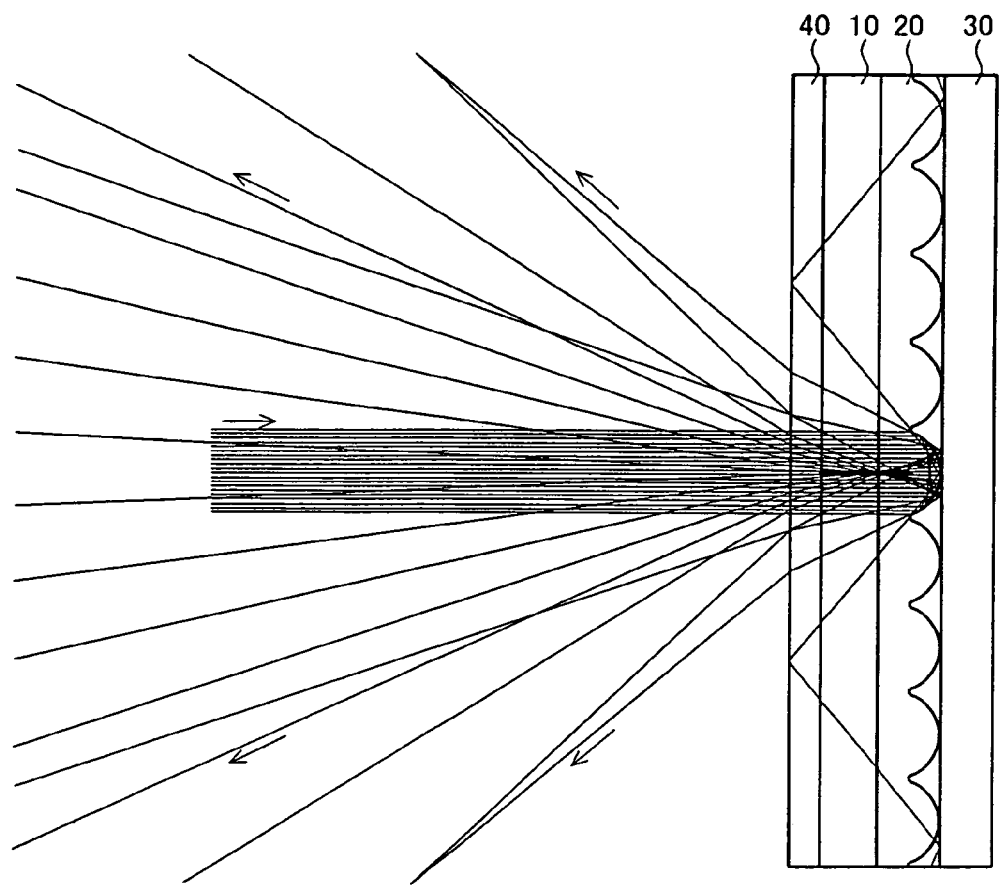
FIG. 54A is a view simulating an optical path when the distance between the view angle increasing layer and the reflection layer in a horizontal direction is 0.
Figure 54B:
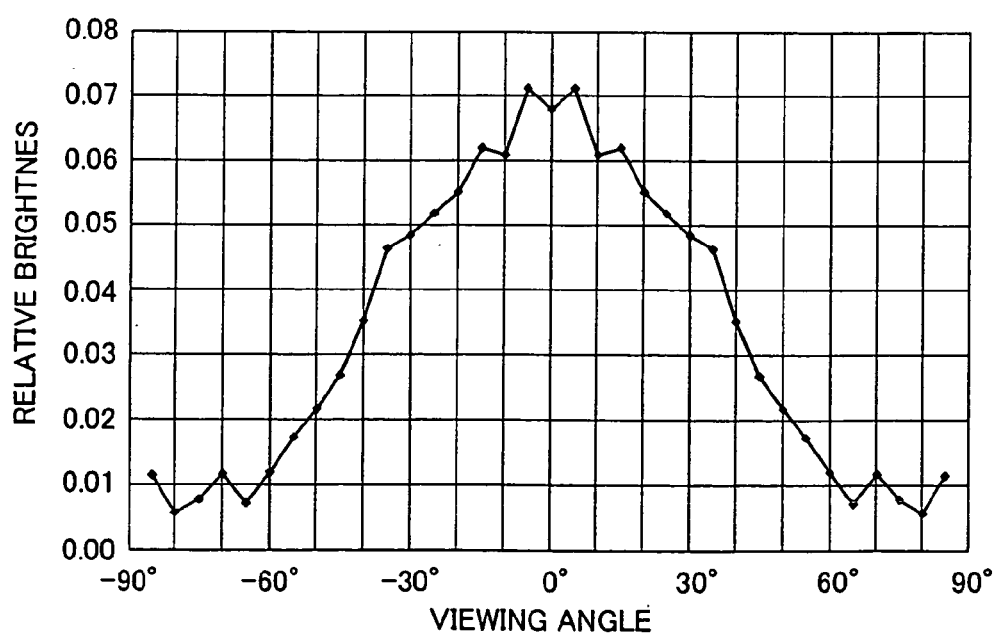
FIG. 54B is a view simulating the view angle characteristics corresponding to that of FIG. 54A.
Figure 55A:
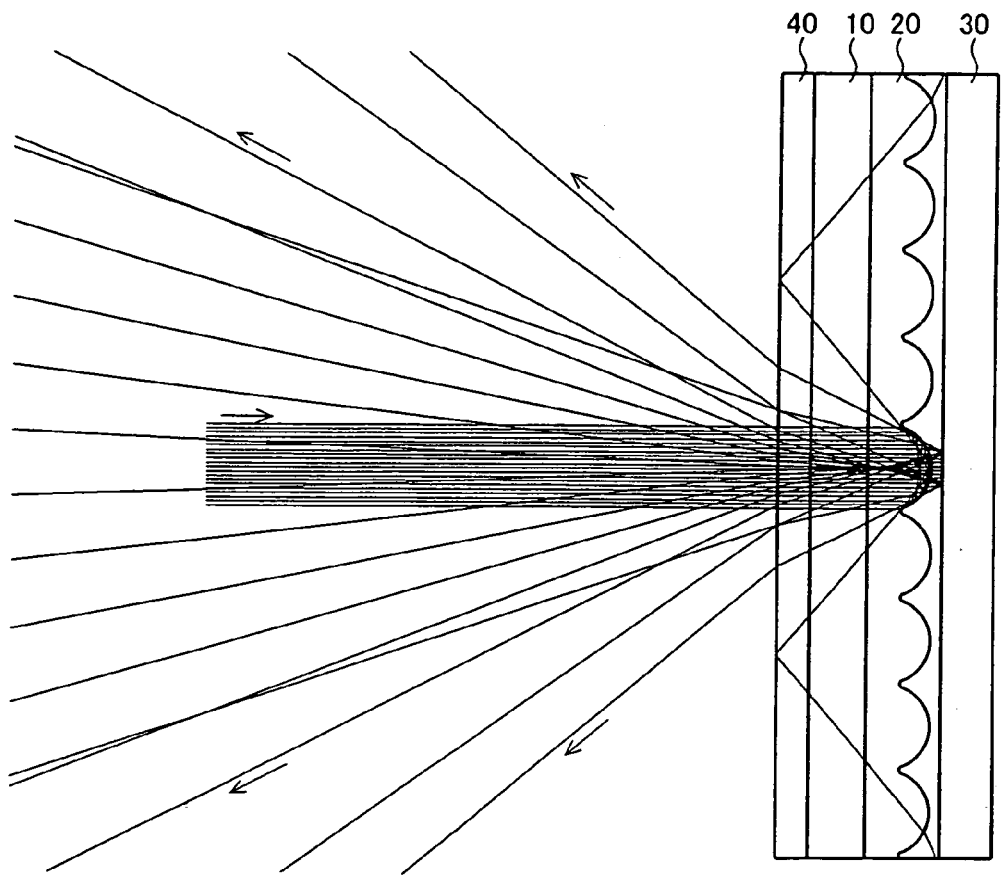
FIG. 55A is a view simulating an optical path when the distance between the horizontal view angle increasing layer and the reflection layer is 20 μm.
Figure 55B:
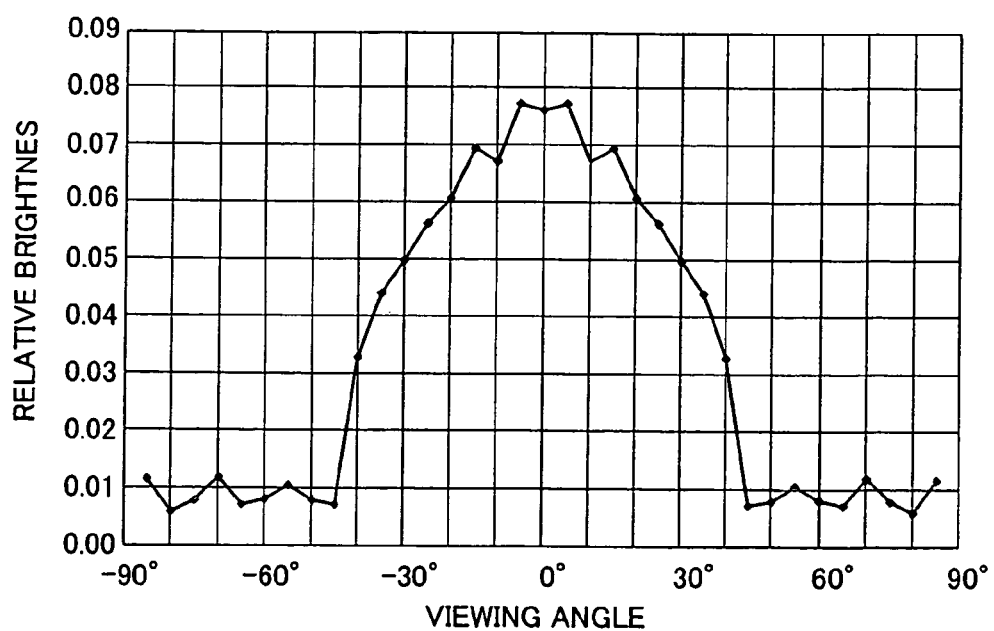
FIG. 55B is a view simulating the view angle characteristics corresponding to that of FIG. 55A.
Figure 56A:
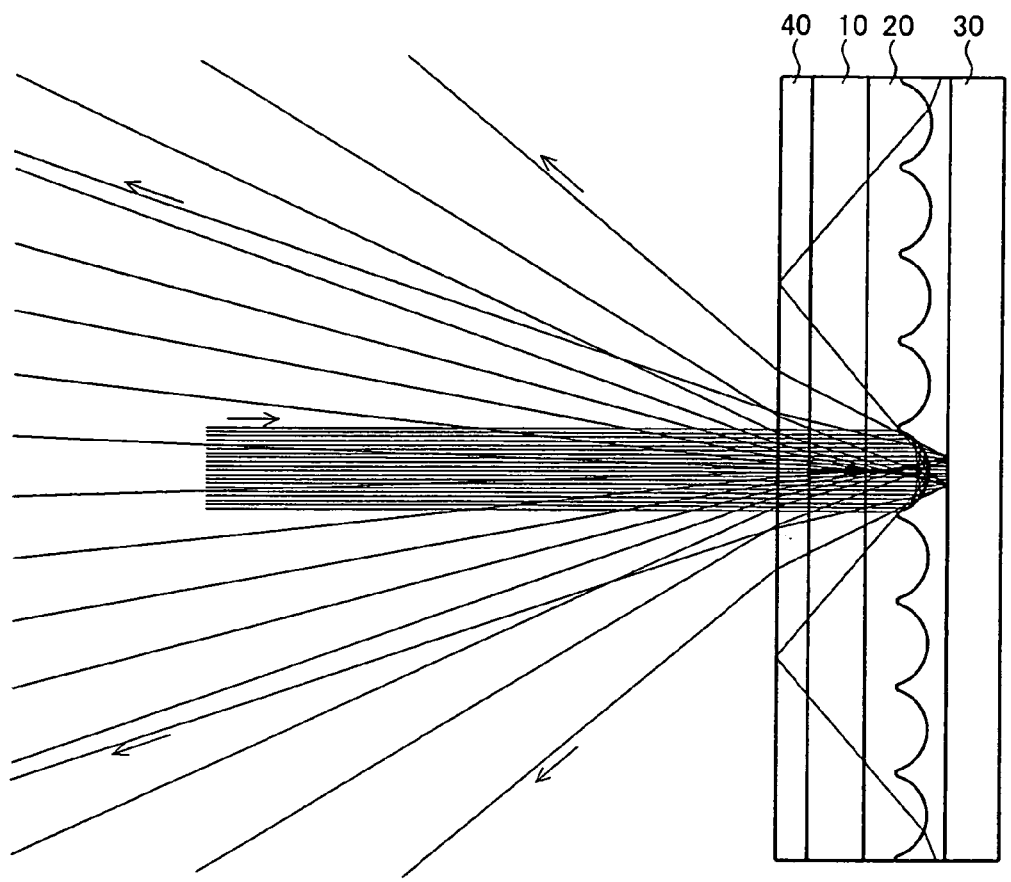
FIG. 56A is a view simulating an optical path when the distance between the horizontal view angle increasing layer and the reflection layer is 30 μm.
Figure 56B:
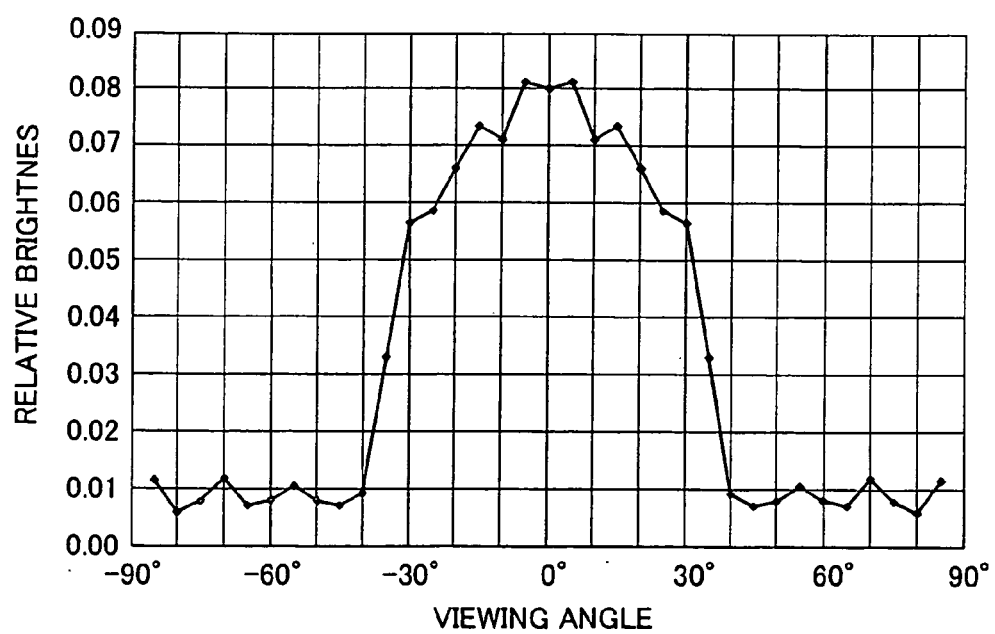
FIG. 56B is a view simulating the view angle characteristics corresponding to that of FIG. 56A.
Figure 57A:
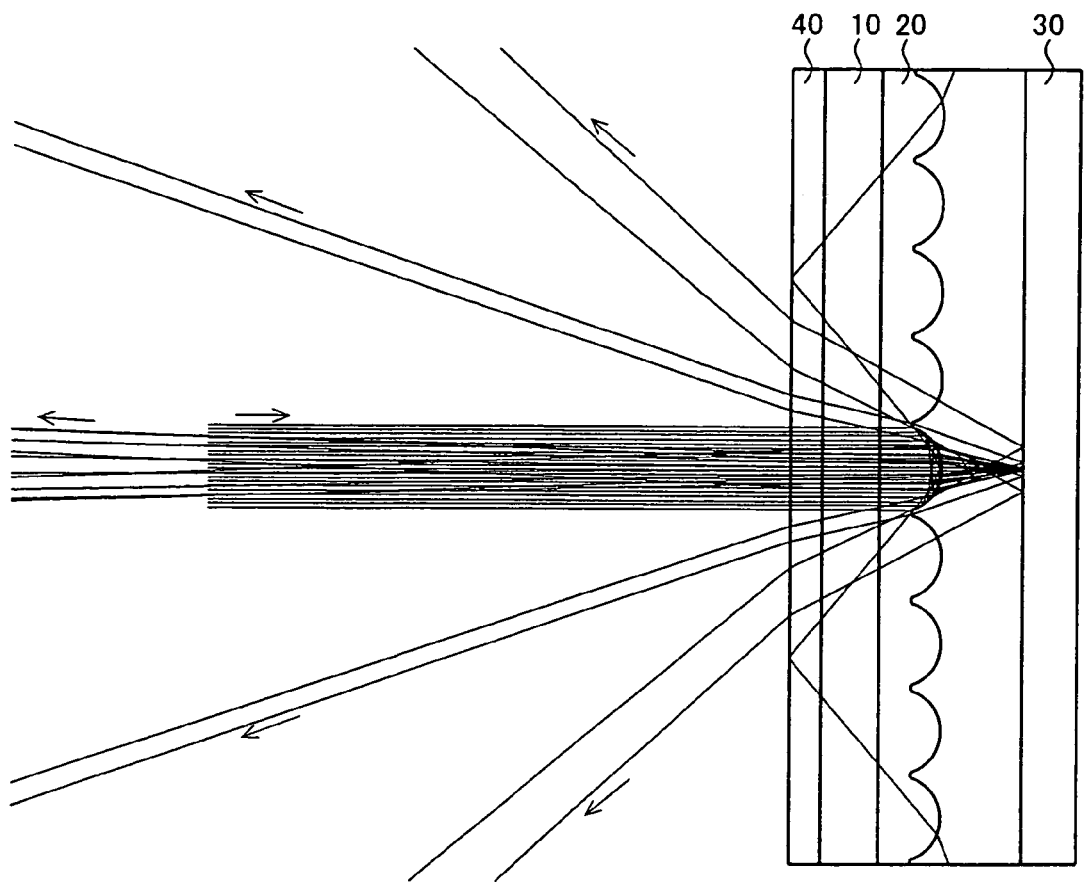
FIG. 57A is a view simulating an optical path when the distance between the horizontal view angle increasing layer and the reflection layer is 140 μm.
Figure 57B:
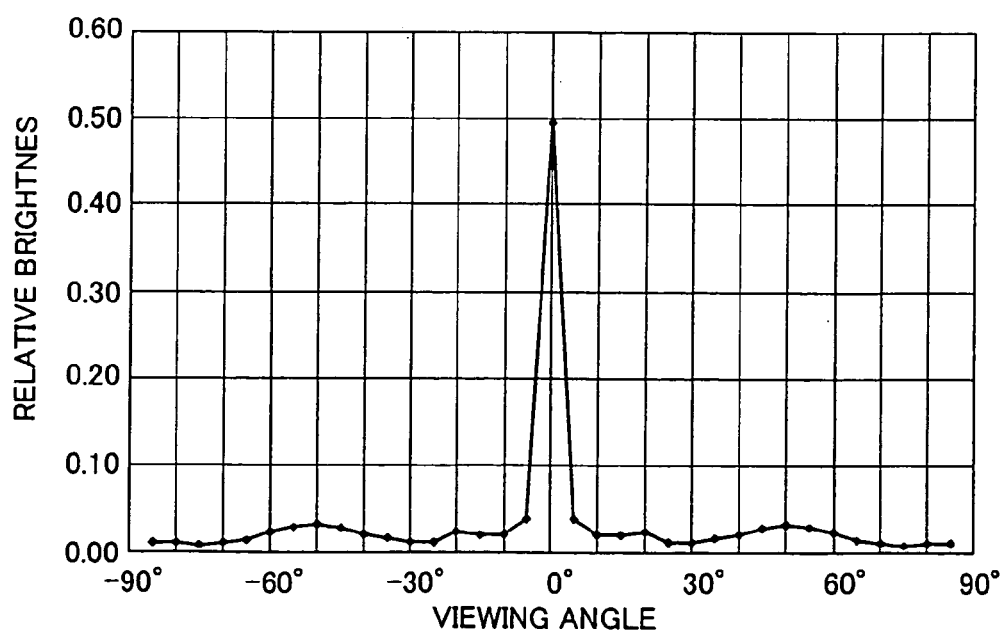
FIG. 57B is a view simulating the view angle characteristics corresponding to that of FIG. 57A.
Figure 58A:
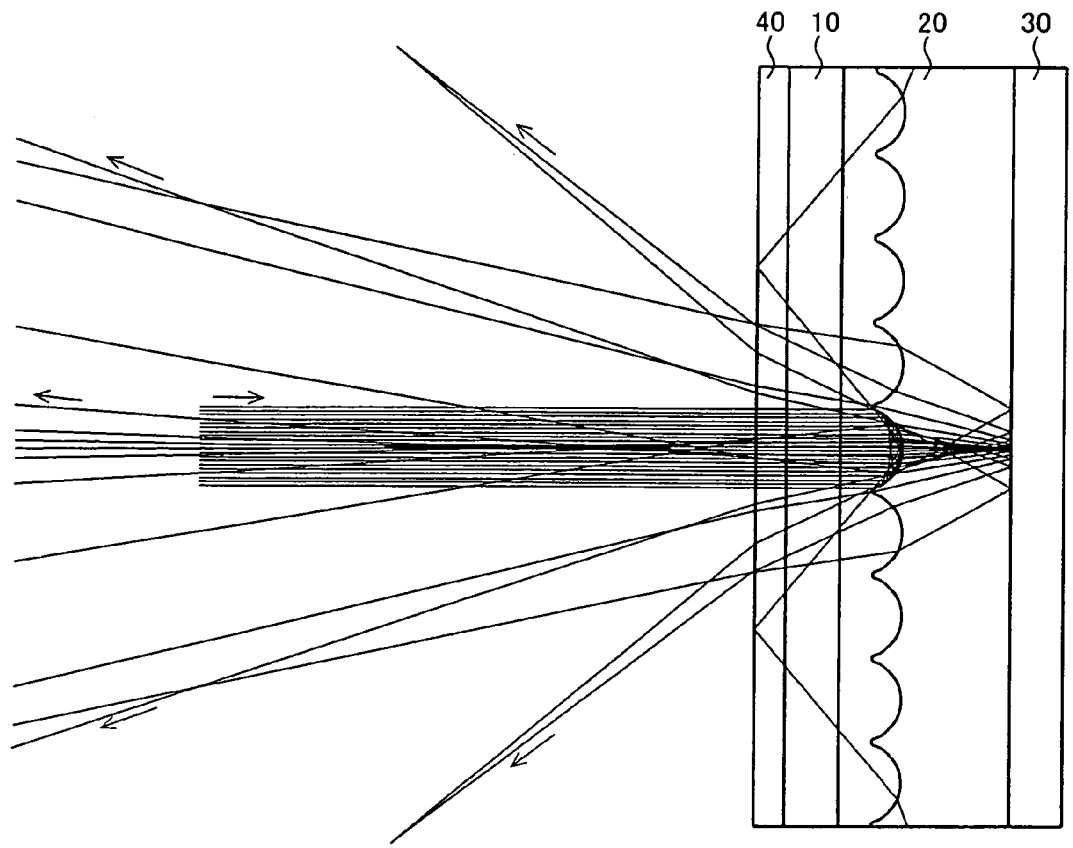
FIG. 58A is a view simulating an optical path when the distance between the horizontal view angle increasing layer and the reflection layer is 200 μm.
Figure 58B:
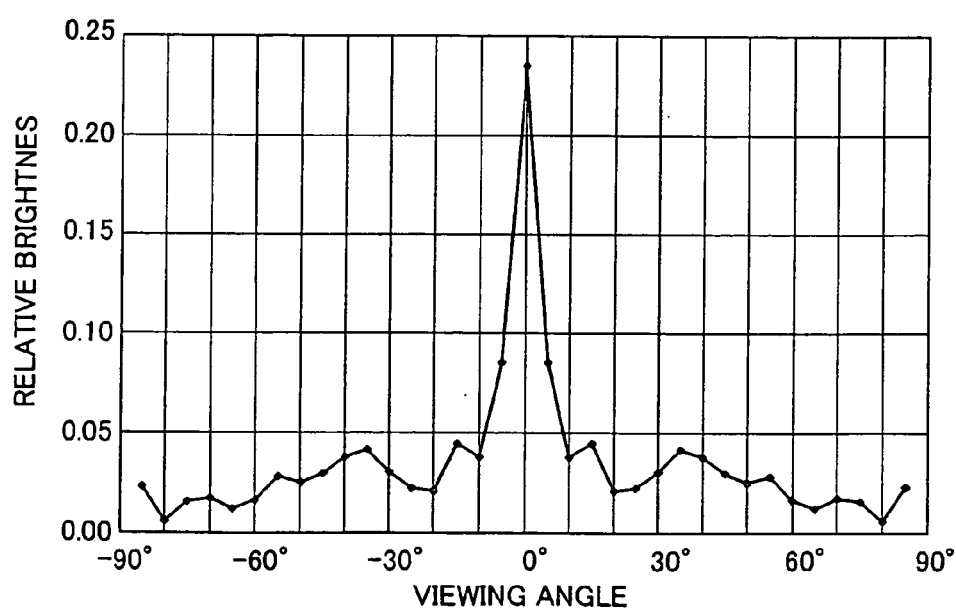
FIG. 58B is a view simulating the view angle characteristics corresponding to that of FIG. 58A.

Specifically, FIG. 54A shows the optical length at a distance of 0. FIG. 54B shows the view angle characteristics corresponding to FIG. 54A. Specifically, FIG. 55A shows the optical length at a distance of 20 μm. FIG. 55B shows the view angle characteristics corresponding to FIG. 55A. Specifically, FIG. 56A shows the optical length at a distance of 30 μm. FIG. 56B shows the view angle characteristics corresponding to FIG. 56A. Specifically, FIG. 57A shows the optical length at a distance of 140 μm. FIG. 57B shows the view angle characteristics corresponding to FIG. 57A. Specifically, FIG. 58A shows the optical length at a distance of 200 μm. FIG. 58B shows the view angle characteristics corresponding to FIG. 58A.

Each view of the optical length shows the result of simulation of the behavior of light when 20 light beams are incident upon one cylindrical shape portion of the lenticular lens perpendicularly to the screen face. The distribution of brightness corresponding to the divergence of the reflected light in the optical length views is shown in the views of view angle characteristics corresponding to the optical length views. The pitch between the cylindrical shape portions of the lenticular lens sheet in a horizontal direction is 155 μm. The focal length of the cylindrical lens which is defined by each cylindrical shape portion is about 140 μm from the apex of the cylindrical shape portion.

In the simulation of the view angle characteristics, the diffusion in the diffusion layer 40 is not considered. However, since the diffusion layer having the above-mentioned weak diffusion characteristics is used as the diffusion layer 40 in the present invention. It is considered that a result which is substantially identical with that when an actual screen is used is obtained in the simulation.

Considering the viewing position of a viewer with respect to the reflection type screen to which the present invention is applied, the viewing position of the viewer in a room is generally remote from 2 to 3 m from the screen. If the horizontal width which is occupied by one viewer is 1 m, the viewing angle of the viewer with respect to normal line to the screen face is represented as follows:

tan θ=(the number of viewers×1 m)/(the distance between the screen face and the viewers). If the distance between the screen face and the viewer is 2.5 m, viewing angle θ of the viewer who views the screen at most inclined angle is 22° and 39° when there are two and four viewers, respectively. It is preferable that the screen has a view angle of at least 15° or more even if general conditions of the viewing distance and viewers are considered.

If horizontal ideal view angle which enables the about 4 viewers to view the images in a room is about 40° in view of the foregoing, the view angle characteristics as shown in FIG. 3 is ideal. The horizontal view angle characteristics which are shown in FIG. 3 are such that the half value of the brightness (an angle at which a half brightness is obtained for the brightness at the central area (0°)) is about 40° and as the absolute value of the angle becomes larger for the central area (0°), the brightness more gradually changes. It is not preferable that the brightness abruptly changes depending upon the view angle. An optimal view angle characteristics and high image quality can be obtained according to the view angle characteristics shown in FIG. 3.

In view of the foregoing, simulations of FIGS. 54A to 58B will be considered. When the distance X between the horizontal view increasing layer 20 and the reflection face of the reflection layer 30 (specifically the distance between the apexes of the convex ridges of the horizontal view angle increasing layer 20 and the reflection face of the reflection layer 30) is 0 (FIGS. 54A and 54B) and 20 μm (FIGS. 55A and 55B), the half value is about 40° and the brightness gradually changes. When the distance X is 30 μm (FIGS. 56A and 56B), the half value decreases to about 33°. When the absolute value of the angle becomes larger, the brightness abruptly changes.

When the distance X is 140 μm (FIGS. 57A and 57B) substantially corresponding to the focal length of the cylindrical shape portion, most light will return to the central (0°) position, so that an enough view angle can not be obtained. When the distance X becomes 200 μm which is longer than the focal length (FIGS. 58A and 58B), components of the reflected light having a larger view angle relatively increases while the characteristics of collecting light to the central (0°) area is kept. The half value is about 5°, so that the view angle is not improved. The larger the distance X becomes as mentioned above, the more defocusing becomes. Image quality deteriorates.

From the foregoing, it is concluded that the distance X between the reflection layer 30 and the horizontal view angle increasing layer 20 which provides ideal view angle characteristics of FIG. 3 is in the range of 0 to 20 μm.

The ideal view angle characteristics of FIG. 3 provide a brightness which is larger than a given value even if four viewers are positioned side by side.

Figure 59:
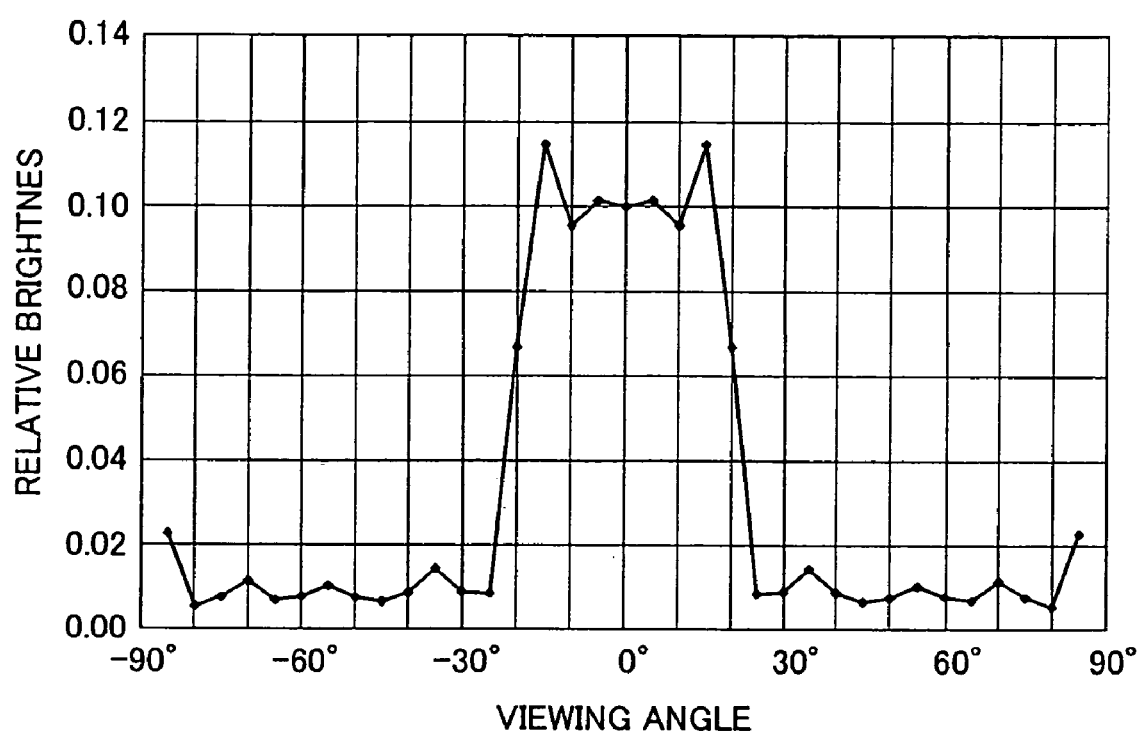
FIG. 59 is a view simulating an optical path when the distance between the horizontal view angle increasing layer and the reflection layer is 60 μm.
Figure 60:
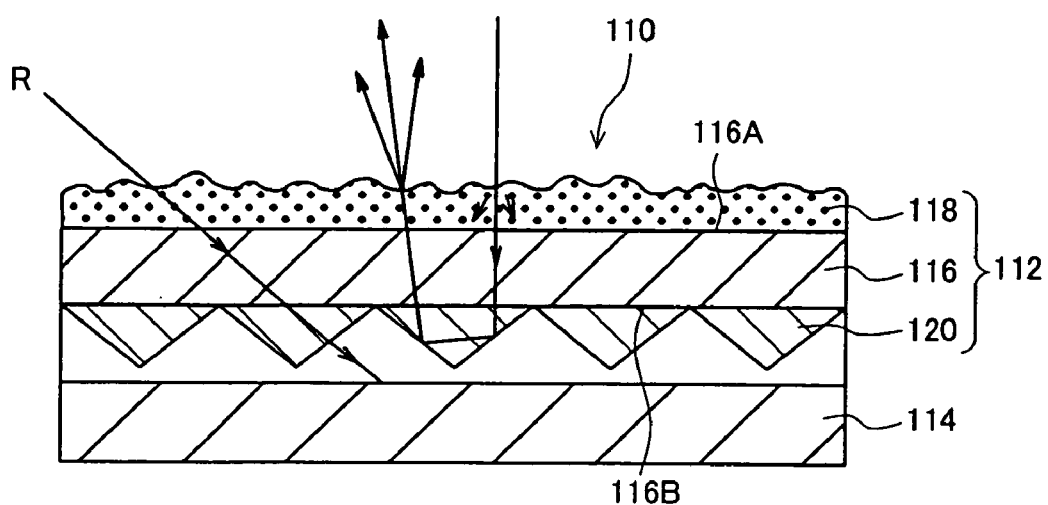
FIG. 60 is a view showing the structure of the reflection type screen which is disclosed in Japanese laid-open patent publication No. 11-38509.
Figure 61:
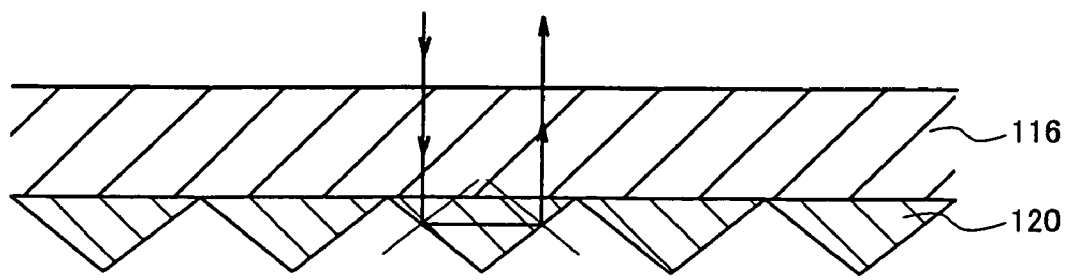
FIG. 61 is a view showing the operation of the reflection type screen which is disclosed in Japanese laid-open patent publication No. 11-38509.
Figure 62:
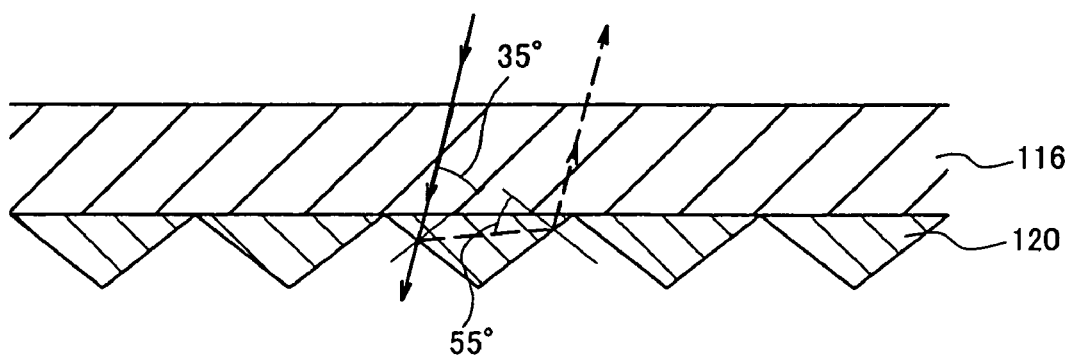
FIG. 62 is a view showing the operation of the reflection type screen which is disclosed in Japanese laid-open patent publication No. 11-38509.
Figure 63:
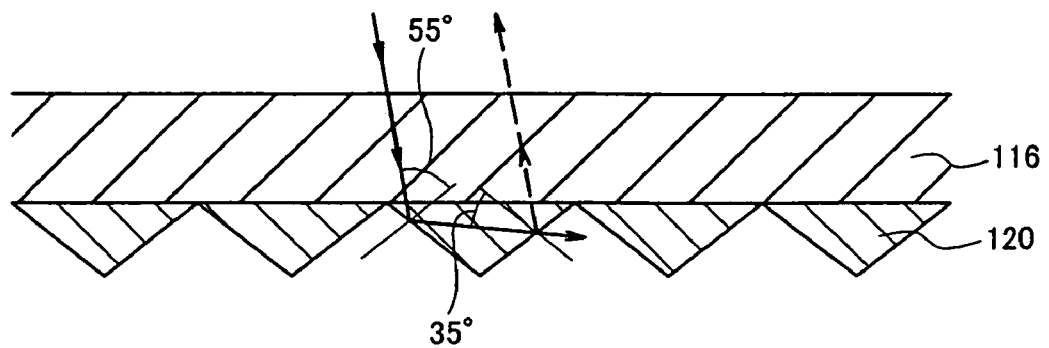
FIG. 63 is a view showing the operation of the reflection type screen which is disclosed in Japanese laid-open patent publication No. 11-38509.

If, for example, two viewers are positioned horizontally, the viewing angle θ is 22° according to the above-mentioned conditions. It is considered that the distance X which is up to about 60 μm is allowed. The view angle characteristics when the distance X is 60 μm is shown in FIG. 59.

When one viewer views the images on the screen, the viewer is usually located in substantially central position. Accordingly, even if light collection to the central area (0°) is larger, a big problem will not occur unless CCR deteriorates.

However, the longer the distance becomes the more defocusing occurs as mentioned above and the image quality deteriorates. When the distance X is made longer toward the focal point, light collection to the central area (0°) increases. When it exceeds the focal position, the components of the light diffused to the peripheral area slightly increases again. Even if a limited condition at which one viewer views the image on the screen is considered, making the distance X larger than the focal length is never meaning since only defocusing becomes larger.

From the foregoing, the distance X between the horizontal view angle increasing layer 20 and the reflection layer 30 should not be longer than the distance to the focal point of the cylindrical lens when the lenticular lens sheet is used. It is preferably the distance X be 60 μm or less, more preferably 20 μm or less.

The relation between the distance between the apex of the cylindrical shape portion of the horizontal view angle increasing layer 20 and the focal point of the cylindrical lens which is formed by the cylindrical shape portion (hereinafter referred to as "Y") and the distance X is preferably $0 \leq X \leq 3Y/7$, more preferably $0 \leq X \leq Y/7$. Since the focal length (hereinafter referred to as "Z") of the cylindrical lens is 180 μm, the relation between the distance X and the focal length Z of the cylindrical lens is preferably $0 \leq X \leq Z/3$; more preferably $0 \leq X \leq Z/9$.

In the foregoing embodiments, the distance between the horizontal view angle increasing layer 20 and the reflection layer 30 is principally fixed. However, the distance X may not necessarily constant depending upon the number of viewers as mentioned above. It is possible to provide a screen which is capable of effective reflecting by making the distance X variable depending upon the number of viewers. Most effective screen can be provided depending upon the use conditions if the distance X is changed to 0, 20 μm, 30 μm, 60 μm or 140 μm depending upon the number of the viewers.

Since the adjustment of the distance X is in the order of μm, the adjustment may be conducted by providing finely adjusting mechanisms 200, 202, 204 and 206 such as micrometers in appropriate positions such as at the four corners of the screen. If the screen has a large size, the distance can be controlled by driving the finely adjusting mechanisms by means of a power mechanism 208 such as an electric motor.

Although the distance X is constant over the entire area of the screen in the foregoing embodiments, the distance X may change from the central area to the peripheral area. That is, the incidence angle of light projected from the projecting device P with respect to the screen face at the central area is different from that at the peripheral area. In consideration of reflection efficient, making the distance X at the central area different from the distance X at the peripheral area is effective. Generally, contrast over the screen is improved if the screen is configured so that the distance X at the central area is made shorter than the distance at the peripheral area. Making the contour of the whole of the screen so that the peripheral area is slightly curved toward the projecting device P is also effective in lieu of adjusting the distance X as mentioned above.

The embodiments of the present invention have been described. As is apparent from the foregoing, reflection type screen which is high in contrast at light place and is excellent in horizontal view angle and screen CCR can be provided in accordance with the present invention. Particularly, in accordance with the present invention, a reflection type screen can be provided in which the contrast in a light room can be achieved by providing different reflection characteristics (diffusion degree) in a horizontal and vertical directions by means of the horizontal view angle increasing layer, that is by restricting the diffusion in a vertical direction for improving the contrast in a light room and by relatively increasing the diffusion in a horizontal direction to achieve a wide view angle for improving the contrast in a light room, which is also applicable to a large size screen and does not deteriorate CCR.

Black color in the projected image can be enhanced by absorbing the eternal disturbing light by the TINT layer or black matrix layer. The reflection efficiency and the gain in a direction toward the front face of the screen can be enhanced by providing a reflection layer at the rear of the horizontal view angle increasing layer. Diffusion of the reflected light and reduction of hot spots or hot bands on the surface of the diffusion layer can be achieved by forming the diffusion layer of multiple layers and individually controlling the surface roughness on the light incident face and inner haze factor of the diffusion layer.

The invention claimed is:

1. A reflection type screen comprising:
   a front side diffusion layer having weak diffusion characteristics such that the shape represented by a reflection strength ratio of the diffusion light becomes elongated in comparison with circular;
   a horizontal view angle increasing layer for increasing a horizontal view angle; and
   a rear side reflection layer disposed substantially adjacent to said horizontal view angle increasing layer for reflecting light which has been transmitted through said horizontal view angle increasing layer; wherein
   said horizontal view angle increasing layer is structured so that a multiplicity of convex ridges are successively arrayed, and an apex of each of said convex ridges is disposed on the side of said horizontal viewing angle increasing layer substantially adjacent to the reflection layer, and
   said multiplicity of convex ridges are disposed so that the longitudinal direction of each said convex ridge is aligned with a vertical direction relative to said reflection type screen.

2. A reflection type screen as defined in claim 1, wherein said convex ridges of said horizontal view angle increasing layer are in the prismatic shape in cross section.

3. A reflection type screen as defined in claim 1, wherein said convex ridges of said horizontal view angle increasing layer are in the wave shape in cross section.

4. A reflection type screen as defined in claim 1, wherein said reflection layer is bonded to the rear side of said horizontal view angle increasing layer via a bonding layer.

5. A reflection type screen as defined in claim 4, wherein said convex ridges of said horizontal view angle increasing layer are in the cylindrical shape in cross section, said reflection layer being disposed between the focal position of a cylindrical lens which is formed by said cylindrical shape and the apexes of said convex ridges.

6. A reflection type screen as defined in claim 5, wherein the distance between said reflection layer and the apexes of the convex ridges of said horizontal view angle increasing layer is in the order of $1/7$ or less of the distance between the focal position of said cylindrical lens and the apexes of the convex ridges of said horizontal view angle increasing layer.

7. A reflection type screen as defined in claim 4, wherein said reflection layer is partially bonded to said horizontal view angle increasing layer and a medium having a refractive index different from index of said horizontal view angle increasing layer is disposed between said horizontal view angle increasing layer and said bonding layer at non-bonded portion therebetween.

8. A reflection type screen as defined in claim 1, wherein said reflection type screen comprises a tint layer containing a tint, said tint layer being laminated on the side of the projected image light incident side with respect to said horizontal view angle increasing layer.

9. A reflection type screen as defined in claim 1, wherein said reflection type screen comprises a black matrix layer which is formed with a black matrix, said black matrix layer being laminated on the projected image light incident side with respect to said horizontal view angle increasing layer.

10. A reflection type screen as defined in claim 1, wherein said reflection type screen comprises a substrate made of a transparent resin sheet, said substrate being laminated on the projected image light incident side with respect to said horizontal view angle increasing layer.

11. A reflection type screen as defined in claim 1, wherein said diffusion layer has characteristics such that the transmission factor for all light is not less than 80% and the haze factor is 75+/−10%.

12. A reflection type screen as defined in claim 1, wherein said convex ridges of said horizontal view angle increasing layer are cylindrical in cross section.

13. A reflection type screen as defined in claim 1 or 11, wherein said reflection layer is disposed on a rearwardly facing side of said horizontal view angle increasing layer in a non-bonding manner.

14. A reflection type screen as defined in claim 13, wherein a distance between the reflection layer and the horizontal view angle increasing layer is adjustable.

15. A reflection type screen as defined in claim 13, wherein said convex ridges of said horizontal view angle increasing layer are cylindrical in cross section, and said reflection layer is disposed between a focal position of a cylindrical lens that is formed by said cylindrical shape and the apexes of said convex ridges.

16. A reflection type screen as defined in claim 15, wherein a distance between said reflection layer and the apexes of the convex ridges of said horizontal view angle increasing layer is on the order of $1/7$ or less of the distance between the focal position of said cylindrical lens and the apexes of the convex ridges of said horizontal viewing angle increasing layer.

17. A reflection type screen as defined in any of claims 1, 11, or 12, wherein the pitch between said arrayed convex ridges is 200 μm or less.

18. A reflection type screen as defined in any of claims 1, 11 or 12, wherein said reflection layer is formed on the surface of the arrayed convex ridges of said horizontal view angle increasing layer by a vacuum deposition or application technique.

19. A reflection type screen as defined in any of claims 1, 11 or 12, wherein said reflection layer is formed of a reflection sheet which is laminated on the surface of said convex ridges.

20. A reflection type screen as defined in any of claims 1, 11 or 12, wherein said diffusion layer is formed of a transparent resin binder in which beads and/or pigments are disbursed as a diffusion material.

21. A reflection type screen as defined in claim 20, wherein said diffusion layer comprises a plurality of layers which are different in at least one particle size, kind, content and granularity of said diffusion material and wherein a surface roughness and the inner haze factor of said diffusion layer are independently controlled.

22. A reflection type screen as defined in any of claims 1, 11 or 12. wherein said horizontal viewing angle increasing layer consists of a sheet substrate on which an array of said convex ridges is formed.

* * * * *